(12) United States Patent
Stadelmeier et al.

(10) Patent No.: US 8,792,322 B2
(45) Date of Patent: Jul. 29, 2014

(54) FRAME AND SIGNALLING PATTERN STRUCTURE FOR MULTI-CARRIER SYSTEMS

(75) Inventors: Lothar Stadelmeier, Stuttgart (DE); Samuel Asangbeng Atungsiri, Basingstoke (GB); Martin Lovell, Reading (GB); Tamotsu Ikeda, Ota-ku (JP)

(73) Assignee: Sony Corporation, Tokyo (JP)

( * ) Notice: Subject to any disclaimer, the term of this patent is extended or adjusted under 35 U.S.C. 154(b) by 217 days.

(21) Appl. No.: 13/372,255

(22) Filed: Feb. 13, 2012

(65) Prior Publication Data

US 2012/0213255 A1 Aug. 23, 2012

Related U.S. Application Data

(62) Division of application No. 12/436,980, filed on May 7, 2009, now Pat. No. 8,121,017.

(30) Foreign Application Priority Data

| Jun. 4, 2008 | (EP) | 08157548 |
| Jun. 4, 2008 | (EP) | 08157549 |
| Jun. 13, 2008 | (EP) | 08158289 |
| Jun. 13, 2008 | (EP) | 08158291 |

(51) Int. Cl.
*H04J 11/00* (2006.01)
*H04J 9/00* (2006.01)

(52) U.S. Cl.
USPC ........... 370/203; 370/204; 370/206; 370/208; 370/210; 375/130; 375/259; 375/260; 375/268

(58) Field of Classification Search
CPC ............. H04J 11/0069; H04L 27/2655; H04L 27/2601; H04L 27/2602; H04L 27/2613; H04L 27/2626; H04L 27/2646; H04L 27/2666
USPC ........... 370/203–211; 375/130, 259–260, 268
See application file for complete search history.

(56) References Cited

U.S. PATENT DOCUMENTS 6,172,993 B1 1/2001 Kim et al.
6,470,030 B1 10/2002 Park et al.
(Continued)

FOREIGN PATENT DOCUMENTS

CN 101064577 A 10/2007
EP 1 650 921 A2 4/2006
(Continued)

OTHER PUBLICATIONS

Stefan H. Muller-Weinfurtner, "OFDM for Wireless Communications: Nyquist Windowing, Peak-Power Reduction, and Synchronization", 2000, ISBN 3-8265 7658-6, 117 pages.

(Continued)

*Primary Examiner* — Benjamin H Elliott, IV
(74) *Attorney, Agent, or Firm* — Oblon, Spivak, McClelland, Maier & Neustadt, L.L.P.

(57) ABSTRACT

A transmitting apparatus for transmitting signals in a multi carrier system on the basis of a frame structure, each frame including at least two signalling patterns adjacent to each other in the frequency direction and at least two data patterns, the transmitting apparatus including signalling mapping means to map signalling data on frequency carriers of each of the at least two signalling patterns in a frame, each signalling pattern having the same length, data mapping means to map data on frequency carriers of the at least two data patterns in a frame, transforming means to transform the signalling patterns and the data patterns from the frequency domain into the time domain in order to generate a time domain transmission signal, and transmitting means to transmit the transmission signal. A corresponding transmitting method and a frame pattern for a multi carrier system are also provided.

24 Claims, 34 Drawing Sheets

(56) References Cited

U.S. PATENT DOCUMENTS

Figure 4A:
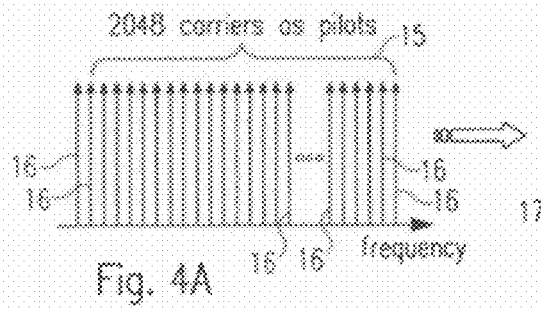

| | | |
|---|---|---|
| 6,760,362 B2 | 7/2004 | Patel et al. |
| 6,952,182 B2 | 10/2005 | Spilker et al. |
| 6,990,318 B2 | 1/2006 | Horisaki |
| 7,039,004 B2 | 5/2006 | Sun et al. |
| 7,075,949 B2 | 7/2006 | Okada et al. |
| 7,098,967 B2 | 8/2006 | Kanno et al. |
| 7,133,380 B1 | 11/2006 | Winters et al. |
| 7,233,625 B2 | 6/2007 | Ma et al. |
| 7,260,055 B2 | 8/2007 | Wang et al. |
| 7,304,939 B2 | 12/2007 | Steer et al. |
| 7,349,436 B2 | 3/2008 | Maltsev et al. |
| 7,366,262 B2 | 4/2008 | Shin et al. |
| 7,492,699 B2 | 2/2009 | Cho |
| 7,639,660 B2 | 12/2009 | Kim et al. |
| 7,719,954 B2 | 5/2010 | Sung |
| 7,787,431 B2 | 8/2010 | Li et al. |
| 7,792,201 B2 | 9/2010 | Lee et al. |
| 2002/0136176 A1 | 9/2002 | Abeta et al. |
| 2003/0043732 A1 | 3/2003 | Walton et al. |
| 2004/0013084 A1 | 1/2004 | Thomas et al. |
| 2004/0180635 A1 | 9/2004 | Choi et al. |
| 2005/0152357 A1 | 7/2005 | Stephens |
| 2006/0013285 A1 | 1/2006 | Kobayashi et al. |
| 2006/0088112 A1 | 4/2006 | Das et al. |
| 2006/0114812 A1 | 6/2006 | Kim et al. |
| 2006/0120273 A1 | 6/2006 | Wang et al. |
| 2006/0128323 A1 | 6/2006 | Fujimoto |
| 2007/0121750 A1 | 5/2007 | Shirakata et al. |
| 2007/0140377 A1 | 6/2007 | Murakami et al. |
| 2007/0268975 A1 | 11/2007 | Yoon et al. |
| 2007/0297323 A1 | 12/2007 | Seki |
| 2008/0043858 A1 | 2/2008 | Lim et al. |
| 2008/0084940 A1 | 4/2008 | Hou |
| 2008/0095255 A1 | 4/2008 | Tanaka et al. |
| 2008/0107011 A1 | 5/2008 | Yang |
| 2008/0159436 A1 | 7/2008 | Cho et al. |
| 2009/0052427 A1 | 2/2009 | Oketani et al. |
| 2009/0109948 A1 | 4/2009 | Bauernfeind |
| 2009/0116374 A1 | 5/2009 | Henriksson et al. |
| 2009/0135802 A1 | 5/2009 | Haga et al. |
| 2009/0161652 A1 | 6/2009 | Chang et al. |
| 2009/0168909 A1 | 7/2009 | Stadelmeier et al. |
| 2009/0257483 A1 | 10/2009 | French et al. |
| 2009/0257515 A1 | 10/2009 | Chang et al. |
| 2009/0296839 A1 | 12/2009 | Stadelmeier et al. |
| 2009/0296843 A1 | 12/2009 | Gu et al. |
| 2009/0304023 A1 | 12/2009 | Stadelmeier et al. |
| 2009/0304099 A1 | 12/2009 | Waller et al. |
| 2010/0034219 A1 | 2/2010 | Stadelmeier et al. |
| 2010/0135316 A1 | 6/2010 | Atungsiri et al. |
| 2012/0213255 A1* | 8/2012 | Stadelmeier et al. ......... 375/219 |

FOREIGN PATENT DOCUMENTS

| | | |
|---|---|---|
| EP | 1650921 A2 | 4/2006 |
| WO | WO 2007/083569 A1 | 7/2007 |
| WO | WO 2007/148629 A1 | 12/2007 |
| WO | WO 2008/050428 A1 | 5/2008 |
| WO | WO 2008/050574 A1 | 5/2008 |

OTHER PUBLICATIONS

Digital Video Broadcasting (DVB); "Second Generation Framing Structure, Channel Coding and Modulation Systems for Broadcasting, Interactive Services, News Gathering and Other Broadband Satellite Applications (DVB-S2)", ETSI EN 302 307 (V1.2.1), European Standard (Telecommunications Series), Aug. 2009, 78 pages.

Digital Video Broadcasting (DVB); "Frame Structure Channel Coding and Modulation for a Second Generation Digital Terrestrial Television Broadcasting System (DVB-T2)", ETSI EN 302 755 (V1.1.1), European Standard (Telecommunications Series), Sep. 2009, 167 pages.

Digital Video Broadcasting (DVB); "Framing Structure, Channel Coding and Modulation for Digital Terrestrial Television", ETSI EN 300 744 (V1.5.1), European Standard (Telecommunications Series), Nov. 2004, 64 pages.

"Data Over Cable Service Interface Specifications DOCSIS 3.0", Physical Layer Specification CM-SP-PHYv3.0-I08-090121, Jan. 21, 2009, 169 pages.

"Transmission System for Digital Terrestrial Television Broadcasting", ARIB Standard, ARIB STD-B31 Version 1.6, Association of Radio Industries and Businesses, Nov. 30, 2005, 172 pages.

Michael Speth, et al., "Optimum Receiver Design for OFDM-Based Broadband Transmission—Part II: A Case Study", IEEE Transactions on Communications, vol. 49, No. 4, Apr. 2001, pp. 571-578.

Extended Search Report issued Feb. 4, 2013 in European Application No. 12175157.2.

U.S. Appl. No. 13/325,973, filed Dec. 14, 2011, Stadelmeier, et al.

Office Action issued Oct. 26, 2011, in Chinese Patent Application No. 200910203151.6 (with English-language translation).

Japanese Office Action issued Jun. 25, 2013 in Patent Application No. 2009-134463 with English Translation.

U.S. Appl. No. 13/458,316, filed Apr. 27, 2012, Stadelmeier, et al.
U.S. Appl. No. 13/485,248, filed May 31, 2012, Stadelmeier, et al.
U.S. Appl. No. 13/486,473, filed Jun. 1, 2012, Stadelmeier, et al.
U.S. Appl. No. 13/470,986, filed May 14, 2012, Atungsiri, et al.

Office Action issued Oct. 15, 2013 in Japanese Patent Application No. 2009-134463 (with partial English translation).

U.S. Appl. No. 13/676,952, filed Nov. 14, 2012, Stadelmeier, et al.

Extended European Search Report issued Jan. 28, 2014 in Patent Application No. 12173455.2.

Extended European Search Report issued Jan. 28, 2014 in Patent Application No. 12174965.9.

* cited by examiner

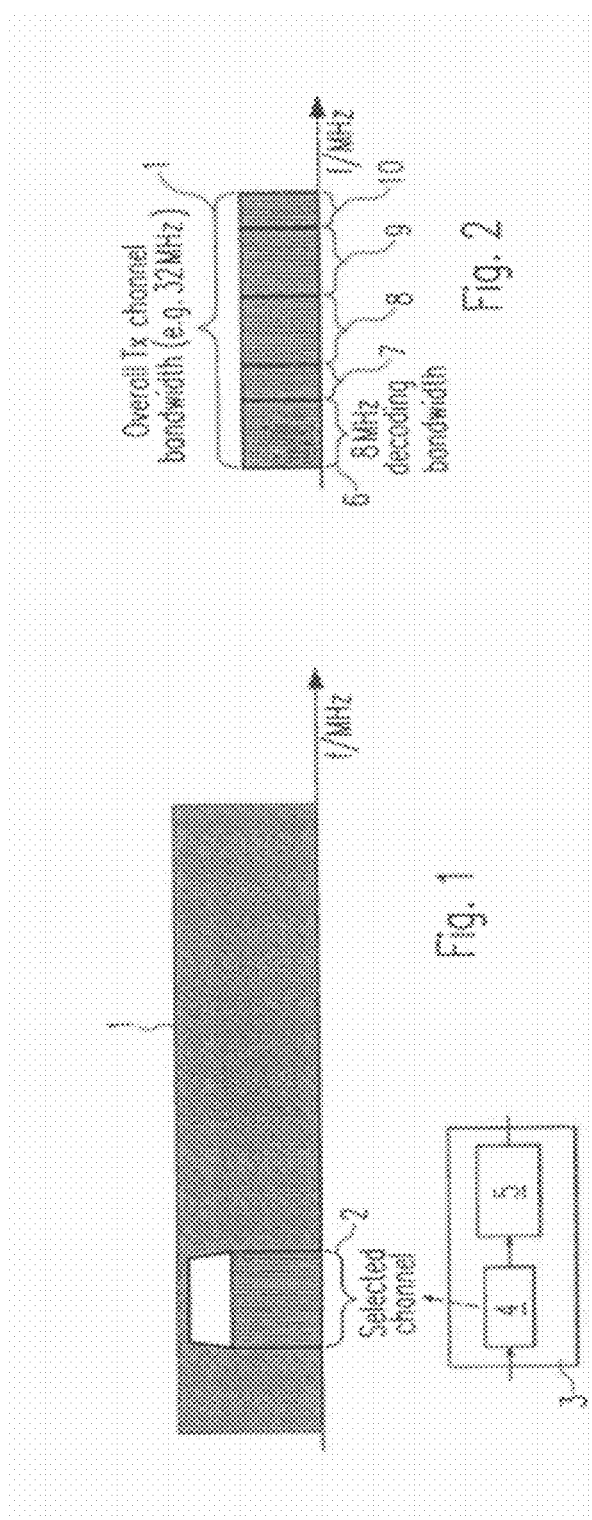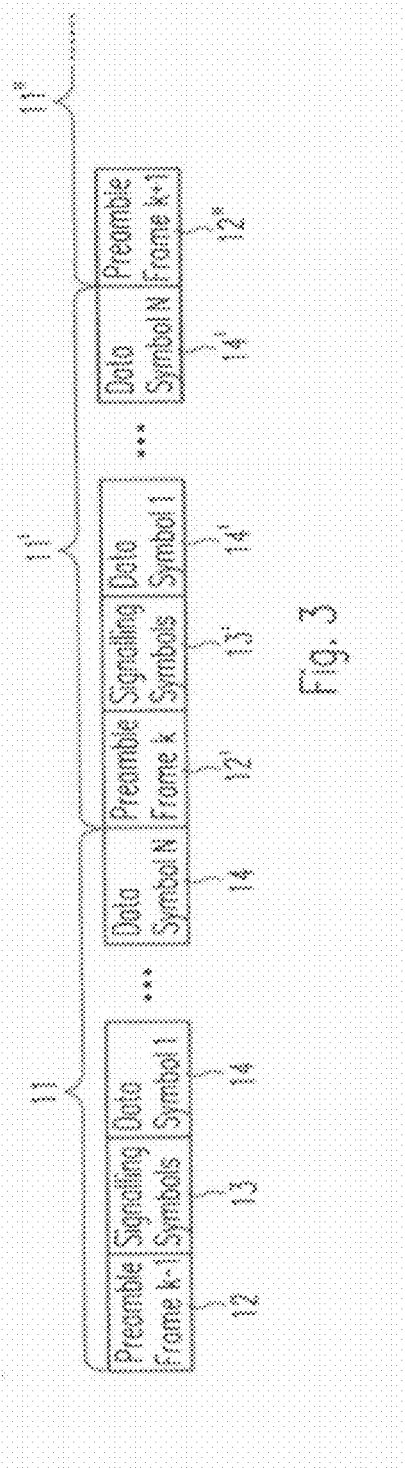

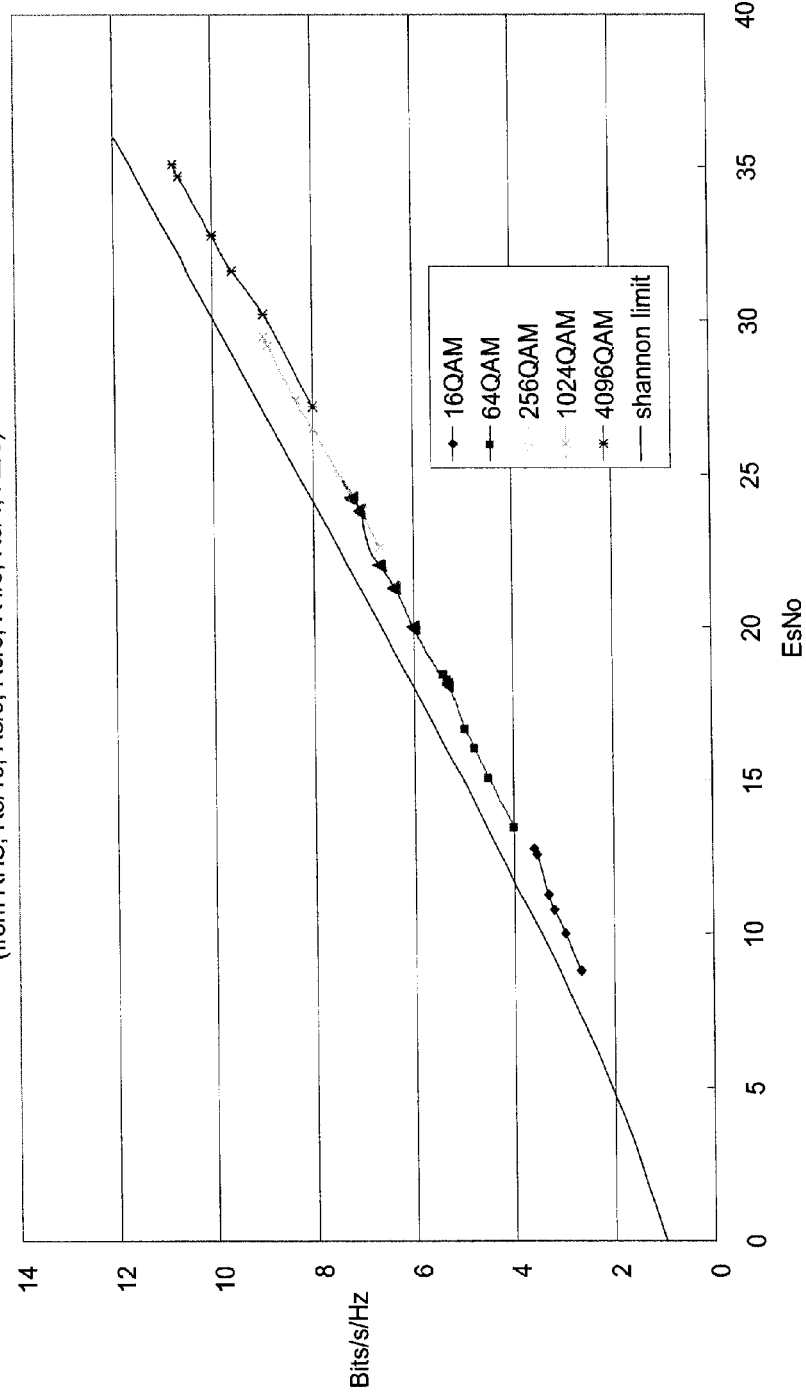

FRAME AND SIGNALLING PATTERN STRUCTURE FOR MULTI-CARRIER SYSTEMS

CROSS-REFERENCE TO RELATED APPLICATIONS

The present application is a continuation application of and claims the benefit of priority under 35 U.S.C. §120 from U.S. application Ser. No. 12/436,980, filed May 7, 2009, the entire contents of which is incorporated herein by reference. U.S. application Ser. No. 12/436,980 is based upon and claims the benefit of priority under 35 U.S.C. §119 from prior European Patent Applications No. 08157549.0, filed Jun. 4, 2008; No. 08157548.2, filed Jun. 4, 2008; No. 08158291.8, filed Jun. 13, 2008; and No. 08158289.2, filed Jun. 13, 2008.

The present invention is directed to a new frame and signalling pattern structure for multi-carrier systems.

The present invention is hereby mainly directed (but not limited) to broadcast systems, such as for example cable based or terrestrial digital broadcast systems, in which content data, signalling data, pilot signals and so forth are mapped on to a plurality of frequency carriers, which are then transmitted in a given overall or complete transmission bandwidth. The receiver typically tunes to a partial channel (part of the overall transmission bandwidth) out of the complete transmission bandwidth (sometimes called segmented reception) in order to receive only the content data which is necessary or wanted by the respective receiver. For example, in the ISDB-T standard, the overall channel bandwidth is hereby divided into 13 fixed segments of an equal length (equal number of frequency carriers).

The object of the present invention is therefore to provide a transmission apparatus and method as well as a signal structure for a multi-carrier system, which allows a receiver to be flexibly tuned to any required part of the overall transmission bandwidth.

The above object is achieved by a transmitting apparatus according to claim 1. The transmitting apparatus according to the present invention is adapted to transmit signals in a multi-carrier system on the basis of a frame structure, each frame comprising at least two signalling patterns adjacent to each other in the frequency direction and at least two data patterns, said transmitting apparatus comprising
signalling mapping means adapted to map signalling data on frequency carriers of each of said at least two signalling patterns in a frame, each signalling pattern having the same length,
data mapping means adapted to map data on frequency carriers of said at least two data patterns in a frame,
transforming means adapted to transform said signalling patterns and said data patterns from the frequency domain into the time domain in order to generate a time domain transmission signal, and
transmitting means adapted to transmit said time domain transmission signal.

The above object is further achieved by a transmitting method according to claim 9. The transmitting method according to the present invention is adapted to transmit signals in a multi-carrier system on the basis of a frame structure each frame comprising at least two signalling patterns adjacent to each other in the frequency direction and at least two data patterns, whereby the method comprises the steps of
mapping signalling data on frequency carriers of each of said at least two signalling patterns in a frame, each signalling pattern having the same length,
mapping data on frequency carriers of said at least two data patterns in a frame,
transforming said signalling patterns and said data patterns from the frequency domain into the time domain in order to generate a time domain transmission signal, and
transmitting said time domain transmission signal.

The above object is further achieved by a frame pattern according to claim 10. The frame pattern of the present invention is adapted for a multi-carrier system and comprises at least two signalling patterns adjacent to each other in the frequency direction and at least two data patterns, wherein signalling data are mapped on frequency carriers of each of said at least two signalling patterns in the frame, each signalling pattern having the same length, and wherein data are mapped on frequency carriers of said at least two data patterns in the frame.

The object of the present invention is further to provide a receiving apparatus and method, as well as a system and a method for transmitting and receiving signals in a multi-carrier system, which allow a flexible tuning to any required part of the transmission bandwidth.

The above object is achieved by a receiving apparatus according to claim 11. The receiving apparatus according to the present invention is adapted to receive signals in a multi-carrier system on the basis of a frame structure in a transmission bandwidth, each frame comprising at least two signalling patterns adjacent to each other in the frequency direction each with signalling data mapped on frequency carriers and at least two data patterns with data mapped on frequency carriers, each of said at least two signalling patterns having the same length, said receiving apparatus comprising receiving means adapted to be tuned to and to receive a selected part of said transmission bandwidth, said selected part of said transmission bandwidth having at least the length of one of said signalling patterns and covering at least one data pattern to be received, and evaluation means adapted to evaluate the signalling data comprised in a received signalling pattern in order to enable the receipt of said at least two data patterns.

The above object is further achieved by a receiving method according to claim 22. The receiving method of the present invention is adapted to receive signals transmitted in a multi-carrier system on the basis of a frame structure in a transmission bandwidth, each frame comprising at least two signalling patterns adjacent to each other in the frequency direction each with signalling data mapped on frequency carriers and at least two data patterns with data mapped on frequency carriers, each of said at least two signalling patterns having the same length, comprising the steps of
receiving a selected part of said transmission bandwidth, said selected part of said transmission bandwidth having at least the length of one of said signalling patterns and covering at least one data pattern to be received, and
evaluating the signalling data comprised in a received signalling pattern in order to enable the receipt of said at least two data patterns.

The above object is further achieved by a system for transmitting and receiving signals according to claim 23, comprising a transmitting apparatus for transmitting signals in a multi carrier system on the basis of a frame structure, each frame comprising at least two signalling patterns adjacent to each other in the frequency direction and at least two data patterns, said transmitting apparatus comprising
signalling mapping means adapted to map signalling data on frequency carriers of each of said at least two signalling patterns in a frame, each signalling pattern having the same length, data mapping means adapted to map data on frequency carriers of said at least two data patterns in a frame, transforming means adapted to transform said signalling patterns and said data patterns from the frequency domain into the time domain in order to generate a time domain transmission signal, and transmitting means adapted to transmit said time domain transmission signal, said system further comprising a receiving apparatus according to the present invention adapted to receive said time domain transmission signal from said transmitting apparatus.

The above object is further achieved by a method for transmitting and receiving signals according to claim 24, comprising a transmitting method for transmitting signals in a multi carrier system on the basis of a frame structure, each frame comprising at least two signalling patterns adjacent to each other in the frequency direction and at least two data patterns, said transmitting method comprising the steps of mapping signalling data on frequency carriers of each of said at least two signalling patterns in a frame, each signalling pattern having the same length, mapping data on frequency carriers of said at least two data patterns in a frame, transforming said signalling patterns and said data patterns from the frequency domain into the time domain in order to generate a time domain transmission signal, and transmitting said time domain transmission signal, said method further comprising a receiving method according to the present invention adapted to receive said time domain transmission signal.

The present invention therefore suggests a multi-carrier system which uses a frame structure or frame pattern in the frequency domain as well as in the time domain. In the frequency domain, each frame comprises at least two signalling patterns, which respectively carry signalling data or information on frequency carriers and respectively have the same length (or bandwidth). After a conversion into the time domain, in the resulting time domain signal, each frame then comprises a respective signalling symbol as well as data symbols. Each frame pattern covers the entire or overall transmission bandwidth in the frequency direction, so that the overall transmission bandwidth is therefore equally divided by the signalling patterns having the same respective length. The data patterns of each frame then follow the signalling patterns in time. The receiving apparatus can be freely and flexibly tuned to any wanted part of the transmission bandwidth, provided that the part of the transmission bandwidth to which the receiving apparatus can be tuned has at least the length of one of the signalling patterns. Hereby, the receiving apparatus is always able to receive the signalling data of an entire signalling pattern, so that on the basis and using the signalling data comprising the physical layer information necessary for the receipt of the succeeding data patterns, the data patterns can be received in the receiving apparatus.

Advantageously each frame comprises at least two additional signalling patterns succeeding said at least two signalling patterns in the time dimension, each of said additional signalling patterns having the respective same length as the corresponding one of said at least two preceding signalling patterns. Hereby, even if the length (or bandwidth) of each signalling pattern is not long enough to comprise all necessary signalling data, it is possible to transmit the necessary remaining signalling data in the additional signalling data. Even if the receiving apparatus has a rather small (effective) receiving bandwidth, it is thus possible to transmit and receive all necessary signalling data.

Further advantageously, each frame comprises at least two training patterns, wherein pilot signals are mapped on frequency carriers of each training pattern in a frame, and wherein the signalling patterns are aligned to the training patterns in the frequency direction. Hereby, by means of the training patterns which precede the signalling patterns in the time direction, the receiving apparatus which first receives the training pattern is able to perform time, synchronisation, frequency offset calculation and/or channel estimation, where after the signalling data in the received signalling patterns can be received and used to receive the succeeding data patterns independent of the tuning position of the receiving apparatus. For example, every training pattern has the same length, and the length of each signalling pattern is the same as the length of each of said training patterns. Alternatively, every training pattern has the same length, and the length of each signalling pattern is smaller than the length of each of said training patterns. Hereby, the length of each signalling pattern may be half the length of each of said training patterns. Implementations may be possible in which the signalling patterns are not aligned with the training patterns.

Advantageously, each signalling pattern comprises at least one guard band. Hereby, it is ensured that the receiving apparatus can receive all signalling data in a signalling pattern even in the case that the effective receiving bandwidth is smaller that the tuning bandwidth, e.g. due to filter characteristics or the like. Hereby, each signalling pattern may comprise a guard band at its beginning and a guard band at its end.

Advantageously, each signalling pattern of each frame comprises the location of the signalling pattern within the frame, which is extracted and evaluated on the receiving side. In this case, further advantageously, each signalling pattern in each frame could comprise the identical signalling data except the location of the respective signalling pattern in the frame, which is different in at least some of the signalling patterns in a frame. Hereby, the receiving apparatus is able to determine its position within the overall transmission bandwidth (within each frame) for example during the initialisation period, in which the receiving apparatus is tuned to an arbitrary position within a frame, and then to tune to the bandwidth enabling the receipt of the wanted data on the basis of the signalling data in the received signalling pattern.

Further advantageously, the signalling patterns of each frame comprise signalling data indicating the number of data patterns comprised in the frame. Further advantageously, the structure of the signalling data in the signalling patterns supports a limited maximum number of data patterns in the frequency direction of each frame. Further, the signalling patterns of each frame may comprise individual signalling data for each data pattern comprised in the frame.

Further advantageously, the signalling data of the signalling patterns comprise an error detection and/or correction coding. Hereby, even if a receiving apparatus cannot receive an entire signalling pattern, the receiving apparatus may still be able to obtain the entire signalling information contained in the signalling pattern.

Although the receiver can be flexibly tuned to any wanted part of the transmission bandwidth, it is always possible to receive the signalling data of an entire signalling pattern due to the new frame structure suggested by the present invention.

Advantageously, the receiving apparatus comprises a reconstructing means adapted to reconstruct the original signalling pattern from said received selected part of said transmission bandwidth. Hereby, said reconstructing means may be adapted to rearrange received signalling signals into the original signalling pattern in case that the selected part of said transmission bandwidth to which the receiving means is tuned does not match with the signalling pattern structure. Thus, even if the selected part of the transmission bandwidth to which the receiver is tuned does not completely and correctly match with one of the signalling patterns (in the frequency direction), the receiver will in such cases receive the last part of a (frequency wise) preceding signalling pattern and the first part of a (frequency wise) succeeding signalling pattern. For example, in case that the receiving apparatus knows its (frequency dimension) offset from the signalling pattern structure in each frame, said reconstructing means may be adapted to rearrange received signalling signals into the original signalling pattern. Alternatively, each frame comprises at least two additional signalling patterns succeeding said at least two signalling patterns in the time dimension, each of said additional signalling patterns having the respective same length as the corresponding one of said at least two preceding signalling patterns, wherein said reconstructing means is adapted to rearrange received two or more signalling patterns succeeding each other in the time dimension into the original signalling pattern. Thus, the preceding signalling pattern and the succeeding signalling pattern can together comprise the necessary signalling data even if the length of the signalling patterns in the frequency dimension is short that in the case where all necessary signalling data are comprised in a single signalling pattern.

Alternatively or additionally, the signalling data of the signalling patterns comprise an error detection and/or correction coding, wherein said reconstructing means is adapted to perform an error detection and/or correction decoding on said received signalling signals in order to reconstruct the original signalling pattern.

Hereby, the transmitted signalling patterns may comprise additional error coding, redundancies or the like enabling the receiver to reconstruct the original signalling pattern even if only a part of the signalling pattern can be received.

Advantageously, each signalling pattern of each frame comprises the location of the signalling pattern within the frame, which is extracted and evaluated on the receiving side. In this case, further advantageously, each signalling pattern in each frame could comprise the identical signalling data except the location of the respective signalling pattern in the frame, which is different in at least some of the signalling patterns in a frame. Hereby, the receiving apparatus is able to determine its position within the overall transmission bandwidth (within each frame) for example during the initialisation period, in which the receiving apparatus is tuned to an arbitrary position within a frame, and then to tune to the bandwidth enabling the receipt of the wanted data on the basis of the signalling data in the received signalling pattern.

Advantageously, the signalling patterns of each frame comprise signalling data with the number of data patterns comprised in the frame, wherein said evaluation means is adapted to extract said signalling data with the number of data patterns from a received signalling pattern. Further advantageously, the signalling patterns of each frame comprise individual signalling data with each data pattern comprised in the frame, wherein said evaluation means is adapted to extract said individual signalling data with each data pattern from a received signalling pattern.

Advantageously, the receiver is adapted to be tuned to and to receive a selected part of said transmission bandwidth so that an optimized receipt of a signalling pattern in the selected part of the transmission bandwidth is enabled. Particularly if the frequency dimension structure of the data patterns and the signalling patterns in a frame do not match, and if the selective part of the transmission bandwidth to be received in the receiver is larger (in frequency dimension) than the data pattern(s) to be received, it may be possible to optimize the tuning so that the best possible receipt of a signalling pattern is achieved, for example by adjusting the tuning so that the maximum part of one entire signalling pattern is received while still receiving the entire wanted data pattern(s).

Generally, it may be advantageous to tune the receiver so that the selective part of the transmission bandwidth is received so that at least one data pattern to be received is centered in relation to the selective part of the transmission bandwidth.

Further advantageously, the receiver can be tuned to receive a selective part of said transmission bandwidth on the basis of signalling information received in a signalling pattern of a previous frame.

Further advantageously, each frame comprises additional data patterns succeeding said at least two data patterns in the time dimension, each of said additional data patterns having the respective same length as the corresponding one of said previous at least two data patterns. In other words, the structure of the data patterns in each frame is advantageously set up in a way that at least two data patterns are arranged next to each other in the frequency dimension so that the entire transmission bandwidth is covered. Additional data patterns are then arranged in the same frame but following the at least two data patterns in the time direction, whereby each additional or following data pattern has the same length (in the frequency dimension or direction) as the previous data pattern in the same frequency position. Thus, if a receiving apparatus is tuned to a specific part of the transmission bandwidth, at least two data patterns per frame are received, each of said data patterns having the same length but following each other in the time dimension. Hereby, the length of each of the data patterns in the transmitting apparatus could be adjusted dynamically. Alternatively or additionally, the number of additional data patterns in the time dimension could be adjusted dynamically. Any dynamic changes in respect to the data patterns will then be signalled in the signalling patterns. The multi-carrier system with the frame structure as suggested by the present invention thus enables a very flexible transmission of data content in which the length of data patterns, and thus the amount of data per data pattern can be dynamically changed, for example from frame to frame or in any other required way. Alternatively, the length and/or the number of the data patterns may be fixed or permanent.

It has to be understood that the present invention can be applied to any kind of multi-carrier system in which a transmitting apparatus is adapted to transmit data in an entire transmission bandwidth and a receiving apparatus is adapted to selectively receive only a part of said entire transmission bandwidth. Non limiting examples for such systems may be existing or future uni-directional or bi-directional broadcast systems, such as wired or wireless (for example cable based, terrestrial etc.) digital video broadcast systems. The non limiting example for a multi-carrier system would be an orthogonal frequency division multiplex (OFDM) system, however, any other suitable system could be used in which signalling data, pilot signals and other kind of data are mapped on a plurality of frequency carriers. The frequency carriers may hereby be equidistant and respectively have the same length (bandwidth). However, the present invention may also be used in multi-carrier systems in which the frequency carriers are not equidistant and/or do not have the respectively same length. Further, it should be understood that the present invention is not limited to any kind of specific frequency range neither in the overall transmission bandwidth applied on the transmitting side nor on the selected part of the transmission bandwidth to which the receiving side is tuned. However, in some applications it might be advantageous to use a receiving bandwidth on the receiving side, i.e. a bandwidth for the part of the transmission bandwidth to which the receiver can be tuned, which corresponds to the bandwidth of receiving devices of existing (digital video broadcast or other) systems. A non limiting example for a receiver bandwidth may be 8 MHz, i.e. the receiving side can be tuned to any wanted 8 MHz bandwidth from the overall transmission bandwidth. Hereby, the overall transmission bandwidth could be a multiple of 8 MHz, for example 8 MHz, 16 MHz, 24 MHz, 32 MHz etc, so that the segmentation of the overall transmission bandwidth, i.e. length of each training pattern could be 8 MHz. However, other segmentations are possible, e.g. (but not limited to) a length of each training pattern of 6 MHz.

Generally, in case of the non limiting example of 8 MHz for the receiver bandwidth, the length of each of the signalling patterns used in the frame structure of the present invention could be 8 MHz, 4 MHz (or less).

Figure 4B:
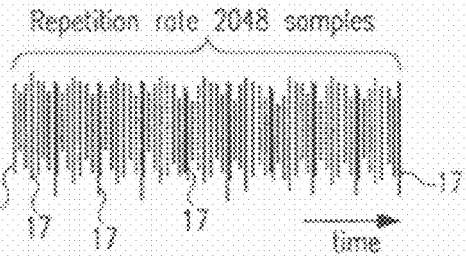
Figure 5A:
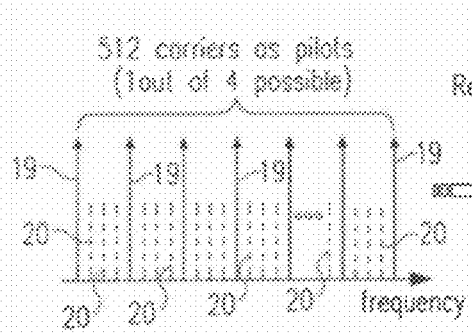
Figure 5B:
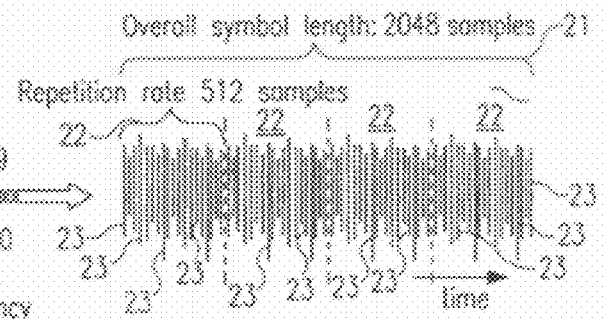
Figure 6:
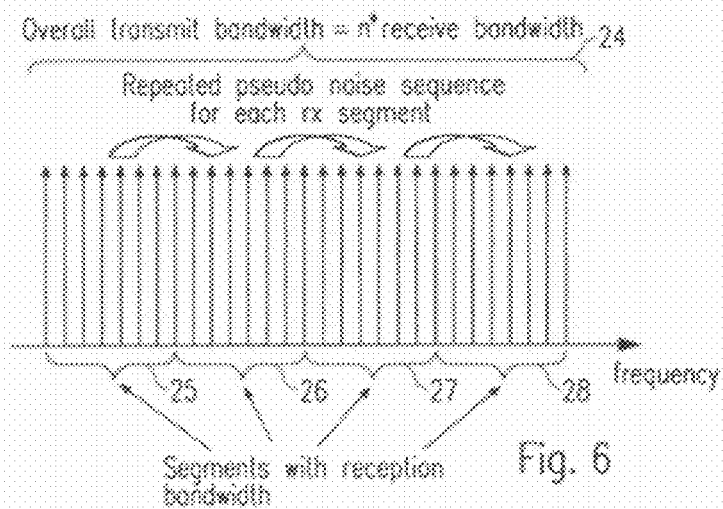

The present invention is explained in more detail in the following description of preferred embodiments in relation to the enclosed drawings, in which FIG. 1 shows a schematic diagram of an entire transmission bandwidth from which a selected part can be selectively and flexibly received by a receiver, FIG. 2 shows an example for a segmentation of the overall transmission bandwidth, FIG. 3 shows a schematic time domain representation of a frame structure according to the present invention, FIG. 4A shows a frequency domain example of a training pattern, FIG. 4B shows a time domain representation of the training pattern of FIG. 4A, FIG. 5A shows a frequency domain representation of a further example of a training pattern, FIG. 5B shows a time domain representation of the training pattern of FIG. 5A, FIG. 6 shows a schematic frequency domain representation of an overall transmission bandwidth with repetitive training patterns according to the present invention.

Figure 7:
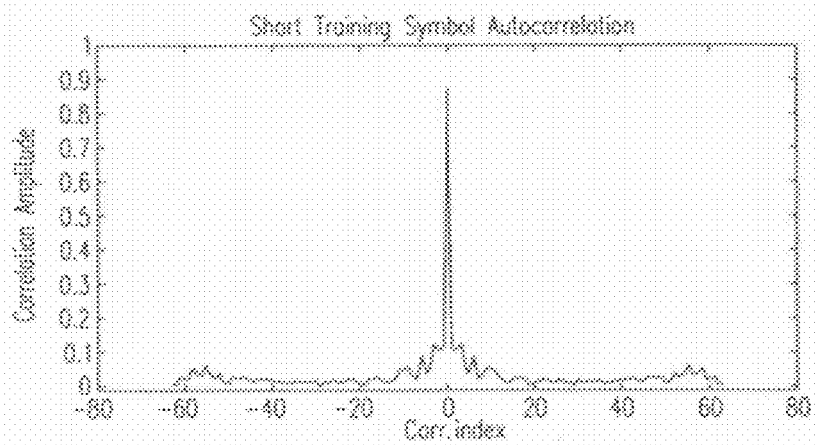
Figure 8:
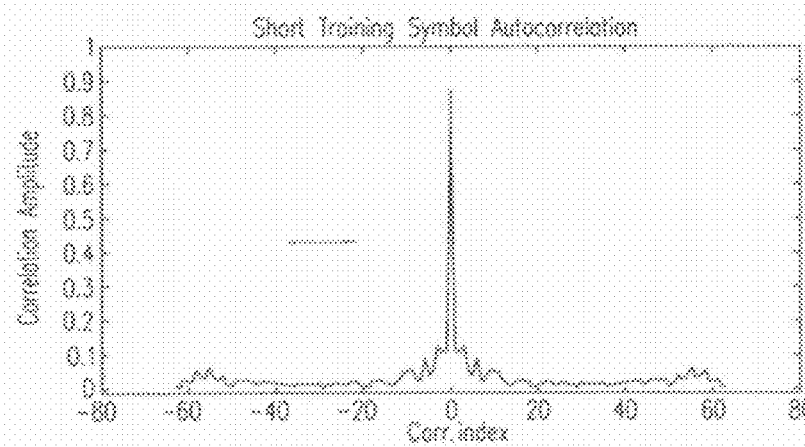
Figure 9:
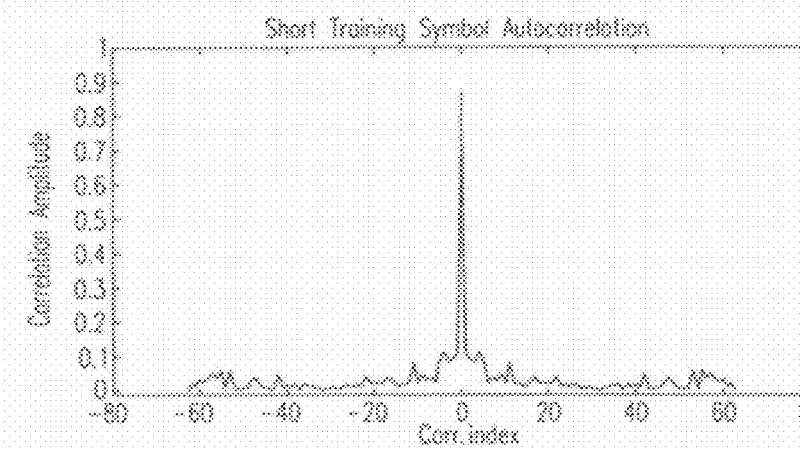
Figure 10:
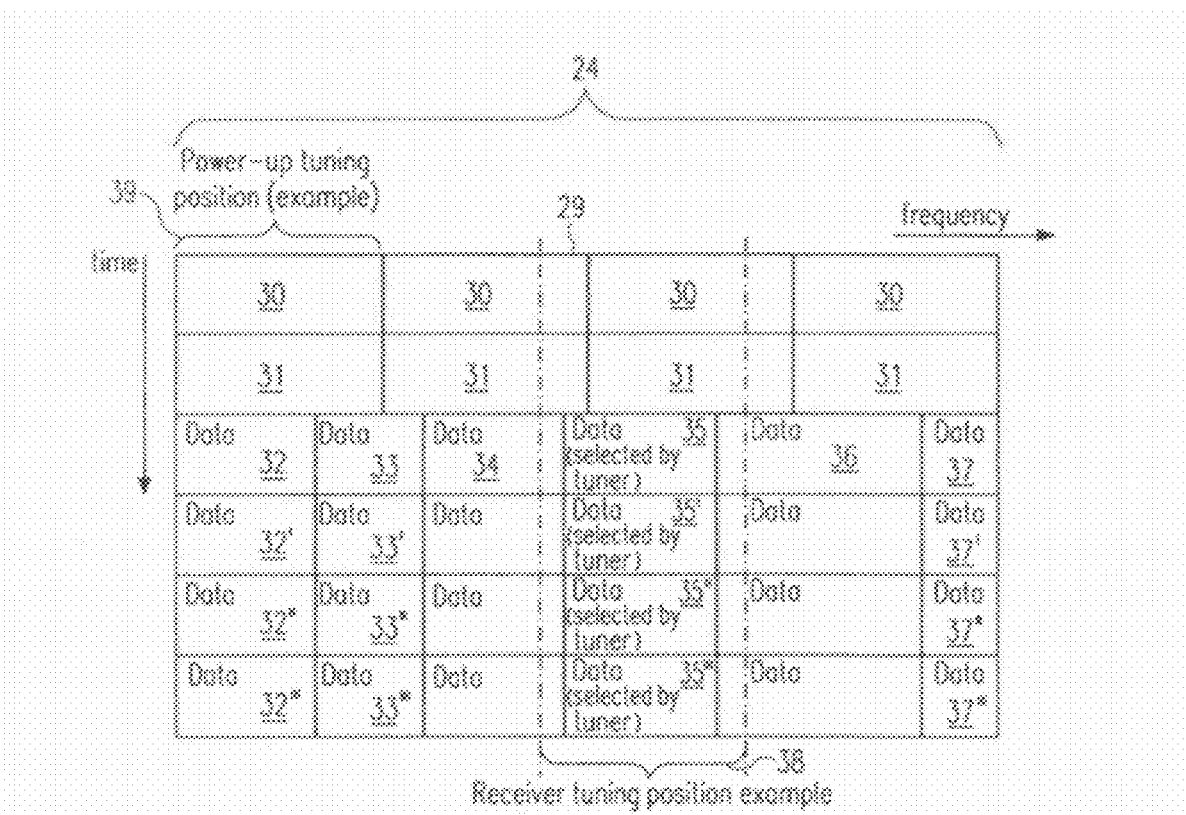
Figure 11:
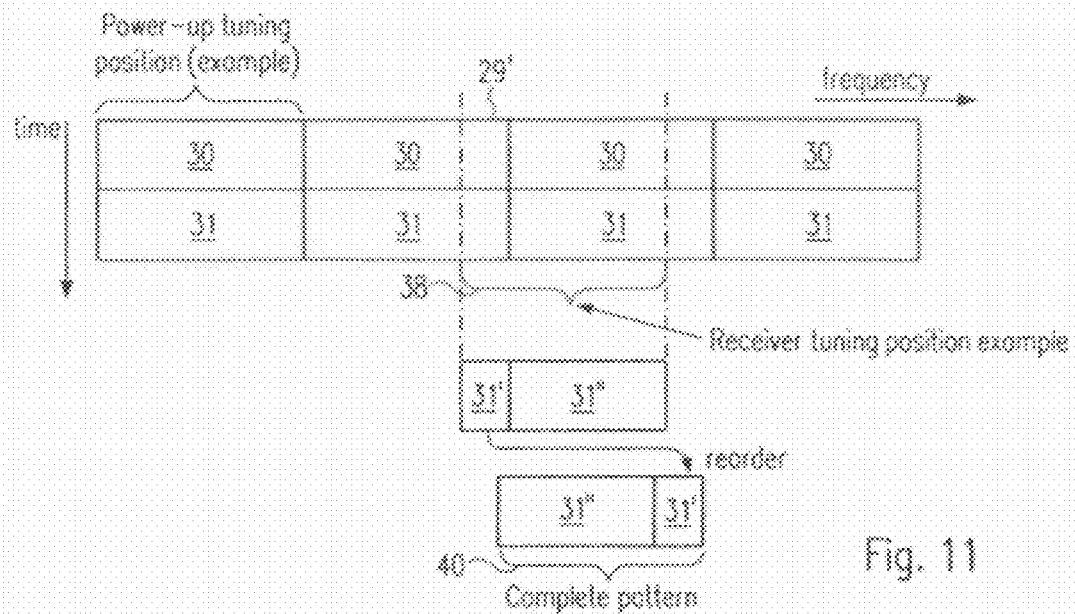
Figure 12:
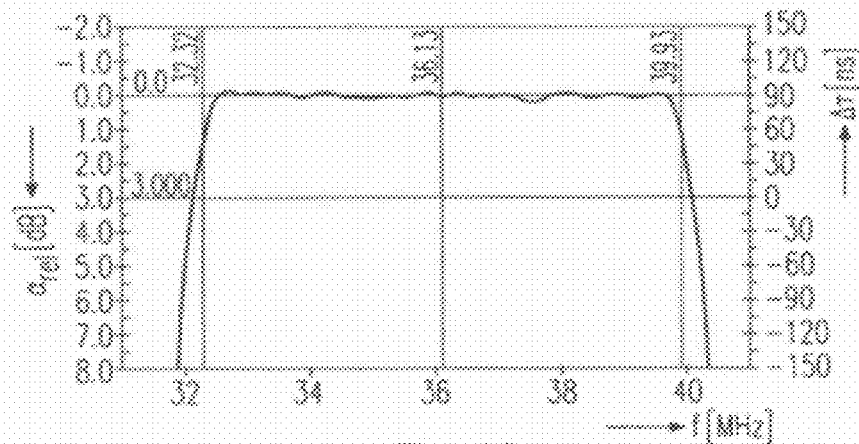
Figure 13:
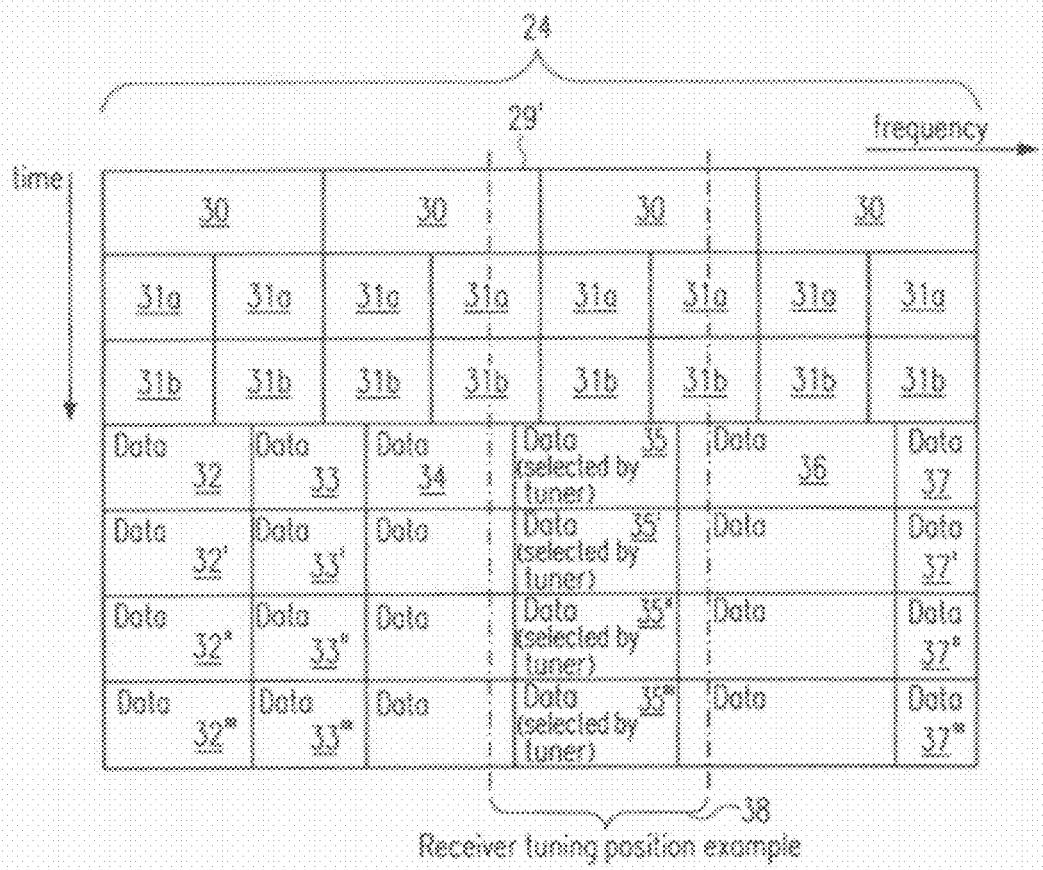
Figure 14:
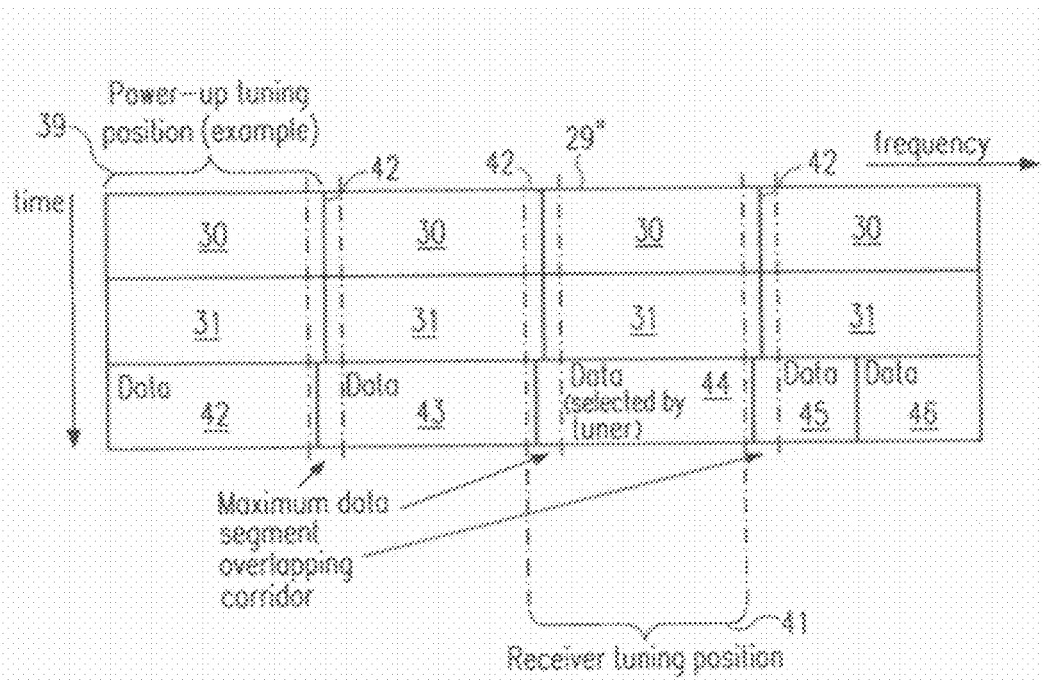
Figure 15:
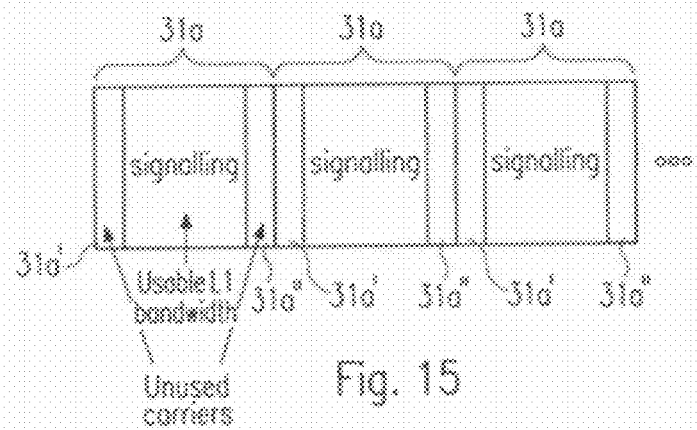
Figure 16:
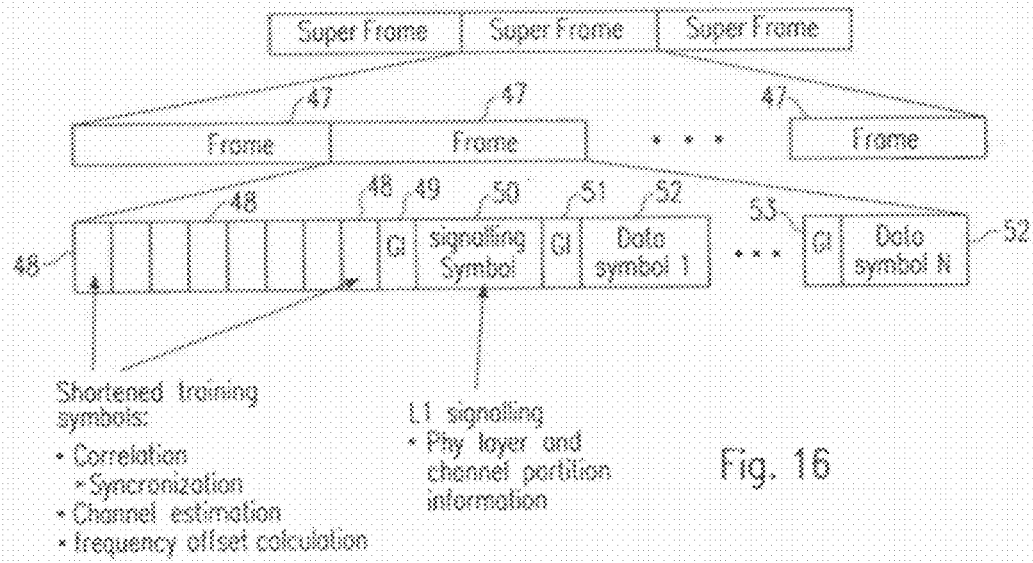
Figure 17:
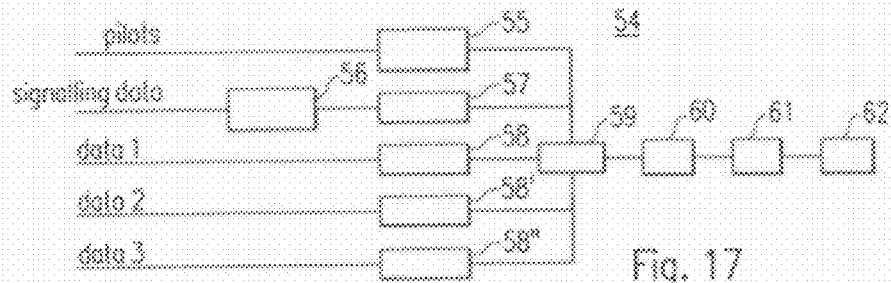
Figure 18:
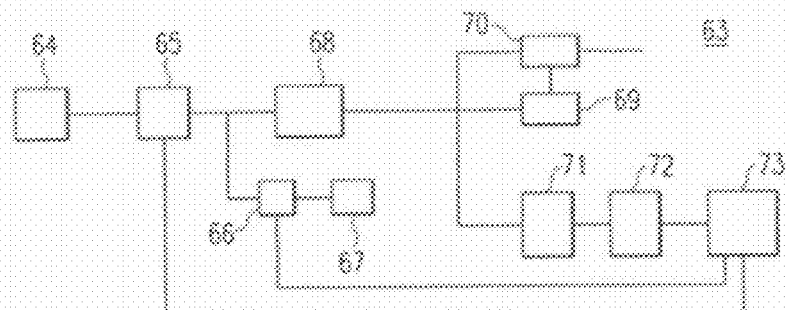
Figure 19:
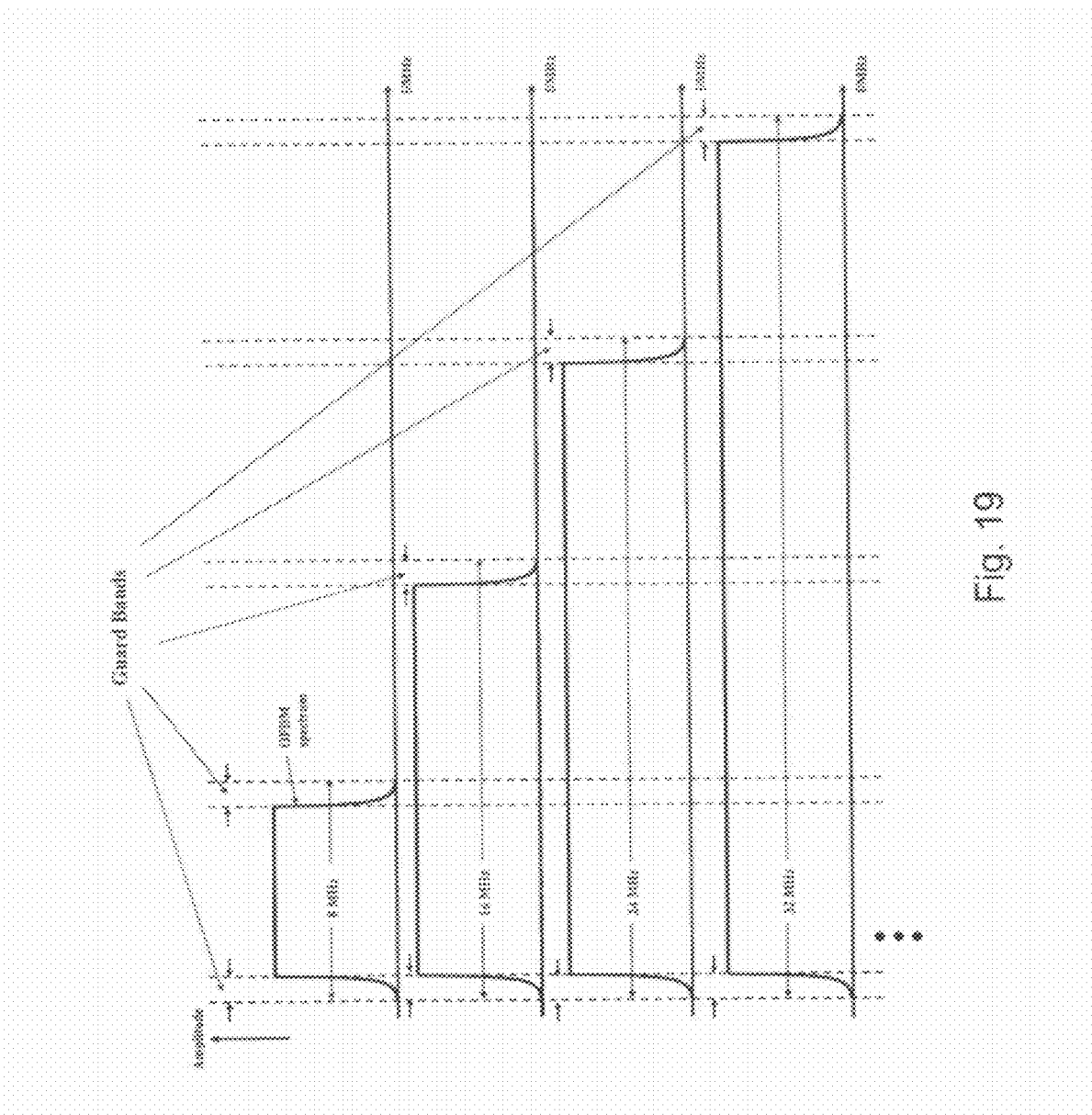
Figure 20:
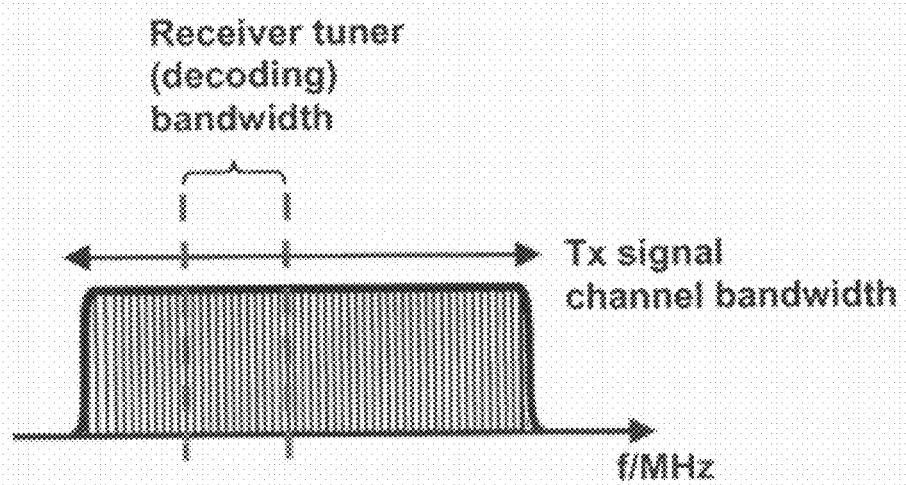
Figure 21:
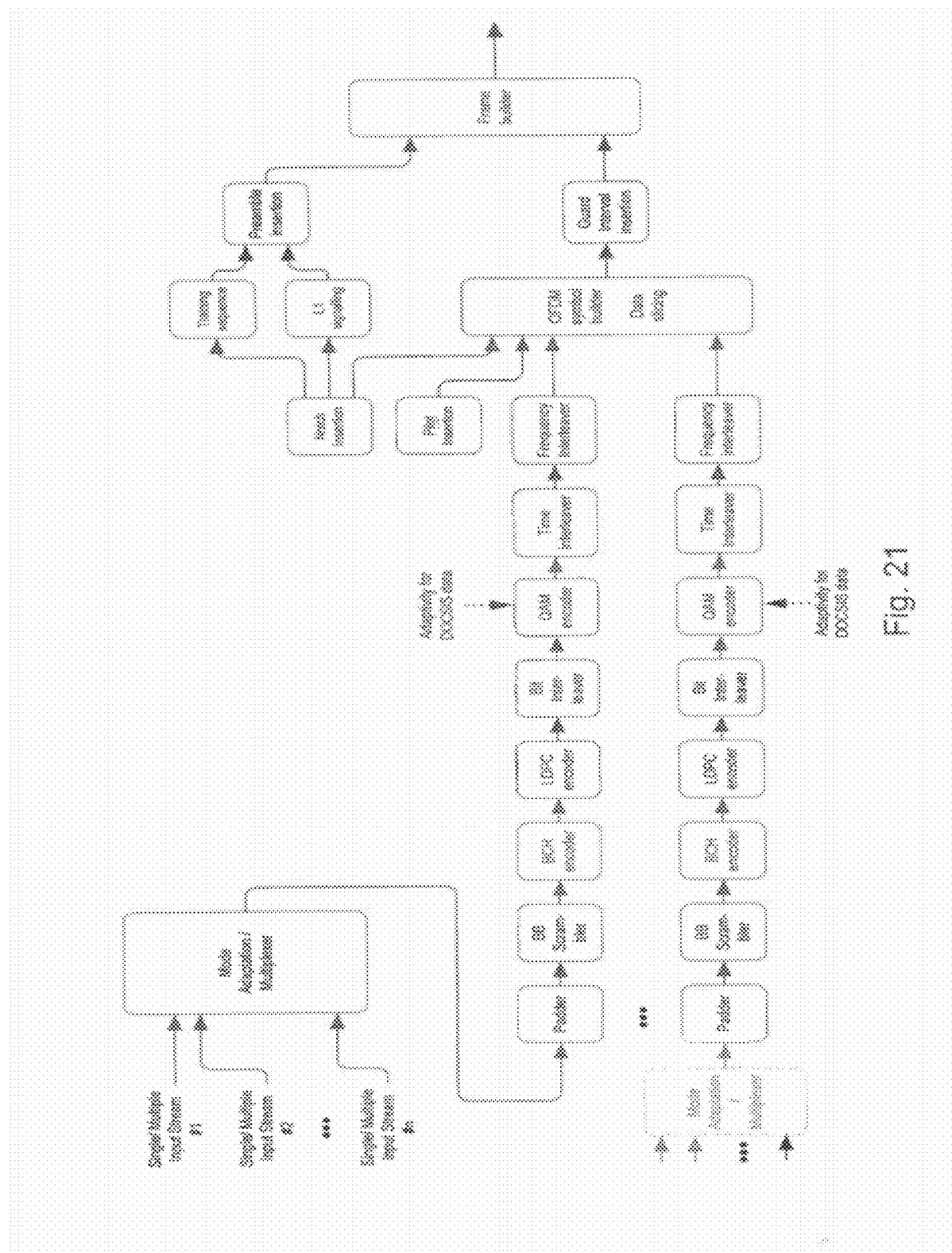
Figure 22:
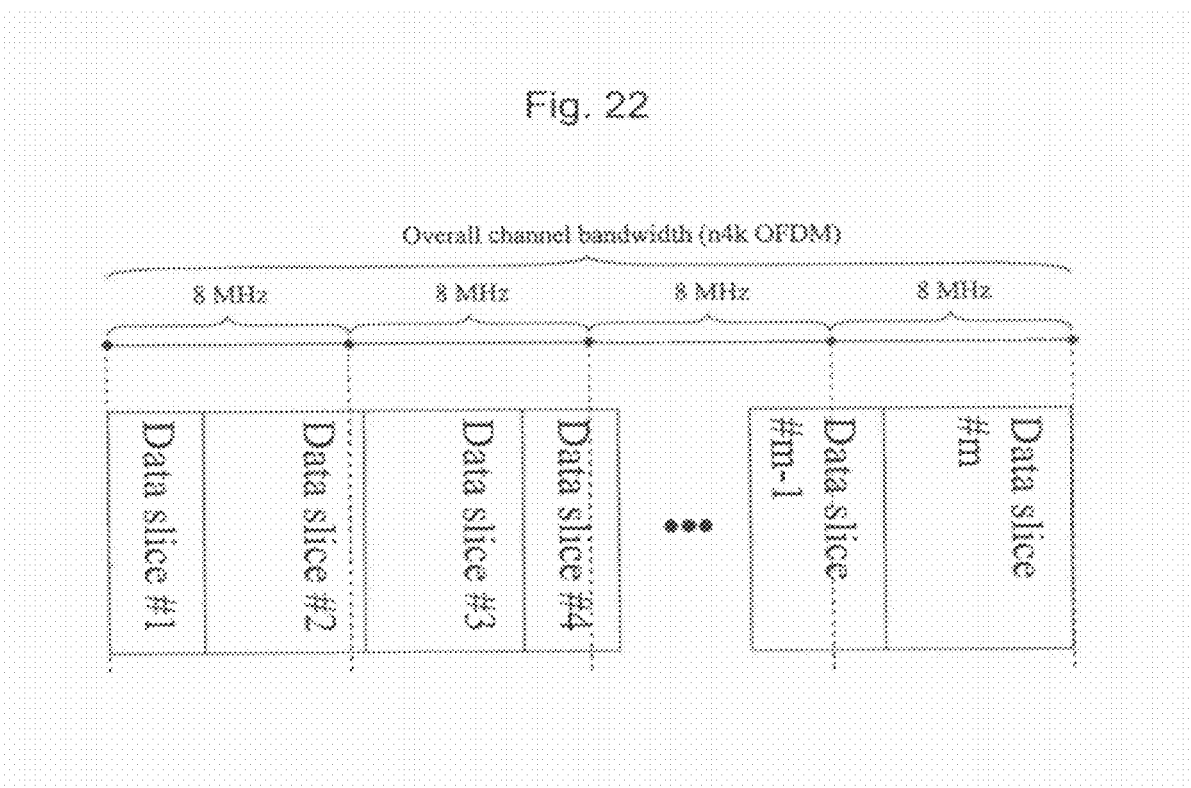
Figure 23:
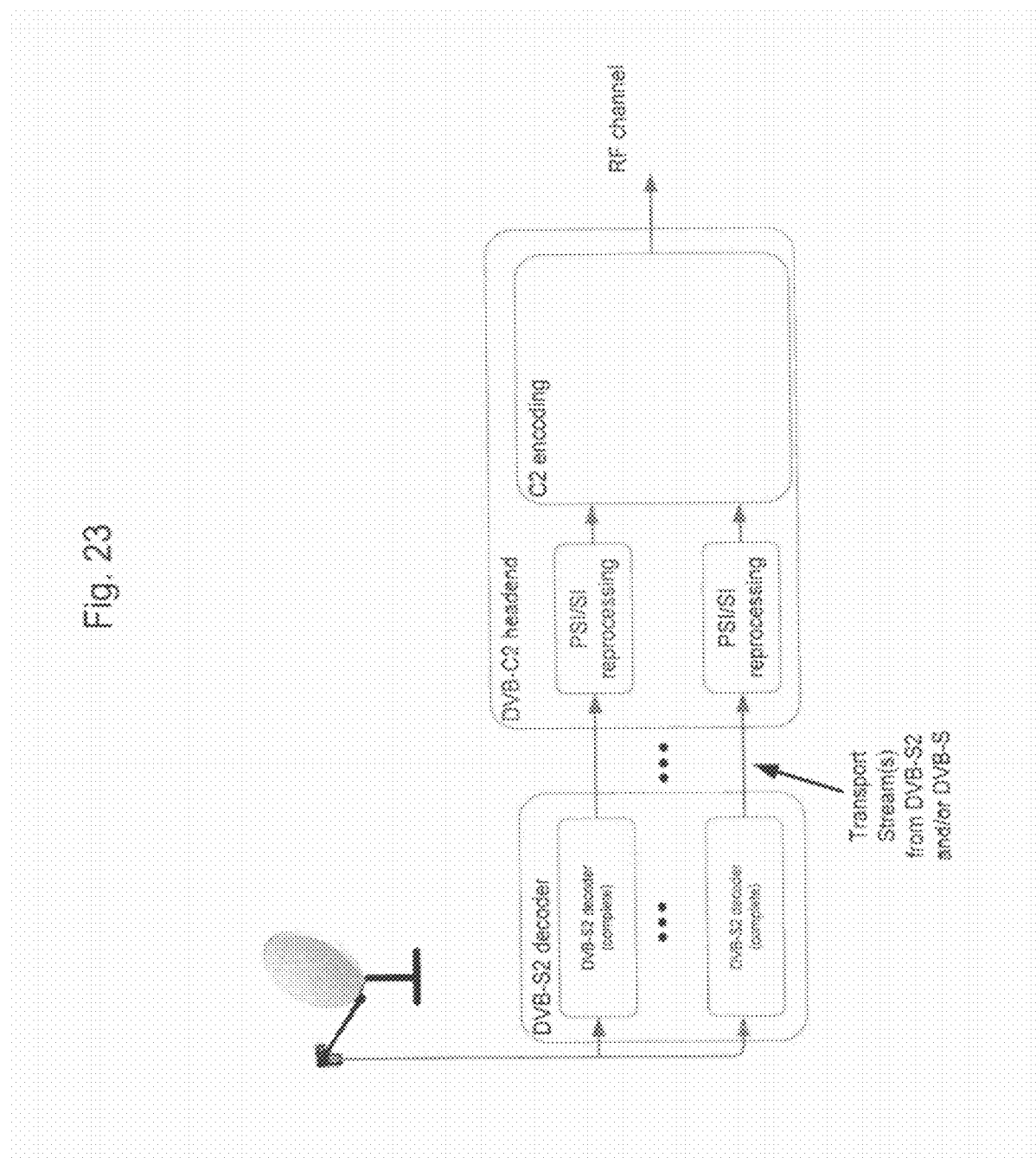
Figure 24:
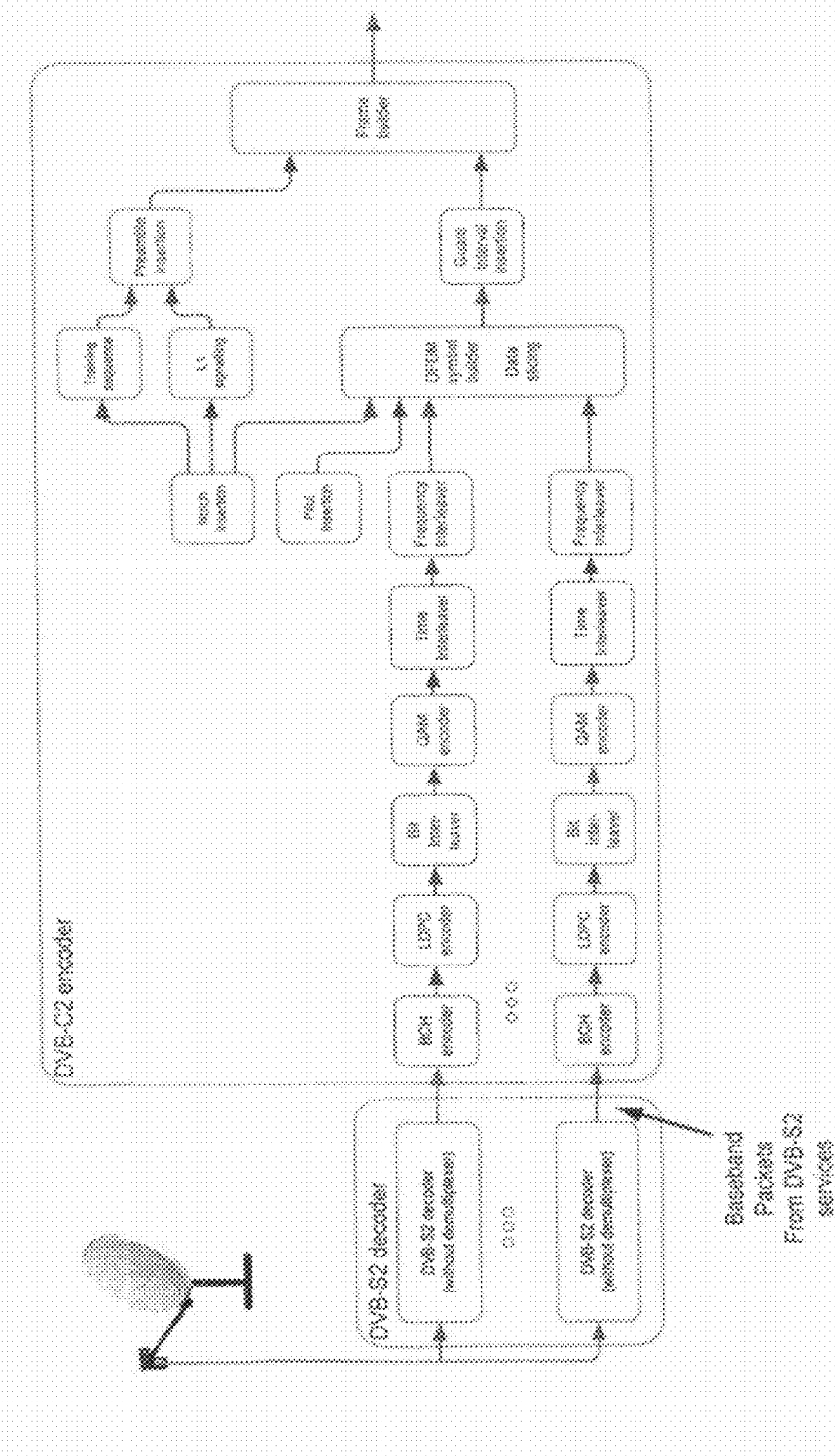
Figure 25:
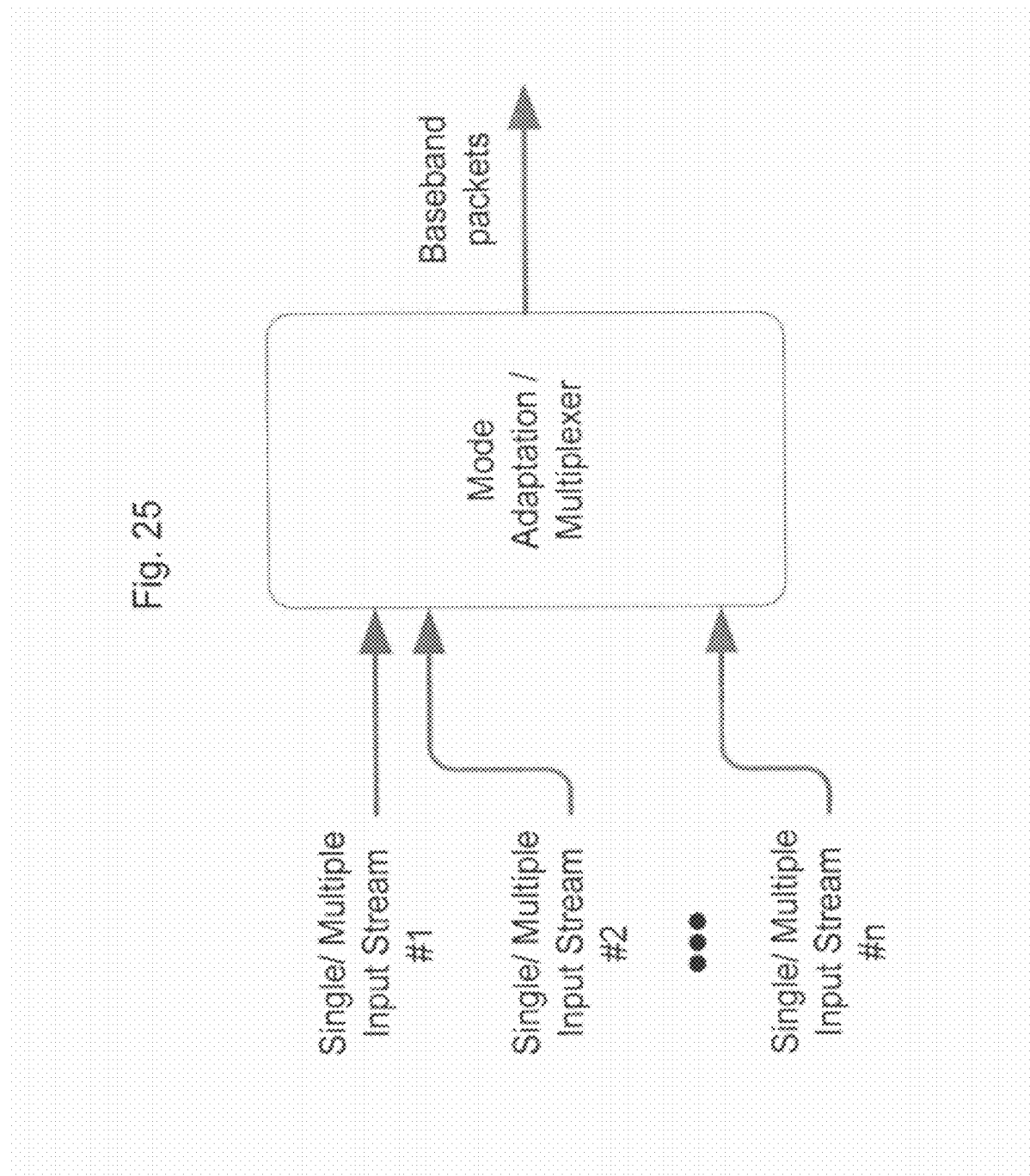
Figure 26:
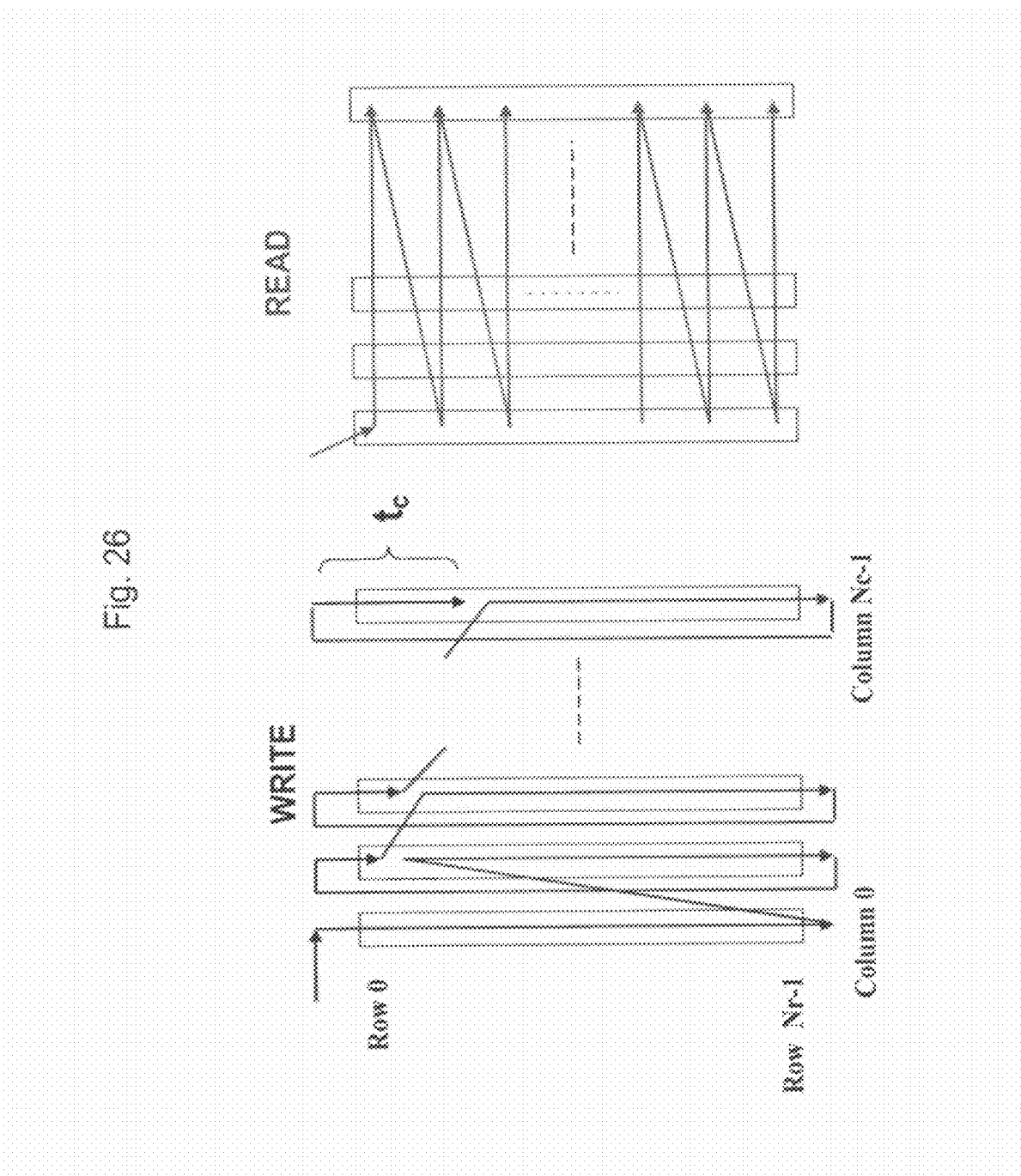
Figure 27:
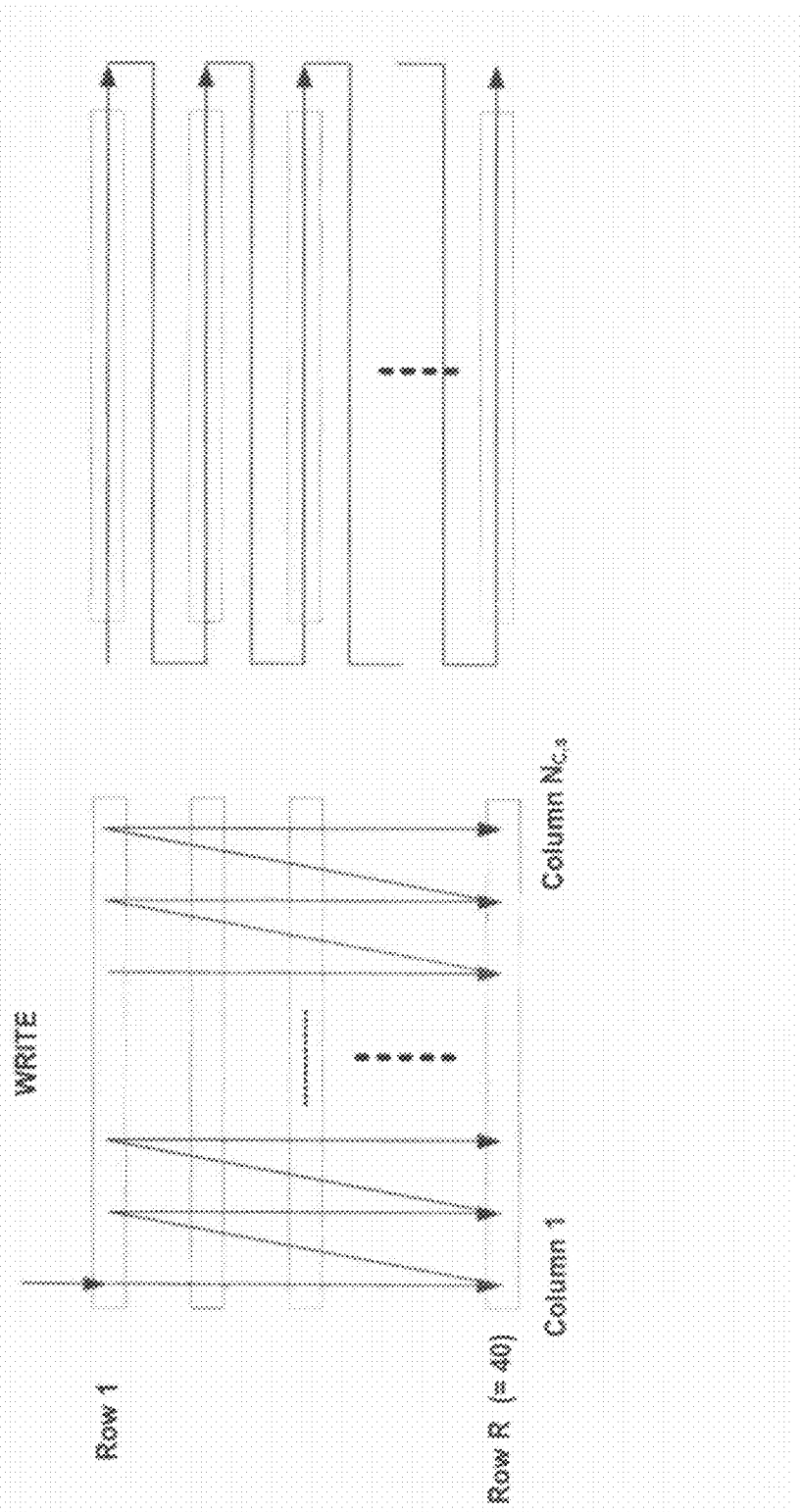
Figure 28:
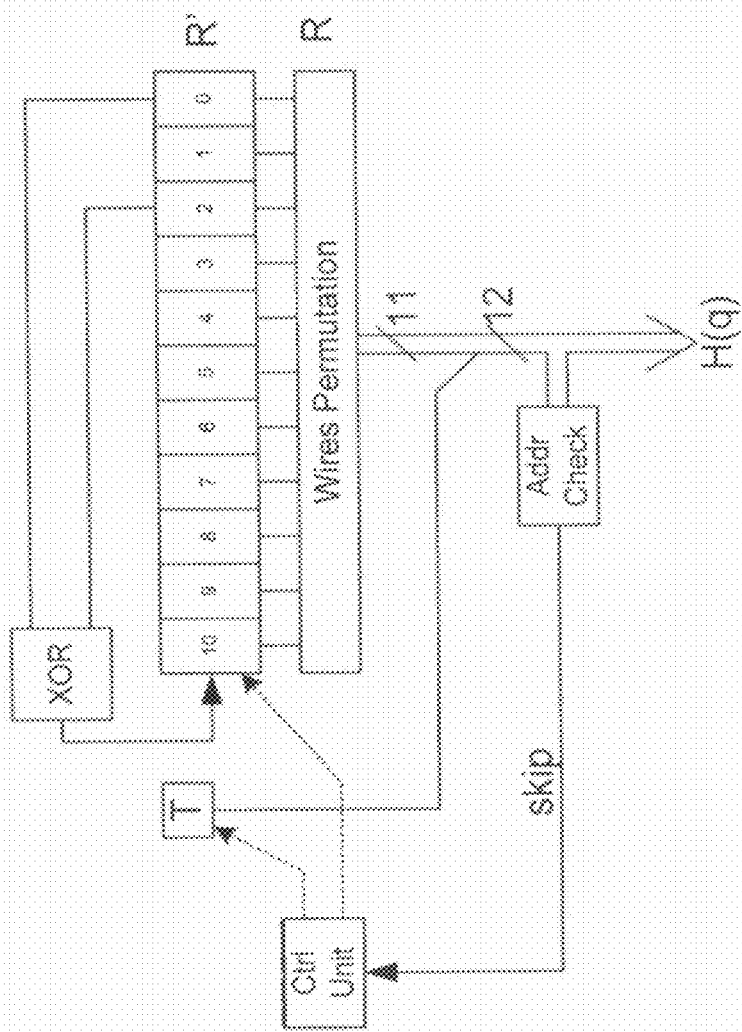
Figure 29:
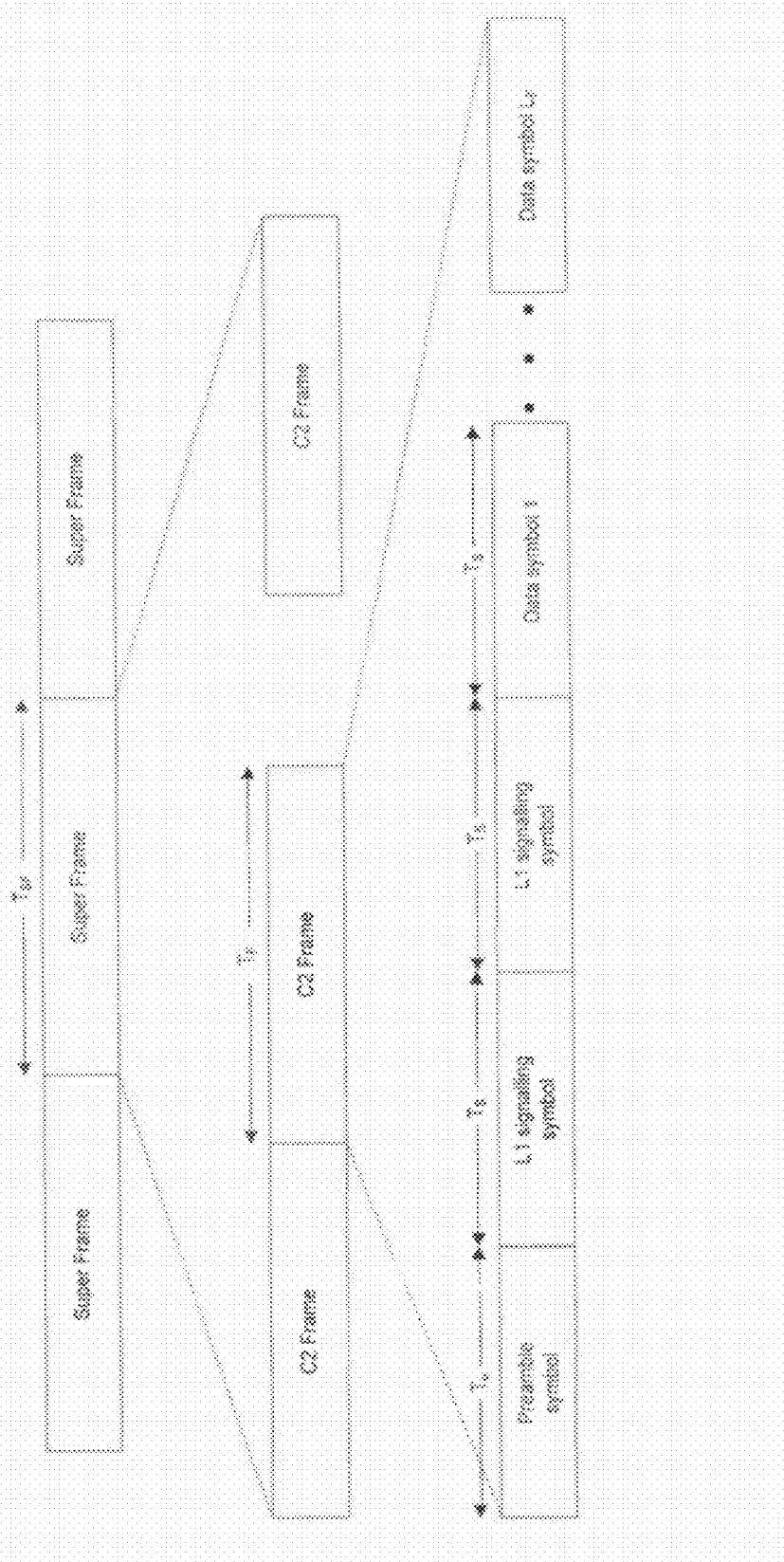
Figure 30:
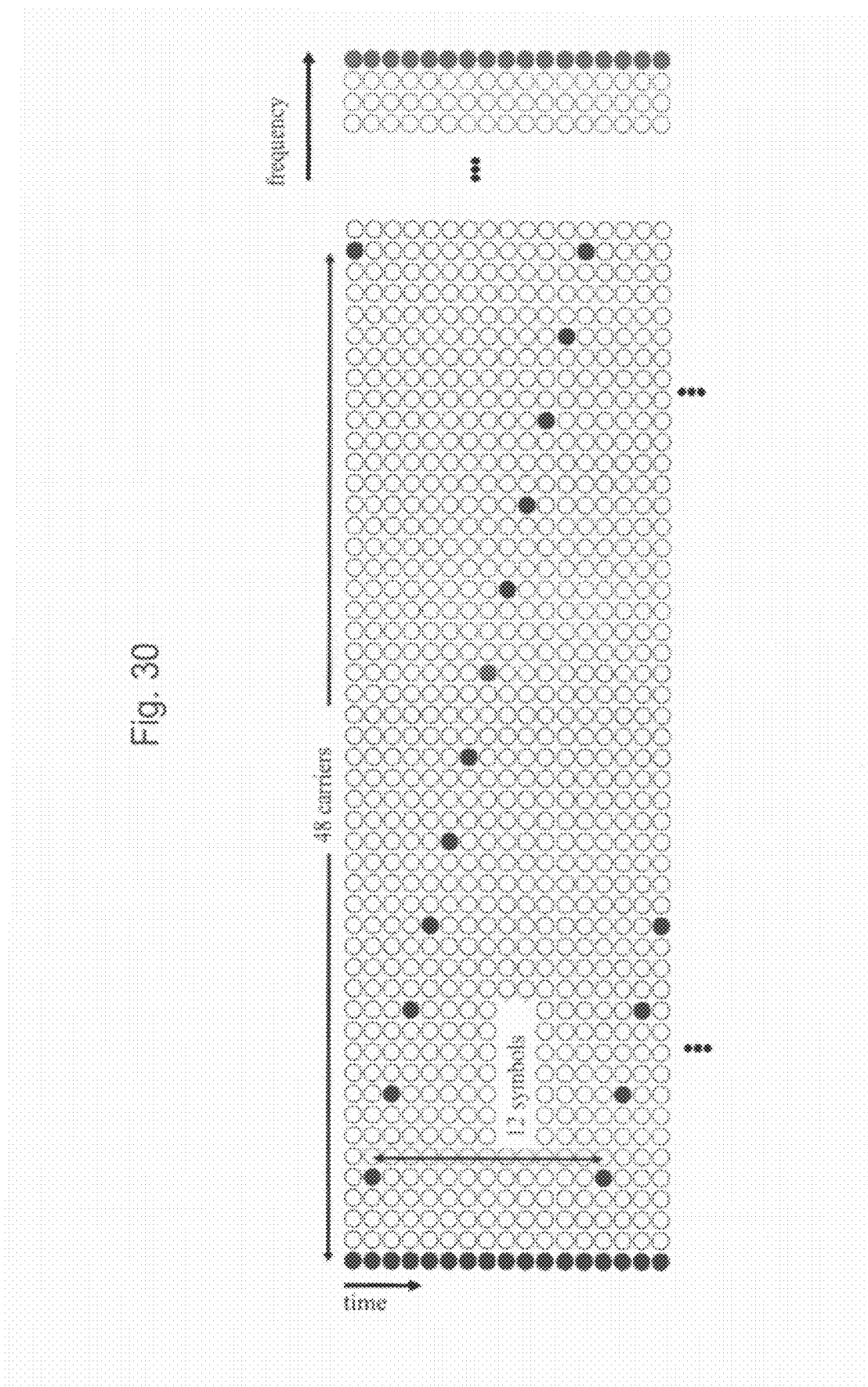

FIG. 7 shows a simulation result of an auto-correlation of multi-carrier system in which the transmission bandwidth is equal to the reception bandwidth, FIG. 8 shows a simulation result for an auto-correlation in which the receiving bandwidth coincides with a training pattern according to the present invention, FIG. 9 shows a simulation result of an auto-correlation in case that the receiving bandwidth does not coincide with a training pattern according to the present invention, FIG. 10 shows a schematic example of a frame structure or pattern according to the present invention, FIG. 11 shows a part of the frame structure of FIG. 10 with an explanation of a reconstruction of a signalling pattern, FIG. 12 shows a schematic example of a receiver filter characteristic, FIG. 13 shows a further example of a frame structure of pattern according to the present invention, FIG. 14 shows a part of a further example of a frame structure or pattern according to the present invention, FIG. 15 shows a schematic representation of signalling patterns with guard bands, FIG. 16 schematically shows an example of a frame structure of the present invention in the time dimension, FIG. 17 shows a schematic block diagram of an example of a transmitting apparatus according to the present invention, and FIG. 18 shows a schematic block diagram of an example of a receiving apparatus according to the present invention FIG. 19 shows example bandwidths of the proposed DVB-C2 OFDM channels, FIG. 20 shows a partial reception of a broader OFDM transmit signal, FIG. 21 shows a top level block diagram of the proposed C2 system, FIG. 22 shows data slicing in the overall channel bandwidth (32 MHz channel example), FIG. 23 shows DVB-S(2) transcoding: Interface is TS level, including PSI/SI processing, FIG. 24 shows a block diagram of a SMATV headend: Baseband packets of DVB-S2 services are used as input data, FIG. 25 shows a mode adaptation for DVB-C2, supporting single and multiple input streams (TS or GS), FIG. 26 shows a bit Interleaving scheme, FIG. 27 shows a time Interleaver, FIG. 28 shows a frequency interleaver address generation scheme for the 4k mode, FIG. 29 shows a C2 Frame Structure, FIG. 30 shows a pilot pattern example (GI length=1/64)

Figure 31:
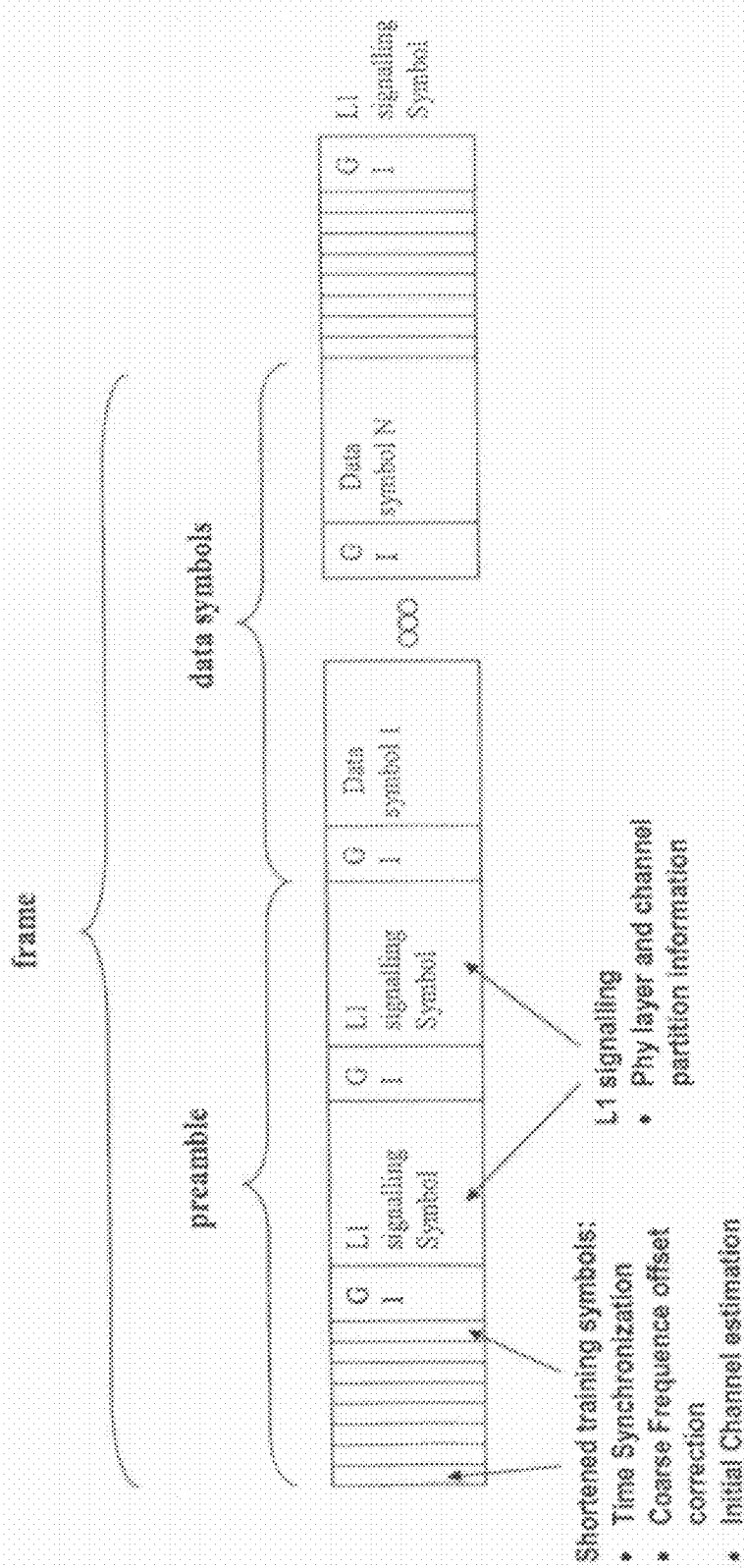

FIG. 31 shows a frame structure of the proposed DVB-C2 system, time domain

Figure 32:
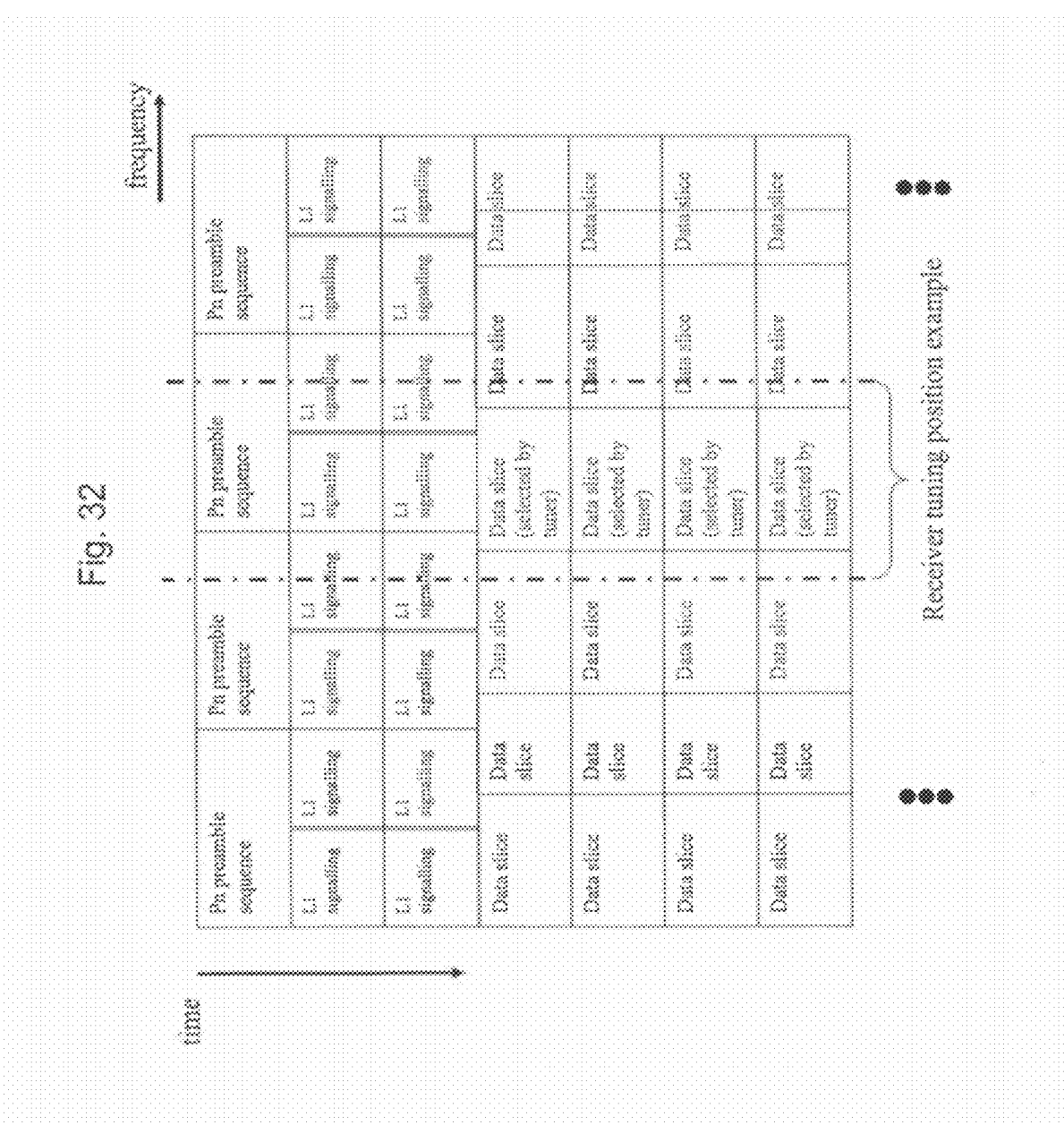
Figure 33:
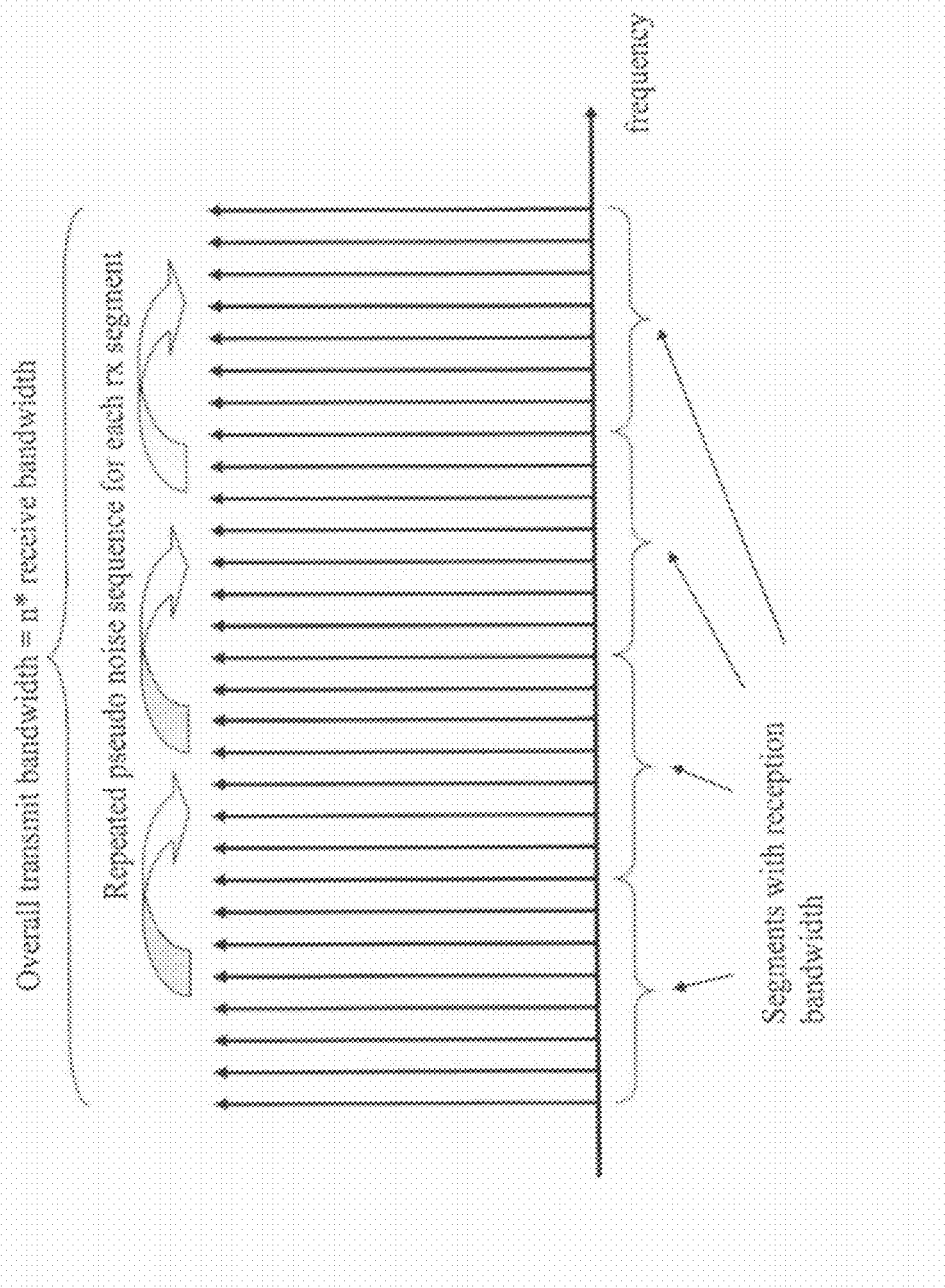
Figure 34:
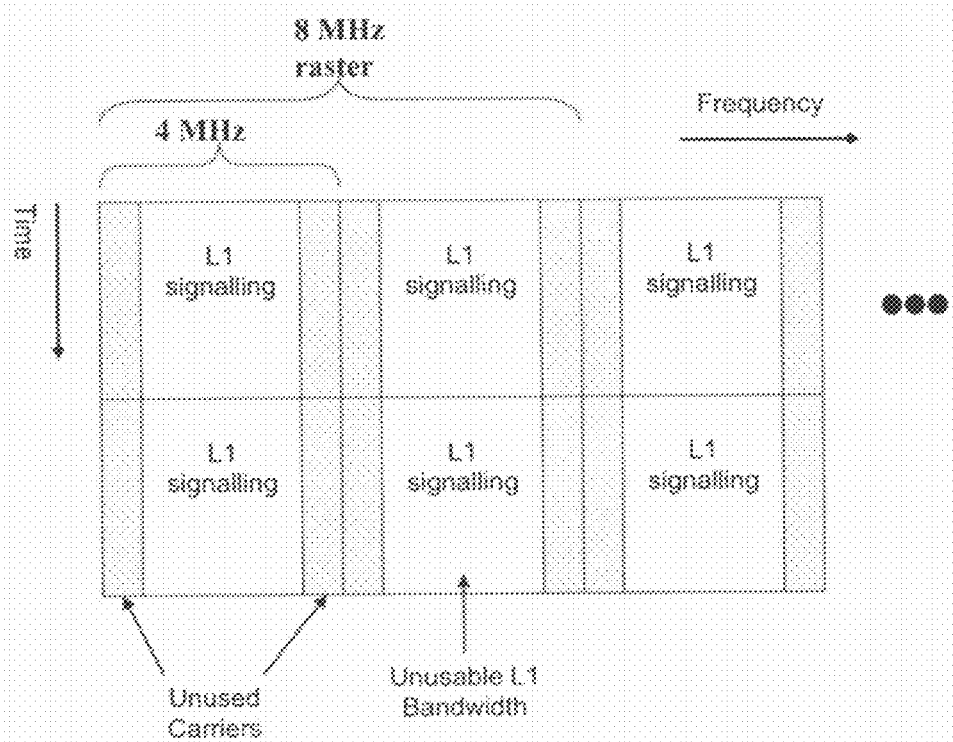
Figure 35:
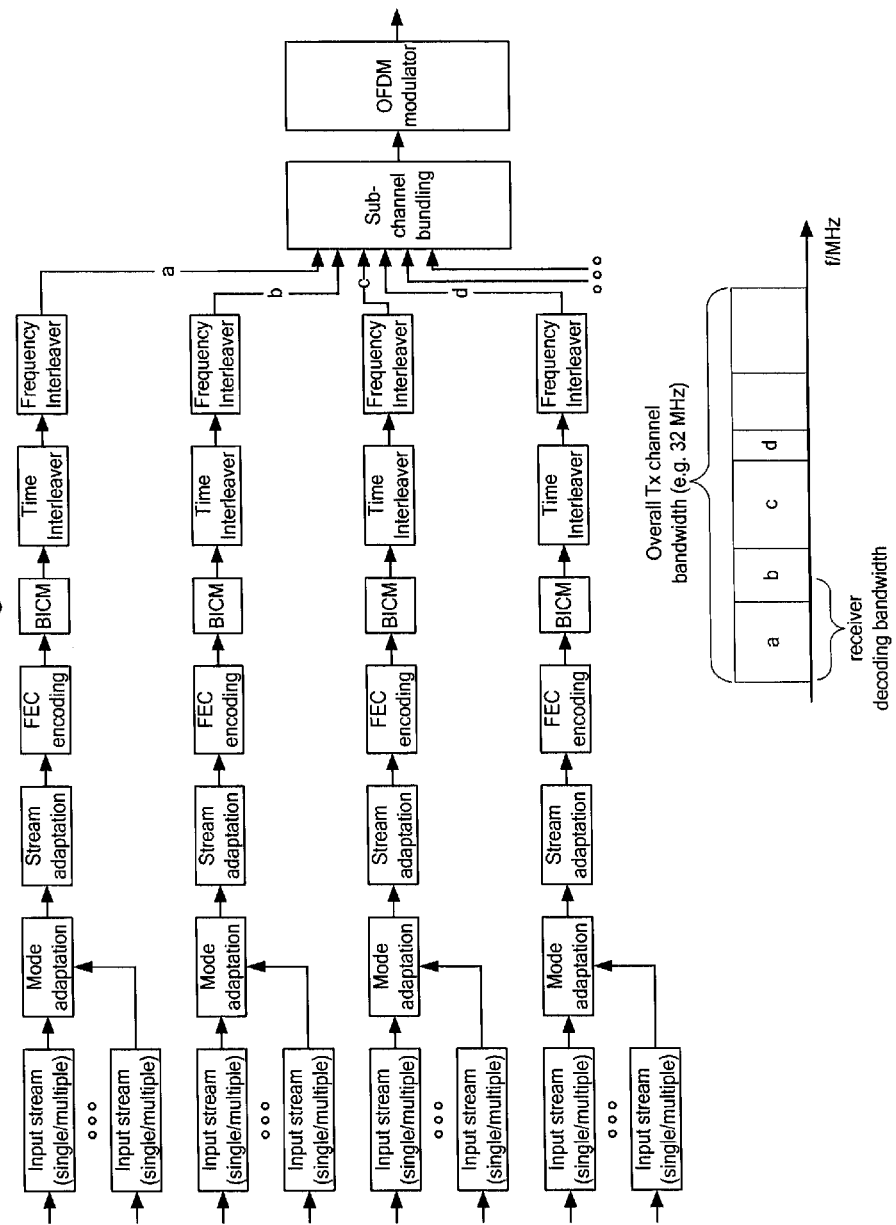
Figure 36:
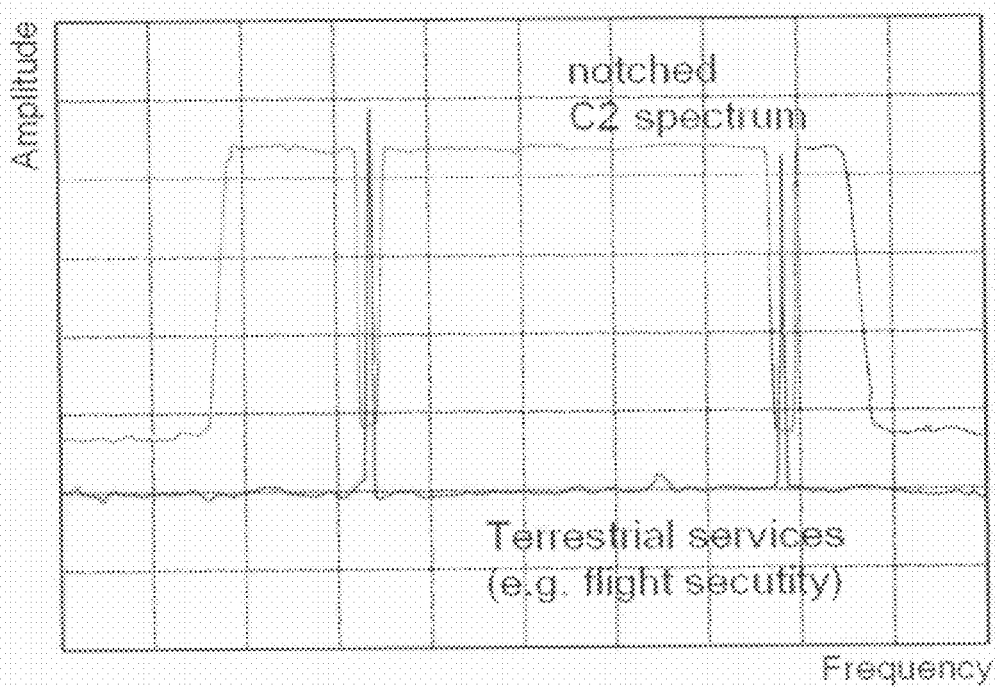
Figure 37:
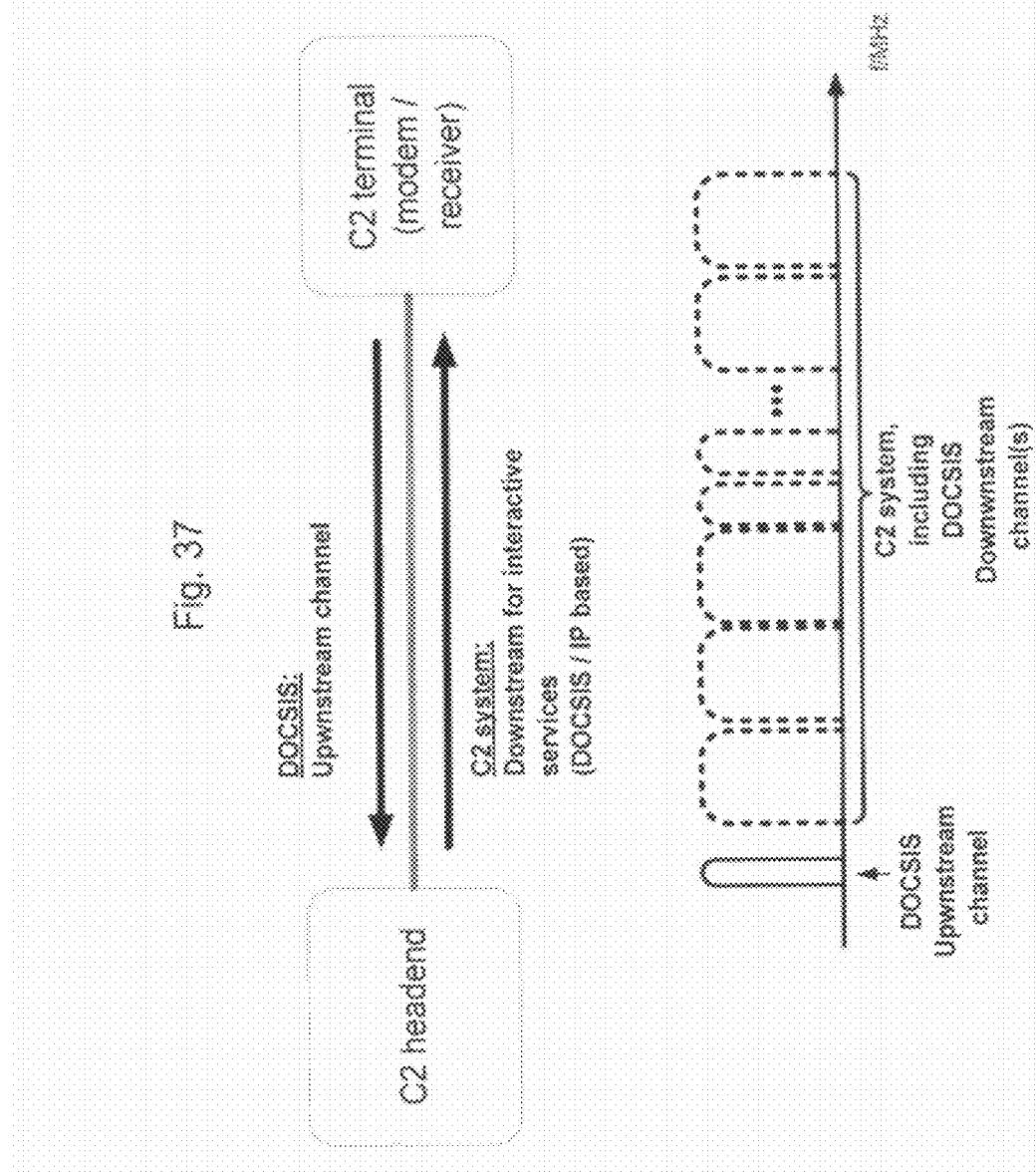
Figure 38:
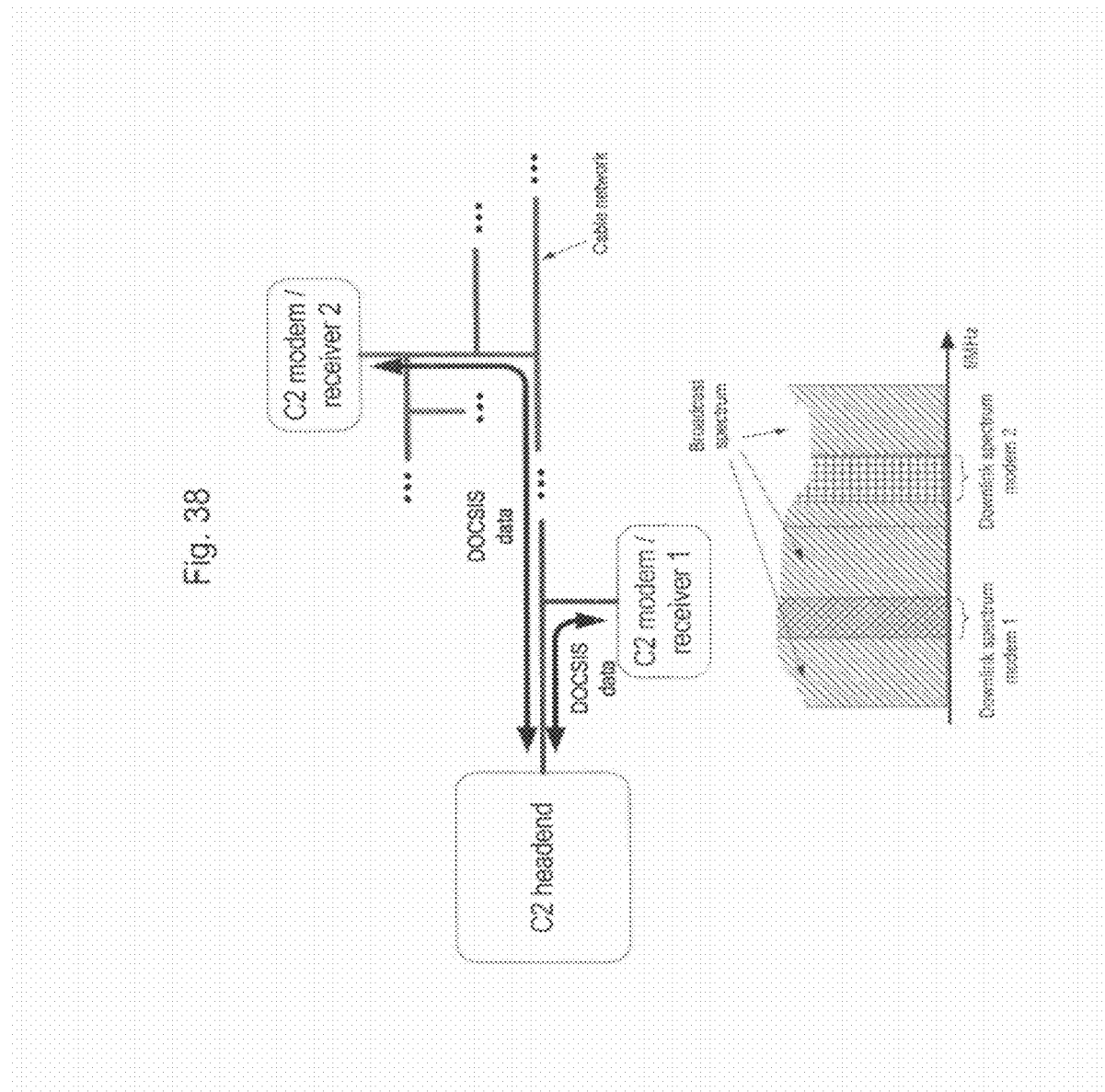
Figure 39:
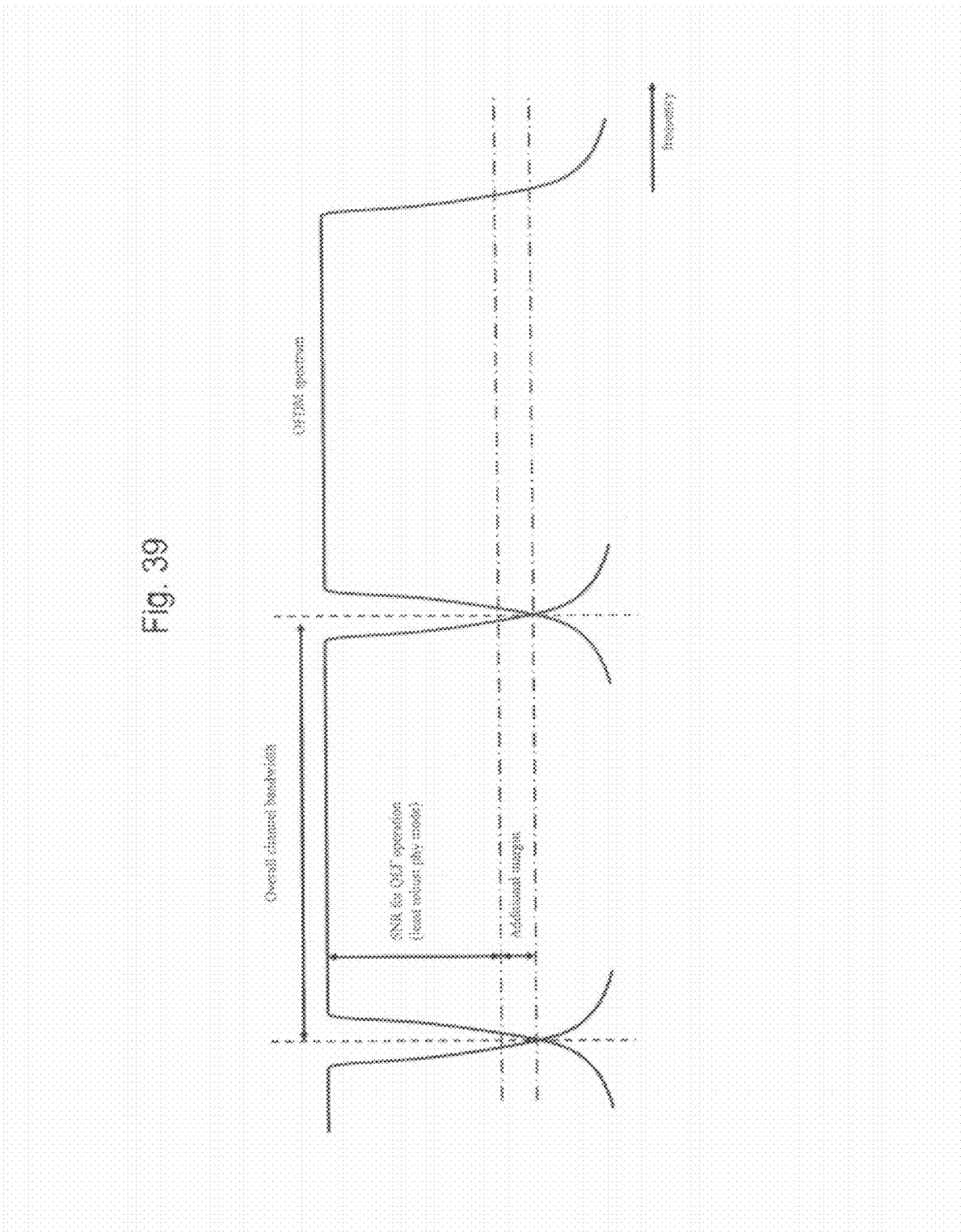
Figure 40:
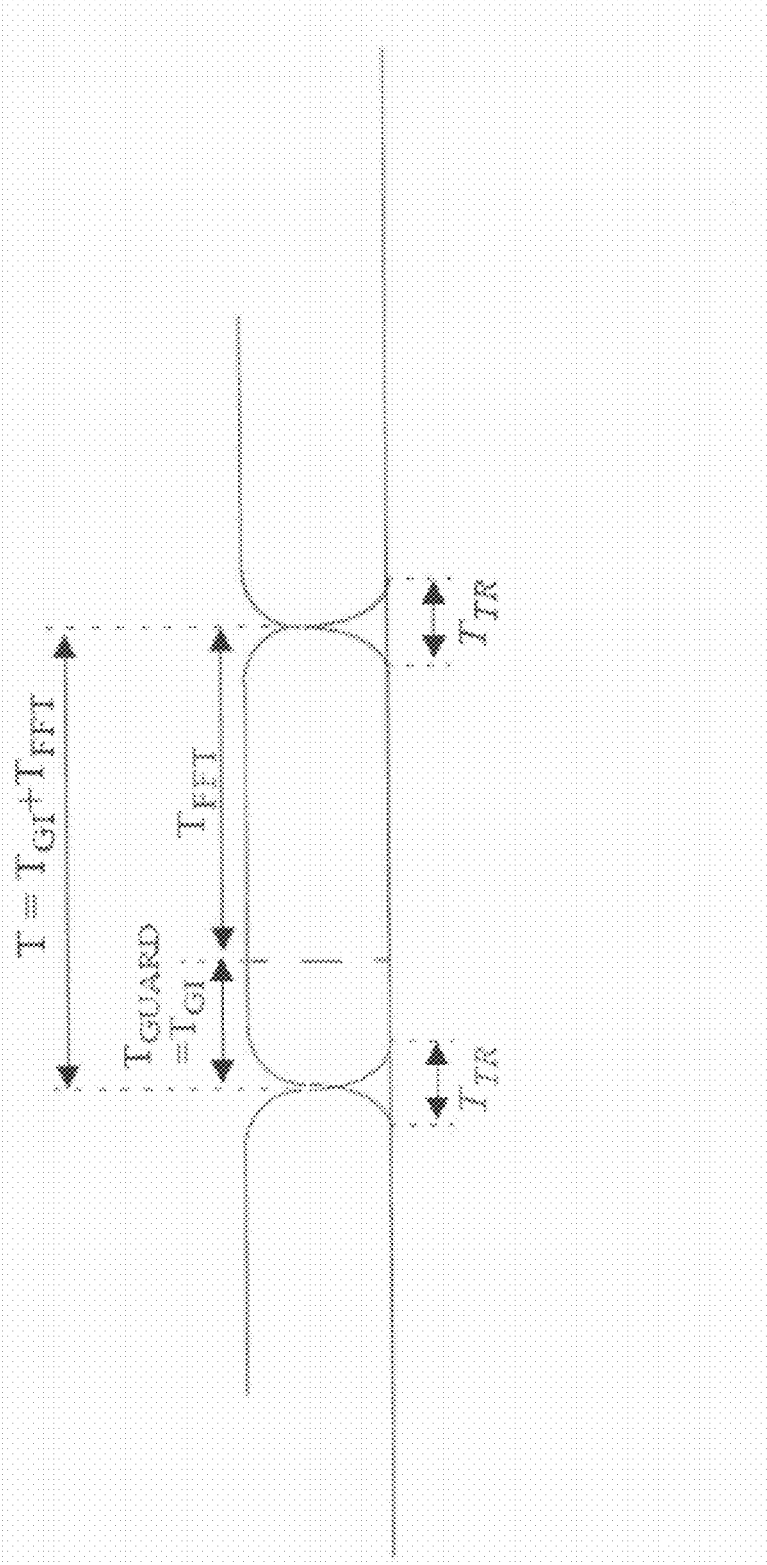
Figure 41:
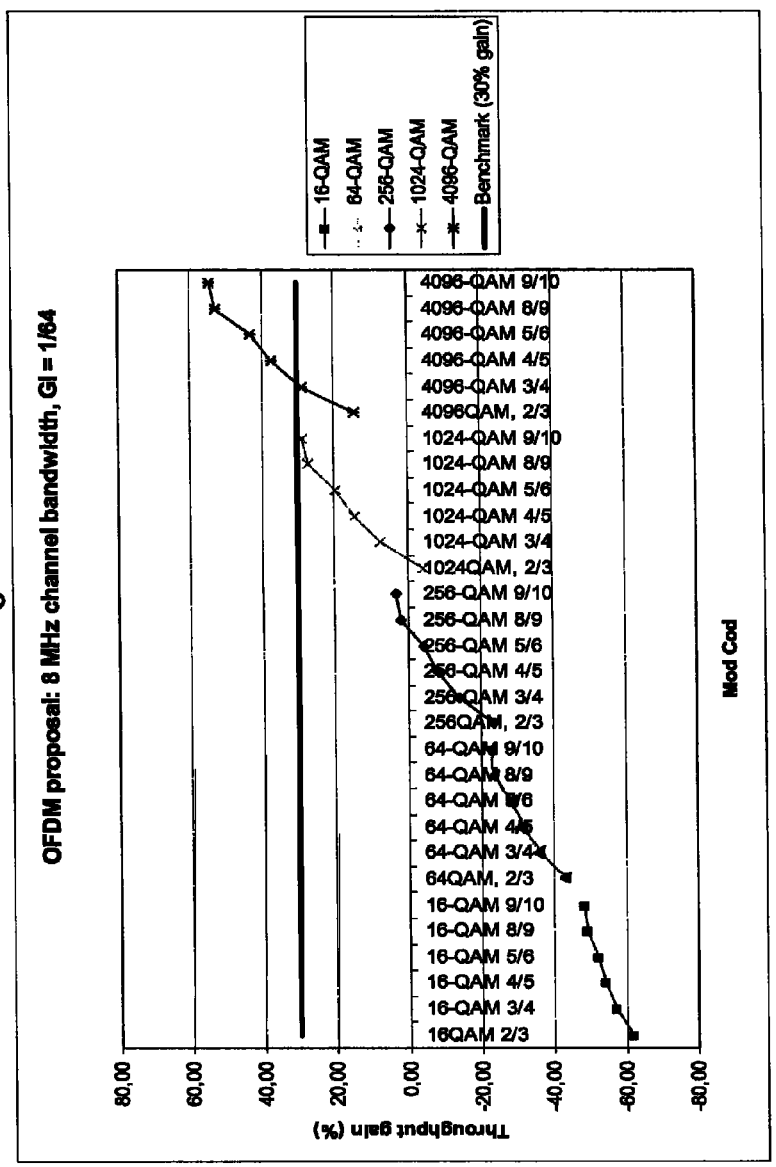
Figure 42:
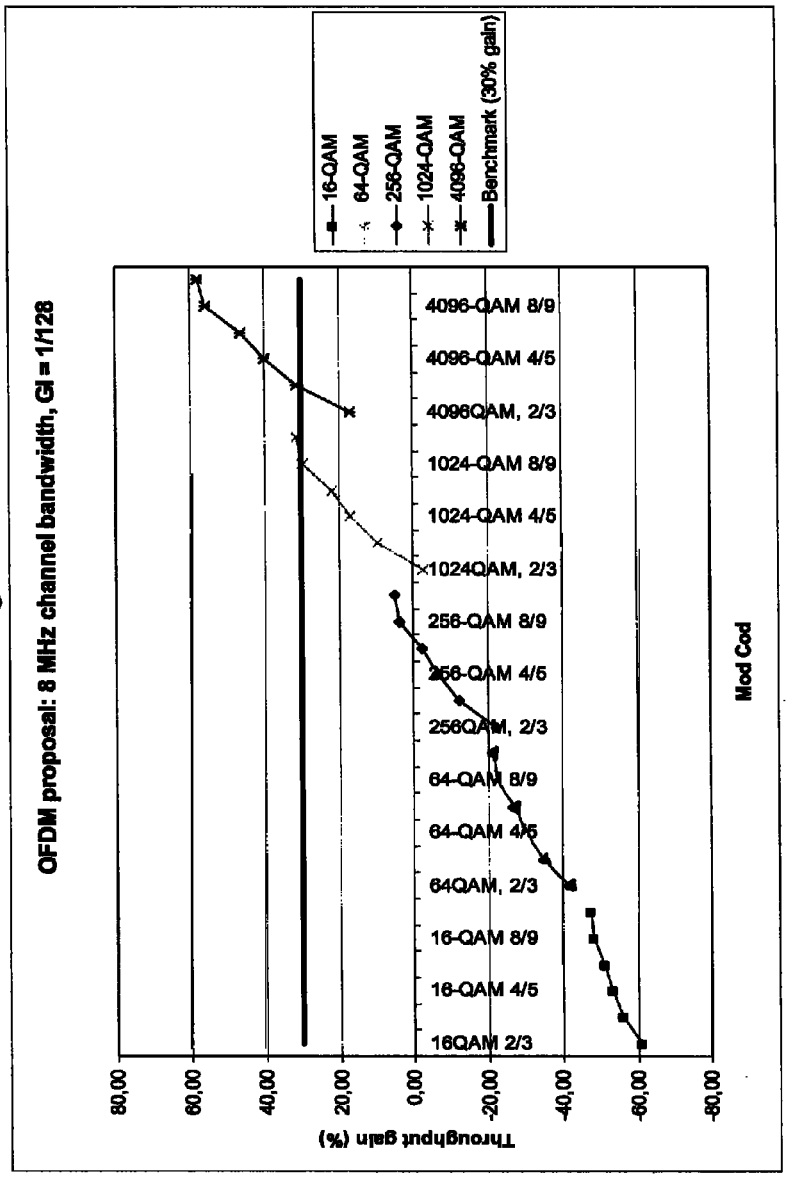
Figure 43:
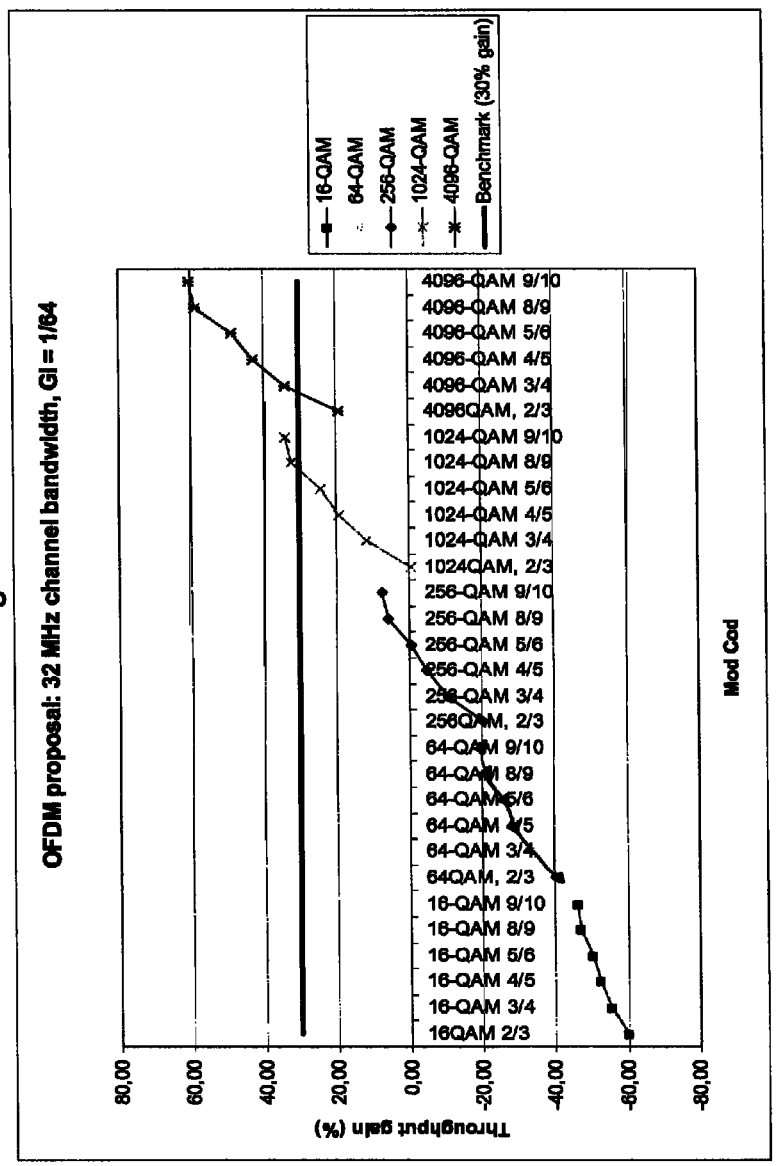
Figure 44:
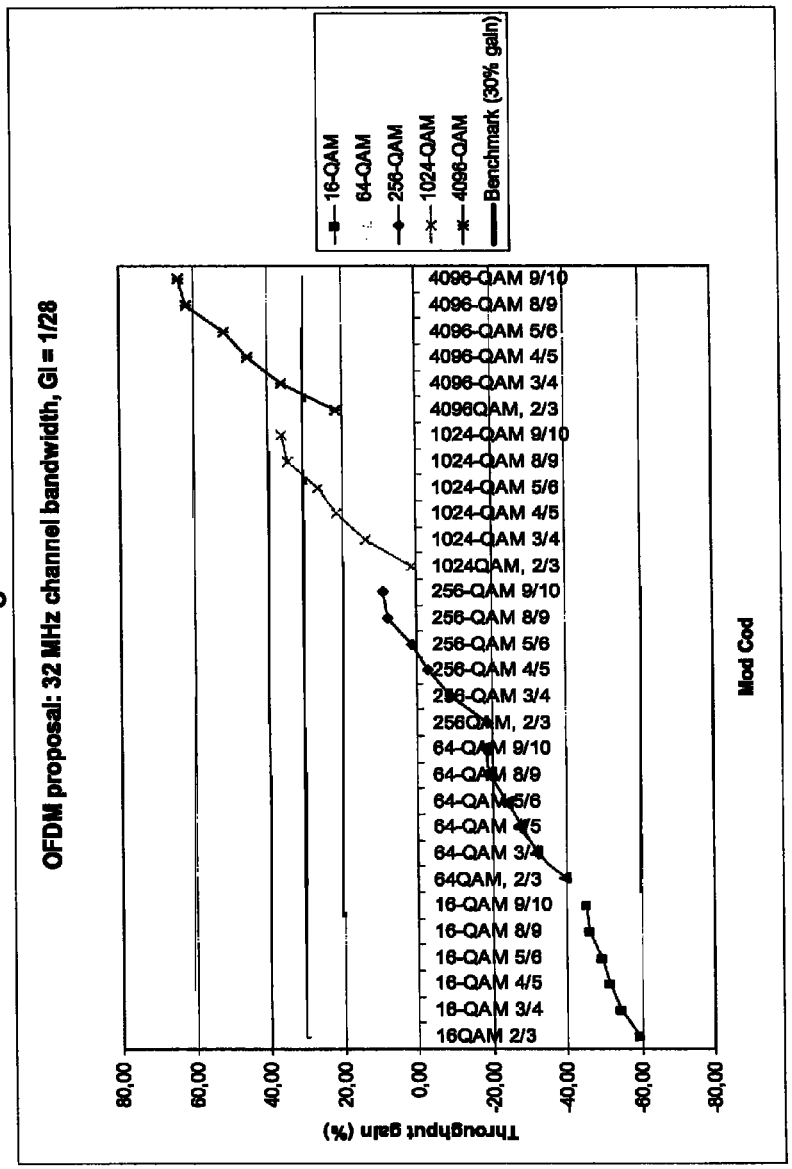

FIG. 32 shows a frame structure and alignment of preamble and data part (32 MHz example), FIG. 33 shows a structure of the training symbol with repeated sequences for each receive segment, FIG. 34 shows usable frequency ranges of the L1 signalling symbols, FIG. 35 shows building the overall OFDM signal, FIG. 36 shows an example of notched C2 OFDM spectrum (red curve) and terrestrial services (e.g. flight security service, blue curve), sharing the same frequency range, FIG. 37 shows C2 as downstream channel for DOCSIS data, FIG. 38 shows a DOCSIS communication in the proposed C2 system, FIG. 39 shows an OFDM spectrum overlapping between adjacent channels, FIG. 40 shows windowing of OFDM symbols in time domain, FIG. 41 shows a throughput gain of n=1 (8 MHz), GI=1/64 (% comparison to DVB-C 256QAM), FIG. 42 shows a throughput gain of n=1 (8 MHz), GI=1/128 (% comparison to DVB-C 256QAM), FIG. 43 shows a throughput gain of n=4 (32 MHz), GI=1/64 (% comparison to DVB-C 256QAM), FIG. 44 shows a throughput gain of n=4 (32 MHz), GI=1/128 (% comparison to DVB-C 256QAM), FIG. 45 shows a system performance (AWGN channel), FIG. 1 shows a schematic representation of an entire transmission bandwidth 1, in which a transmitting apparatus according to the present invention, as for example the transmitting apparatus 54 schematically shown in FIG. 17, transmits signals in a multi-carrier system in line with the present invention. FIG. 1 further schematically shows a block diagram of a receiving apparatus 3 of the present invention, which is adapted to be tuned to and selectively receive a selected part 2 of the transmission bandwidth 1. Hereby, the receiving apparatus 3 comprises a tuner 4 which is adapted to be tuned to and selectively receive the wanted part 2 of the transmission bandwidth 1 as well as further processing means 5 which perform the further necessary processing of the received signals in line with the respective communication system, such as a demodulation, channel decoding and the like. A more elaborate example of a receiving apparatus according to the present invention is shown in the schematic block diagram of FIG. 18, which shows a receiving apparatus 63 comprising a receiving interface 64, which can for example be an antenna, an antenna pattern, a wired or cable-based receiving interface or any other suitable interface adapted to receive signals in the respective transmission system or communication system. The receiving interface 64 of the receiving apparatus 63 is connected to a receiving means 65 which comprises a tuning means, such as the tuning means 4 shown in FIG. 1 as well as further necessary processing elements depending on the respective transmission or communication system, such as down conversion means adapted to down convert the received signal to an intermediate frequency or the base band.

As stated above, the present invention enables a flexible and changing reception of a wanted part 2 of the transmission bandwidth 1 in a receiver by providing a specific and new frame structure for a multi-carrier system. FIG. 2 shows a schematic representation of an overall transmission bandwidth 1, within which a transmitting apparatus 54 of the present invention is adapted to transmit data content, such as video data, audio data or any other kind of data, in different segments or parts 6, 7, 8, 9 and 10. For example, the parts 6, 7, 8, 9 and 10 could be used by the transmitting apparatus 54 to transmit different kinds of data, data from different sources, data intended for different recipients and so forth. The parts 6 and 9 have for example a maximum bandwidth, i.e. the maximum bandwidth which can be received by a corresponding receiving apparatus 63. The parts 7, 8 and 10 have smaller bandwidths. The present invention now suggests to apply a frame structure or pattern to the entire transmission bandwidth 1 whereby each frame comprises at least two training patterns adjacent to each other in the frequency direction and a number of data patterns. Each training pattern of a frame will have the same length and the identical pilot signals. In other words, the overall transmission bandwidth 1 is divided into equal parts for the training patterns, whereby the maximum bandwidth to which a receiver can be tuned, for example the bandwidth shown for parts 6 and 9 in FIG. 2, has to be equal or larger than the length of each training pattern. Hereby, by properly receiving an entire training pattern, a receiving apparatus 63 according to the present invention can correctly synchronize to the transmitting apparatus 54 and tune to and receive the wanted data in a flexible and non limiting way. Additionally, a frequency offset calculation and/or a channel estimation is/are possible in the receiving apparatus 63 on the basis of such a received training pattern. It is further clear that the length of the various data parts in the transmission bandwidth cannot exceed the length (number of frequency carriers) of the training patterns in the respective frame as will be explained in more detail further below.

FIG. 3 shows a schematic representation of a time domain structure of frames 11, 11', 11" according to the present invention. Each frame 11, 11', 11" comprises a preamble symbol (or training symbol) 12, 12', 12", one or more signalling symbols 13, 13' and several data symbols 14, 14'. Hereby, in the time domain, the preamble symbols or training symbols are preceding the signalling symbols which are preceding the data symbols. Each frame 11, 11', 11" may have a plurality of data symbols, wherein systems are possible in which the number of data symbols in each frame 11, 11', 11" varies. The preamble symbols are used in a receiving apparatus 63 to perform time synchronisation and eventually additional tasks, such as channel estimation and/or frequency offset calculation. The signalling symbols 13, 13', contain signalling information, for example all physical layer information that is needed by the receiving apparatus 63 to decode the received signals, such as but not limited to L1 signalling data. The signalling data may for example comprise the allocation of data content to the various data patterns, i.e. for example which services, data streams, modulation, error correction settings etc. are located on which frequency carriers, so that the receiving apparatus 63 can obtain information to which part of the entire transmission bandwidth it shall be tuned. Further, the signalling symbols may contain signalling data indicating the offset of the respective data pattern from the preamble or training pattern and/or the signalling pattern so that the receiving apparatus 63 may optimize the tuning to the wanted part of the transmission frequency in a way that the receipt of the training patterns and/or the signalling patterns is optimized. The use of the frame structure according to the present invention has the further advantage that by dividing the data stream into logical blocks, changes of the frame structure can be signalled from frame to frame, whereby a preceding frame signals the changed frame structure of the or one of the succeeding frames. For example, the frame structure allows a seamless change of modulation parameters without creating errors.

FIGS. 4A, 4B, 5A and 5B show non limiting examples of preamble structures which could be used in the present invention. It has to be understood, however, that other possible preamble structures could also be used. FIG. 4A shows a frequency domain representation of a preamble or training pattern 15 in which a plurality of frequency carriers 16 (in the shown example 2048 carriers), respectively carry a pilot signal. In other words, all frequency carriers of the training pattern 15 carry a pilot signal. FIG. 4B shows the training pattern of FIG. 4A after the transformation in the time domain. The time domain training symbol comprises a plurality of time domain samples 17 (in the shown example 2048 samples) in a single repetition. In other words, the time domain training symbol does not have any repetitions in the time domain samples. FIG. 5A shows a further non limiting example of a frequency domain preamble pattern 18, comprising a plurality of frequency carriers (in the shown example 512 carriers). In the shown example, only every fourth sub-carrier carries a pilot signal 19, all other sub-carriers 20 do not carry pilot signals. After transformation into the time domain, the time domain preamble or the training symbol 21 shown in FIG. 5B shows four repetitions 22, each repetition 22 having the identical samples 23 (same value and number). In the shown example, the time domain training symbol has a length of 2048 time samples and each repetition 22 comprises 512 samples. The general rule is that the number of repetitions in the time domain corresponds to the repetition rate of the pilot signals in the frequency domain. In case that the distance of the pilot signals in the frequency domain is higher, the number of repetitions in the time domain increases. The repetitions in the time domain preamble or training symbol are sometimes called 'shortened' training symbols. In the example of FIG. 5B, the time domain symbol thus comprises four shortened training symbols. In some applications it may be advantageous to use pseudo noise pilot signal sequences in order to obtain pseudo noise like signal patterns in the time domain. Also, a so called CAZAC (constant amplitude zero auto correlation) sequence could be used for the pilot signals, or any other suitable sequence resulting in pseudo noise like signal patterns and having good correlation properties both in the frequency as well as in the time domain. Such sequences allow a time synchronisation in a receiving apparatus 63 of the present invention. In addition hereto, such sequences allow a reliable channel estimation in the receiving apparatus 63 in case that the Nyquist criterion is fulfilled in the frequency dimension. Further, such sequences allow a frequency offset calculation and/or a channel estimation in the receiving apparatus 63.

As mentioned above, the present invention suggests a frequency domain frame structure or frame pattern for the entire transmission bandwidth of the transmitting apparatus 54, in which identical training patterns are repeated over the entire transmission bandwidth, i.e. immediately adjacent to each other in the frequency direction. FIG. 6 visualizes schematically such a sequence of identical and adjacent training patterns 25, 26, 27, 28 in an entire transmission bandwidth 24. In other words, the same sequence of pilot signals is mapped onto the frequency carrier of each training pattern 25, 26, 27, 28, so that each training pattern has the same length (or bandwidth) and the same number of frequency carriers (assumed that the frequency sub-carriers are equidistant and respectively have the same length or bandwidth). Advantageously, as shown in FIG. 6, the overall transmission bandwidth 24 is equally divided into the training patterns 25, 26, 27, 28 having respectively the same length. The length of the training patterns 25, 26, 27 and 28 also corresponds to the minimum tuning bandwidth to which the receiving apparatus 63 of the present invention can be tuned in order to receive signals, in order to ensure that the receiving apparatus 63 is always able to receive an entire training pattern for synchronisation (and channel estimation, and for frequency offset calculation).

The present invention therefore enables a receiving apparatus 63 to be tuned to any position within the overall channel bandwidth 24 in a very flexible manner while still being able to perform a reliable synchronisation by correlating the received pilot signals for example in a correlation means 67 of the receiving apparatus 63 as shown in FIG. 18. Again, the invention suggests to divide the entire transmission frequency bandwidth 24 into adjacent sub-blocks or segments each having a training pattern containing a repetition of the identical pilot signal sequence and thus having the same length. The length of each of the training pattern thus corresponds advantageously to the bandwidth to which the receiving apparatus 63 can be tuned. For example, as shown in FIG. 18, the receiving apparatus 63 comprises a receiving interface 64, such as an antenna, a wired receiving interface or the like, to which signals are received in a receiving means 65, which comprises a tuner. If the receiving apparatus 63 is tuned to a part of the transmission bandwidth which matches or coincides to one of the training patterns, the pilot signal sequence is received in the original order. If the receiving apparatus 63 is tuned to an arbitrary part of the transmission bandwidth or for example between two training patterns, still all pilot signals of the training pattern are received, however, not in the original sequence. However, due to the cyclic behaviour of the pilot sequence sequences, very good correlation properties are still present particularly if pseudo noise sequences are used for the pilot signals in each training pattern and the correlation means 67 of the receiving apparatus 63 of the present invention still delivers good results when performing an auto-correlation i.e. a correlation of the received pilot signals with themselves. Specifically, in wired systems, such as cable systems, auto-correlation is expected to deliver good results because of the high signal to noise ratio. Also, such sequences enable a frequency offset calculation and/or a channel estimation in the receiving apparatus 63.

FIG. 7 shows an example of a simulation result for 64 sample pseudo noise sequence for a multi-carrier system without segmentation of the training pattern, i.e. in which the transmission bandwidth is identical to the receiving bandwidth. The correlation peak is clearly visible. FIG. 8 shows a further example of a simulation result for a system according to the present invention, in which the entire transmission bandwidth comprises identical training patterns and the receiver is tuned to a part of the transmission bandwidth. In the simulation shown in FIG. 8, the receiver was tuned and identically matched to the first segment, i.e. the first training pattern of the entire transmission bandwidth. In other words, the simulation shows an auto-correlation result for the situation in which the receiver receives the pilot signals of a training pattern in the original sequence. Again, the correlation peak is clearly visible. FIG. 9 now shows a simulation result for the system of FIG. 8, whereby the receiver was tuned to a position between two training patterns so that the receiver did not receive the pilot signals in the original sequence, but received the last part of a preceding training pattern before the first part of the succeeding training pattern. However, due to the cyclic behaviour of the pilot sequences and the training patterns, it is still possible to obtain an auto-correlation peak, which is shown in FIG. 9.

In case that the receiving apparatus 63 knows its tuning position, i.e. knows the offset from the start of a frame or from the respective start of each training pattern, an optionally provided rearranging means 66 could rearrange the received pilot signals into the original sequence and to perform a cross-correlation on the basis of a comparison with a stored version of the expected training pattern in order to obtain a cross-correlation result. Such a cross-correlation result will normally have a better quality then an auto-correlation result since it is less effected by noise. Thus, for systems with low signal to noise ratios, cross correlation would be the better choice.

FIG. 10 shows a schematic example of a frequency domain representation of a frame structure or pattern 29 according to the present invention. The frame structure 29 covers the entire transmission bandwidth 24 in the frequency direction and comprises at least two training patterns 30 adjacent to each other in the frequency direction, each carrying the identical sequence of pilot signals on respective frequency carriers and having the same length. In the example shown in FIG. 4, the entire transmission bandwidth 24 is sub-divided into four training patterns 30, but any other higher or lower number of training patterns might be suitable. In the transmitting apparatus 54 of the present invention as shown in FIG. 17, a pilot mapping means 55 is adapted to map the pilot signals onto the frequency carriers of each training pattern. Advantageously, a pseudo noise sequence or a CAZAC sequence is used for the pilot signals, but any other sequence with good pseudo noise and/or correlation properties might be suitable. Also, the pilot mapping means 55 may be adapted to map a pilot signal onto every frequency carrier in the training patterns, as explained in relation to FIG. 4. Alternatively, the pilot mapping means 55 might be adapted to map a pilot signal onto every m-th frequency carrier (m being a natural number larger than 1) as for example explained in relation to FIG. 5. The length or bandwidth 39 of every training pattern 30 is the same as the bandwidth 38 to which the tuner of the receiving apparatus 63 can be tuned. However, the part of the transmission bandwidth to which the tuner of the receiving apparatus 63 can be tuned, may be larger than the length of a training pattern 30. Besides for the correlation performed in the correlation means 67 in the receiving apparatus 63, the received pilots can further (after transformation into the frequency domain in the transformation means 68) be used for a channel estimation for the frequency carriers in the frame in a channel estimation means 69, which provides a de-mapping means 70 with the necessary channel estimation information enabling a correct de-mapping of the data in the received data signals. Also, the received pilots can be used in the receiving apparatus 63 for a frequency offset calculation in a corresponding means which is not shown in FIG. 18.

The frame structure or pattern 29 further comprises at least two signalling patterns 31 adjacent to each other in the frequency direction which follow the training patterns 30 in the time direction. Each signalling pattern 31 has the same length and bandwidth as the respectively preceding training pattern 30, and the beginning and the end of each signalling pattern 31 in the frequency direction are identical to the beginning and the end of the respective (time wise) preceding training pattern 30, so that the frequency structure of the signalling patterns 31 is identical to the frequency structure of the training patterns 30. In other words, the signalling patterns 31 are aligned to the training patterns 30. The transmitting apparatus 54 of the present invention shown in FIG. 17 comprises a signalling data mapping means 57 which is adapted to map signalling data onto the frequency carriers of each signalling pattern 31. Hereby, each signalling pattern 31 comprises for example the location of the signalling pattern 31 within the frame. For example each signalling pattern 31 in each frame has and carries the identical signalling data, except the location of the respective signalling pattern in the frame, which is different in each signalling pattern 31 in a frame. The signalling data are for example L1 signalling data which contain all physical layer information that is needed by the receiving apparatus 63 to decode received signals. However, any other suitable signalling data may be comprised in the signalling patterns 31. The signalling patterns 31 might for example comprise the location of the respective data segments 32, 33, 34, 35, 36 so that a receiving apparatus 63 knows where the wanted data segments are located so that the tuner of the receiving apparatus 63 can tune to the respective location in order to receive the wanted data segments. As shown in FIG. 18, the receiving apparatus 63, after the receiving means 65 with the tuner, comprises a transformation means 68 for transforming the received time domain signals into the frequency domain, where after the signalling data (after an optional reconstruction in a reconstruction means 71), are de-mapped in a de-mapping means 72 and then evaluated in an evaluation means 73. The evaluation means 73 is adapted to extract the necessary and required signalling information from the received signalling data. If necessary, additional signalling patterns could be provided in the time direction immediately succeeding the signalling patterns 31.

The frame structure or pattern 29 further comprises at least two data segments extending over the entire frequency bandwidth 24 in the frequency direction and following the signalling patterns 31 in the time direction. In the time slot immediately following the time slot in which the signalling patterns 31 are located, the frame structure 29 shows several data segments 32, 33, 34, 35, 36 and 37 with different lengths, i.e. a different number of respective frequency carriers onto which data are mapped. The frame structure 29 further comprises additional data segments in succeeding time slots, whereby the additional data patterns respectively have the same length and number of frequency carriers as the respectively preceding data pattern. For example, the data pattern 32', 32" and 32''' have the same length as the first data pattern 32. The data patterns 33', 33" and 33''' have the same length as the data segment 33. In other words, the additional data patterns have the same frequency dimension structure as the several data patterns 32, 33, 34, 35, 36 and 37 in the first time slot after the signalling patterns 31. Thus, if the receiving apparatus 63 for example tunes to a part 38 of the transmission bandwidth in order to receive the data pattern 35, all time wise succeeding data patterns 35', 35" and 35''' which have the same length as the data pattern 35 can be properly received.

The flexible and variable data pattern structure of the frame structure or pattern 29 as suggested by the present invention can for example be implemented in the transmitting apparatus 54 of the present invention as shown in FIG. 17 by mapping of various different data streams, for example with different kinds of data and/or data from different sources, as visualized by the branches data 1, data 2 and data 3 in FIG. 17. The respective data are then mapped onto frequency carriers in respective data patterns by the respective data mapping means 58, 58' and 58". As stated, at least some of the various data patterns may have different lengths, i.e. different numbers of frequency carriers in case that the frequency carriers are equidistant and have the same bandwidth, respectively. Alternatively, the number of data patterns in the frequency direction may be the same as the number of training patterns, wherein the length (or bandwidth) of each data patterns may be identical to the length of each training patterns and they may be aligned to each other (have the same frequency direction structure). Alternatively, each data pattern might have the same length and the number of the data patterns might be a multiple of the number of training patterns, while still having the same frequency structure and alignment. Thus for example, 2, 3, 4 or more data patterns would be aligned to each of the training patterns. Generally, the length of the data patterns needs to be smaller or at maximum equal to the effective receiver bandwidth so that the data patterns can be received in the receiving apparatus 63. Further, the transmitting apparatus 54 may be adapted to change the data pattern structure, e.g. the length and/or the number of the data patterns dynamically. Alternatively, the structure of the data patterns could be fixed or permanent.

Further, it is to be noted that the data patterns could advantageously comprise pilot signals mapped on some of the frequency carriers in order to enable a fine channel estimation on the receiving side. Hereby, the pilot signal could be scattered among the carriers with the data in a regular or an irregular pattern depending.

In the transmitting apparatus 54, the frequency carriers with the pilots from the pilot mapping means 55, the frequency carriers with the signalling data from the signalling mapping means 57 and the frequency carriers with the data from the various data mapping means 58, 58', 58" are then combined to a frame pattern or structure 29 according to the present invention in a frame forming means 59.

Generally, the frame structure of the present invention could be fixed or permanent, i.e. the overall bandwidth as well as the extension of each frame in the time direction could be fixed and always the same. Alternatively, the frame structure can also be flexible, i.e. the overall bandwidth and/or the extension of each frame in the time direction could be flexible and changed from time to time depending on the desired application. For example, the number of time slots with data patterns could be flexibly changed. Hereby, the changes could be signalled to a receiving apparatus in the signalling data of the signalling patterns.

It can be seen in FIG. 10, that the part 38 to which the receiving apparatus 63 is tuned, does not match with the frequency structure of the training patterns 30 and signalling patterns 31. However, is explained above, due to the cyclic nature of the pilot signal sequences in the training patterns 30, the correlation means 67 of the receiving apparatus 63 is still able to perform an auto-(or cross-)correlation. Further, in this situation shown in FIG. 10, the receiving apparatus 63 needs knowledge about the offset of the part 38 in relation to the frequency structure of the frame pattern 29 in order to be able to re-arrange the receive signalling carriers into the original signalling sequence of the signalling patterns 31 which is done in a reconstruction means 71. This is due to the fact that the signalling patterns 31 have the same length and frequency structure as the training patterns 30.

During the start-up phase or initialization phase of the receiving apparatus 63, the receiving apparatus 63 tunes to an arbitrary frequency part of the overall frequency bandwidth. In the non-limiting example of a cable broadcast system, the training pattern 30 could for example have a 8 MHz bandwidth. Thus, during the start-up phase, the receiving apparatus 63 is able to receive an entire training pattern 30 in the original or re-ordered sequence as well as an entire signalling pattern 31 in the original or re-ordered sequence from the received training pattern 30. The receiving apparatus 63 is able to perform a correlation in the correlation means 67 in order to obtain a time synchronisation, as well as perform a channel estimation (usually a coarse channel estimation) in a channel estimation means 69 and/or a frequency offset calculation after a transformation of the received time domain signals into the frequency domain in the transformation means 68. In the evaluation means 73 of the receiving apparatus 63, the received signalling data are evaluated, for example the location of the received signalling pattern in the frame is obtained so that the receiver can freely and flexibly tune to the respectively wanted frequency position, such as the part 38 is shown in FIG. 10. In the new tuning position, which will usually not necessarily match with the frequency structure of the training patterns 30 and the signalling patterns 31, the receiving apparatus 63 is still able to perform synchronisation, channel estimation and frequency offset calculation on the basis of the pilot signals of the training patterns 30 due to their cyclic nature. However, in order to be able to properly evaluate the signalling data of the signalling patterns 31, the received signalling signals have to be re-ordered which is performed in a re-constructing means 71 as described. FIG. 11 shows this reordering in a schematic example. The last part 31' of a previous signalling pattern is received before the first part 31" of a succeeding signalling pattern, where after the reconstructions means 71 places the part 31' after the part 31" in order to reconstruct the original sequence of the signalling data, where after the reordered signalling pattern is evaluated in the evaluation means 73 after a corresponding de-mapping of the signalling data from the frequency carriers in the de-mapping means 72. It is to be remembered that the content of each signalling pattern 31 is the same, so that this reordering is possible.

Often, a receiving apparatus does not provide a flat frequency response over the complete receiving bandwidth to which the receiver is tuned. In addition, a transmission system usually faces increasing attenuation at the boarder of the receiving bandwidth window. FIG. 12 shows a schematic representation of a typical filter shape example. It can be seen that the filter is not rectangular, so that e.g. instead of 8 MHz bandwidth, the receiving apparatus is only able to effectively receive 7.4 MHz bandwidth. The consequence is that the receiving apparatus 63 may not be able to perform the reordering of the signalling data as described in relation to FIG. 11 in case that the signalling patterns 31 have the same length and bandwidth as the receiving bandwidth of the receiving apparatus 63, so that some signals are lost and cannot be received at the border of the receiving bandwidth. In order to overcome this problem, and other problems and in order to ensure that the receiving apparatus 63 is always able to receive one complete signalling patterns in the original sequence and does not have to reorder or rearrange the received signalling signals, the present invention alternatively or additionally suggests to use signalling patterns 31a which have a reduced length as compared to the training patterns 30. The example shown in FIG. 13, it is suggested to use signalling patterns 31a which have exactly half the length of a training pattern 30, but still the same frequency structure as the training patterns 30. In other words, respective two (i.e. pairs) of the half length signalling patterns 31a are matched and aligned with each one of the training patterns 30 as shown in FIG. 13. Hereby, each pair of signalling patterns 31a would have the identical signalling data including the location of the signalling patterns 31a in the respective frame. However, in relation to the other pairs of signalling patterns, in these other pairs, since they have a respective different location within the frame, the signalling data would be identical except the location information. In the above example of each training pattern 30 having a bandwidth or length of 8 MHz, the signalling pattern 31a would then each have a length or bandwidth of 4 MHz. Hereby, in order to ensure that the same amount of signalling data as before can be transmitted, it might be necessary to add additional half length signalling patterns 31b in the time slot succeeding the signalling patterns 31a and before the data patterns 32, 34, 35, 36 and 37. The additional signalling patterns 31b have the same time and frequency arrangement/alignment as the signalling patterns 31a, but comprise additional and different signalling information as the signalling information contained in the signalling patterns 31a. In this way, the receiving apparatus 63 will be able to receive the signalling patterns 31a and 31b completely and the reconstruction means 71 of the receiving apparatus is adapted to combine the signalling data of the signalling patterns 31a and 31b to the original sequence. In this case, the reconstruction means 71 in the receiving apparatus 63 can be omitted. It is also possible to only provide one time slot with half length signalling patterns 31a if all necessary signalling data can be transmitted in the half length and the additional signalling patterns 31b are not necessary. Alternatively, even more half length signalling patterns could be used in the succeeding time slot after the signalling patterns 31b It should be generally (for all embodiments of the present invention) noted that the length (or bandwidth) of the training patterns, the data patterns and/or the signalling patterns could be adapted to, e.g. could be smaller than or at maximum equal to, the effective receiving bandwidth of the receiving apparatus 63, for example to the output bandwidth of the receiving band pass filter, as described above.

Further, it should be generally noted that the training patterns, the signalling patterns and/or the data patterns of the frame structure described by the present invention could comprise additional guard bands, i.e. unused carriers at the beginning and/or the end of the respective pattern or frame. For example, each training pattern could comprise a guard band at the beginning and the end of each pattern. Alternatively, in some applications it might be advantageous if only the first training pattern in each frame, in the example of FIG. 10 the training pattern at position 39, could comprise a guard band only at the beginning of the pattern, and the last training pattern in each frame could comprise a guard band only at the end of the pattern. Alternatively, in some applications only the first training pattern in each frame, in the example of FIG. 10 the training pattern at position 39, could comprise a guard band at the beginning as well as at the end of the pattern, and the last training pattern in each frame could comprise a guard band at the beginning as well as at end of the pattern. The length of the guard band comprised in some or all of the training patterns could for example be smaller or at maximum equal to the maximum frequency offset the receiving apparatus can cope with. In the mentioned example of a bandwidth of 8 MHz for each training pattern, the guard band could for example have a length of 250 to 500 kHz or any other suitable length. Also, the length of each of the guard bands comprised in the training patterns could be at least the length of the carriers which are not received in the receiving apparatus due to the filter characteristics as described in relation to FIG. 12. Also, in case that the signalling patterns have guard bands, the length of each of the guard bands comprised in the training patterns could be at least the length of each of the signalling pattern guard bands.

Additionally or alternatively, each signalling pattern, i.e. the signalling patterns 30, 31a and/or 31b, could comprise a guard band with unused carriers at the beginning and the end of each pattern. An example for this situation is shown in FIG. 15, which schematically shows several signalling patterns 31a arranged succeeding each other in the frequency dimension each having a guard band 31a' at its beginning and a further guard band 31a" at its end. For example, in an OFDM system in which the overall transmission bandwidth is a multiple of the training pattern length of 8 MHz (4nk mode: k is the Fourier window size of 1024 carriers/samples, n=1, 2, 3, 4 . . . ) and each signalling pattern has a length of 4 MHz, a suggestion for the length of each guard band at the beginning and the end of each signalling pattern would be 343 frequency carriers (which is the number of not used carriers in the data patterns at the beginning and end of each frame in each 4nk mode). The resulting number for usable carriers in each signalling pattern would be 3584/2−2×343=1106 carriers. It has to be understood, however, that these numbers are only used as examples and are not meant to be limiting in any sense. Hereby, the length of each of the guard bands comprised in the signalling patterns could be at least the length of the carriers which are not received in the receiving apparatus due to the filter characteristics as described in relation to FIG. 12, so that the length of the signalling data in each signalling pattern is equal to (or may be smaller than) the effective receiver bandwidth. It should be noted that if additional signalling patterns 31b are present, as explained in relation to FIG. 13, they will have the same guard bands 31a' and 31a" as the signalling patterns 31a. Also, the signalling patterns 30 as described in relation to FIG. 13 could have the guard bands 31a' and 31a" as described.

Additionally or alternatively, each data pattern could comprise a guard band with unused carriers at the beginning and the end of each pattern. Alternatively, in some applications only the respective first data patterns in each frame in the frequency direction, in the example of FIGS. 10 and 13 the data patterns 32, 32', 32", 32"' could comprise a guard band only at the beginning of the data pattern, and the last data patterns in each frame in the frequency direction, in the example of FIGS. 10 and 13 the data patterns 37, 37', 37", 37"' could comprise a guard band at the end of the data pattern. Hereby, the length of the guard bands of the data patterns could for example be the same as the length of the guard bands of the signalling patterns if the signalling patterns comprise guard bands, and/or the guard bands of the training patterns if the training patterns comprise guard bands.

As stated above the signalling data comprised in the signalling patterns 31, 31a and or 31b (or other signalling patterns according to the present invention) comprise the physical layer information, which enables a receiving apparatus 63 according to the present invention to obtain knowledge about the frame structure and to receive and decode the wanted data patterns. As a non limiting example, the signalling data could comprise parameters such as the overall or entire transmission bandwidth, the guard band length for the training patterns, the location of the respective signalling pattern within the frame, the guard band length for the signalling patterns, the guard band length for the data patterns, the number of frames which build a super frame, the number of the present frame within a super frame, the number of data patterns in the frequency dimension of the overall frame bandwidth, the number of additional data patterns in the time dimension of a frame and/or individual signalling data for each data pattern in each frame. Hereby, the location of the respective signalling pattern within a frame can e.g. indicate the position of the signalling pattern in relation to the training patterns or in relation to the segmentation of the overall bandwidth. For example, in the case of FIG. 10 in which the signalling patterns have the same length as and are aligned to the training patterns, the signalling data comprise indication if the signalling pattern is located in the first segment (e.g. the first 8 MHz segment), or the second segment etc. In case of the signalling patterns having half the length of the training patterns, as e.g. explained in relation to FIG. 13, each pair of adjacent signalling patterns then has the same location information. In any case, the receiving apparatus will be able to tune to the wanted frequency band in the succeeding frame using this location information. The individual signalling data are a separate block of data individually provided for each data pattern present in the frame and may comprise parameters such as the first frequency carrier of the data pattern, the number of frequency carriers allocated to the data pattern, the modulation used for the data pattern, the error protection code used for the data pattern, the usage of a time interleaver for the data pattern, the number of frequency notches (frequency carriers which are not used for data transmission in data pattern) in the data pattern, the position of the frequency notches and/or the width of the frequency notches. The signalling mapping means 57 of the transmitting apparatus 54 is adapted to map the corresponding signalling data on the frequency carriers of each signalling pattern. The evaluation means 67 of the receiving apparatus 63 is adapted to evaluate the received signalling data and to use or forward the information comprised in the signalling data for further processing within the receiving apparatus 63.

In case that the signalling data comprise the mentioned individual signalling information for each data pattern present in a frame, the structure of the signalling patterns support a maximum limited number of data patterns in the frequency direction per frame in order to restrict the size of each signalling pattern to a maximum size. Thus, although the number of data patterns in the frequency direction of each frame could be dynamically and flexible changed, this would then be true only within a certain maximum number of data patterns. The additional data patterns in the time direction of each frame are respectively aligned with the preceding data patterns, as explained above. Thus, each additional succeeding data pattern has the same position, length, modulation etc. as the preceding data pattern so that the signalling data for the preceding data pattern are also valid for the succeeding data pattern. Hereby, the number of additional data patterns in the time direction of each frame could be fixed or flexible and this information could also be comprised in the signalling data. Similarly, the structure of the signalling patterns could support only a maximum limited number of frequency notches in each data pattern.

Alternatively or additionally, in order to overcome the problem that parts of the signalling patterns 31 may not be receivable in the receiving apparatus 63, the transmitting apparatus 54 could optionally comprise an error coding means 56 adapted to add some kind of error coding, redundancy, such as repetition coding, cyclic redundancy coding, or the like to the signalling data which are mapped onto the frequency carriers of a signalling pattern by the signalling mapping means 57. The additional error coding would enable the transmitting apparatus 54 to use signalling patterns 31 in the same length as the training patterns 30, as shown in FIG. 10, since the receiving apparatus 63 is able, for example, by means of the reconstructing means 71, to perform some kind of error detection and/or correction in order to reconstruct the original signalling pattern.

For the mentioned example of the signalling patterns having a length of 4 MHz and are aligned to training patterns (segments) of 8 MHz in an OFDM system, the following table shows a specific (non-limiting) example of a signalling structure:

TABLE 1

| signalling structure | | | |
|---|---|---|---|
| n of n4k | | | 4 bits |
| Current n of n4k | | | 4 bits |
| Guard Interval length | | | 2 bits |
| Superframe length | | | 16 bits |
| Frame number | | | 16 bits |
| Number of data patterns | | | 5 bits (or 4 or 6 bits) |
| Loop over data patterns with individual information about each data pattern { | | | |
| | n - Segment number | | 4 bits |
| | Start carrier number | | 12 bits |
| | Data pattern width (number of carriers) | | 12 bits |
| | Data pattern QAM modulation | | 3 bits |
| | LDPC blocksize | | 1 bit |
| | LDPC coderate | | 3 bits |
| | Time interleaver enable | | 1 bit |
| | Number of notches | | 2 bits |
| | Loop over notches { | | |
| | | Start carrier number | 12 bits |
| | | Notch width (number of carriers) | 12 bits |
| | } End notch loop | | |
| | PSI/SI reprocessing | | 1 bit |
| } End data pattern loop | | | |
| Reserved | | | 1 bit (or 0 or 2 bits) |
| CRC_32 MIP | | | 32 bits |

Advantageously, the frame structure can have a maximum of 32 data patterns per frame in the frequency dimension, so that in a system with an overall bandwidth of 32 MHz (four times the training pattern length of 8 MHz), each data pattern has a minimum length of 1 MHz. The resulting maximum size of a signalling pattern is (48+32+32(36+4*24))=48+32+4224=4304 Bits. An appropriate shortened Reed Salomon coding could be applied to the signalling data. The encoded data could for example be mapped onto two consecutive QPSK symbols, or any other suitable modulation could be used.

Alternatively, the frame structure can have a maximum of 64 data patterns per frame in the frequency dimension, so that in a system with an overall bandwidth of 32 MHz (four times the training pattern length of 8 MHz), each data pattern has a minimum length of 0.5 MHz. The resulting maximum size of a signalling pattern is (48+32+64(36+4*24))=48+32+8448=8528 Bits. An appropriate shortened Reed Salomon coding could be applied to the signalling data. The encoded data could for example be mapped onto two consecutive 16-QAM symbols, or any other suitable modulation could be used.

Alternatively, the frame structure can have a maximum of 16 data patterns per frame in the frequency dimension, so that in a system with an overall bandwidth of 32 MHz (four times the training pattern length of 8 MHz), each data pattern has a minimum length of 2 MHz. The resulting maximum size of a signalling pattern is (48+32+16(36+4*24))=48+32+2112=2192 Bits. An appropriate shortened Reed Salomon coding could be applied to the signalling data. The encoded data could for example be mapped onto one QPSK symbol, or any other suitable modulation could be used.

In the following, the parameters of the signalling data mentioned in the above table 1 are described in more detail:

| a) n of n4k: | Defines the overall transmission bandwidth of the proposed 4nk system as a multiple of 8 MHz<br>n = 1:  8 MHz<br>n = 2:  16 MHz<br>n = 3:  24 MHz<br>n = 4:  32 MHz<br>... |
|---|---|
| b) current n of n4k: | Indicates the location of the decoded signalling pattern within the complete n4k channel (frame)<br>0000  reserved<br>0001  0 ... 8 MHz (n = 1)<br>0010  8 ... 16 MHz (n = 2)<br>0011  16 ... 24 MHz (n = 3)<br>0100  24 ... 32 MHz (n = 4) |
| c) Guard Interval length: | Defines the length of the guard intervals (or bands) for all data patterns as well as for the signalling patterns<br>00  GI = 1/64<br>01  GI = 1/128<br>10  GI = 1/256<br>11  reserved |

| | |
|---|---|
| d) Superframe length: | This parameter describes the number of frames that build one superframe |
| e) Frame number: | Allows a frame counting within one superframe. At the beginning of each superframe this counter is reset. |
| f) Number of data patterns: | Defines the number of frequency patterns in the overall channel bandwidth |
| g) n-Segment number: | This parameter signals the location of the first carrier of the data pattern (i.e. which 8 MHz segment) |
| h) Start carrier number: | Defines the first carrier of the data pattern. Numbering is relative to the frame of the related 8 MHz segment |
| i) Data pattern width: | Defines the number of allocated carriers for the data pattern |
| j) Data pattern QAM: | This parameter indicates the QAM modulation for the data pattern<br>000    16-QAM<br>001    64-QAM<br>010    256-QAM<br>011    1024-QAM<br>100    4096-QAM<br>101    16384-QAM<br>110    65536-QAM<br>111    reserved |
| k) LDPC blocksize: | Defining the LDPC blocksize:<br>0    16k blocksize<br>1    64k blocksize |
| l) LDPC coderate: | Defining the chosen LDPC (low density parity check) code rate for the data pattern<br>0000    2/3<br>0001    3/4<br>0010    4/5<br>0011    5/6<br>0100    8/9<br>0101    9/10<br>0110-1111    reserved |
| m) Time interleaver enable: | Signals the usage of the time interleaver for this data pattern |
| n) Number of notches: | Defining the presence or number of notches in this data pattern<br>00    no notch in this data pattern<br>01    1 notch in this data pattern<br>10    2 notches in this data pattern<br>11    3 notches in this data pattern |
| o) Notch start: | Defines the first carrier of the data pattern |
| p) Carrier number: | Numbering is relative to the frame of the related 8 MHz segment |
| q) Notch width: | Defines the number of allocated carriers for the notch |
| r) PSI/SI reprocessing: | Signals whether PSI/SI reprocessing is performed in the headend<br>0    PSI/SI reprocessing disabled<br>1    PSI/SI reprocessing enabled |
| s) CRC_32 MIP: | 32 bit CRC coding for the L1 signalling block |

In order to ensure an even better reception of the signalling patterns in the receiving apparatus 63, the present invention further suggests to optimize the tuning position of the receiving apparatus 63. In the examples shown in FIGS. 10 and 13, the receiver is tuned to a part 38 of the transmission bandwidth by centering the part 38 around the frequency bandwidth of the data patterns to be received. Alternatively, the receiving apparatus 63 could be tuned so that the reception of the signalling pattern 31 is optimized by placing the part 38 so that a maximum part of a signalling pattern 31 is received while the wanted data pattern is still fully received. Alternatively, the present invention suggests that the length of the respective data patterns should not be different from the length of the respective preamble patterns 30 and signalling patterns 31 by more than a certain percentage for example 10%. An example for this solution can be found in FIG. 14. The borders between the data patterns 42, 43, 44 and 45 are (in the frequency direction) not deviating from the borders between preamble patterns 30 and the signalling patterns 31 by more than a certain percentage, such as (but not limited to) 10%. This small percentage can then be corrected by the above-mentioned additional error coding in the signalling patterns 31.

FIG. 16 shows a time domain representation of an example of frame 47 according to the present invention. In the transmitting apparatus 54, after the frame pattern or structure was generated in the frame forming means 59, the frequency domain frame pattern is transformed into the time domain by a transformation means 60. An example of a resulting time domain frame is now shown in FIG. 16. The frame 47 comprises a number of shortened training symbols 48, resulting from a mapping of pilot signals only onto every m-th frequency carrier (m being a natural number larger or equal than 2) by a pilot mapping means 55, followed by a guard interval 49, a signalling symbol 50, a further guard interval 51 and a number of data symbols 52, which are respectively separated by guard intervals 53. While the situation that only a single signalling symbol is present in the time domain corresponds to the example shown in FIG. 10, where only a single time slot with signalling patterns is present in the frequency domain frame structure, the example of FIG. 13 with two time slots with signalling patterns 31*a* and 31*b*, respectively, would lead to the presence of two signalling patterns in the time domain, which are eventually separated by a guard interval. The guard intervals could e.g. be cyclic extensions of the useful parts of the respective symbols. The synchronization reliability could be generally enhanced by inverting the last training symbol, i.e. by inverting the phase of the last training symbol in respect to the preceding training symbols (which have all the same phase). In the example of an OFDM system, the signalling symbols and the data symbols, including their eventually provided guard bands, could respectively have the length of one OFDM symbol. The time domain frames are then forwarded to a transmission means 61 which processes the time domain signal depending on the used multi-carrier system, for example by up-converting the signal to the wanted transmission frequency. The transmission signals are then transmitted via a transmission interface 62, which can be a wired interface or a wireless interface, such as an antenna or the like.

The number of shortened training symbols 48 in frame 47 is depending on the wanted implementation and the used transmission system. As a non-limiting example, the number of shortened training symbols 48 could be 8, which is a good compromise between correlation complexity and synchronization reliability.

FIG. 16 further shows that a respective number of frames could be combined to super frames. The number of frames per super frame, i.e. the length of each super frame in the time direction, could be fixed or could vary. Hereby, there might be a maximum length up to which the super frames could be set dynamically. Further, it might be advantageous if the signalling data in the signalling patterns for each frame in a super frame are the same and if changes in the signalling data only occur from super frame to super frame. In other words, the modulation, coding, number of data patterns etc. would be the same in each frame of a super frame, but could then be different in the succeeding super frame. For example, the length of the super frames in broadcast systems could be longer since the signalling data might not change as often, and in interactive system the super frame length could be shorter since an optimization of the transmission and reception parameters could be done on the basis of feedback from the receiver to the transmitter.

The elements and functionalities of the transmitting apparatus 54, a block diagram of which is shown in FIG. 17, have been explained before. It has to be understood, that an actual implementation of a transmitting apparatus 54 will contain additional elements and functionalities necessary for the actual operation of the transmitting apparatus in the respective system. In FIG. 17, only the elements and means necessary for the explanation and understanding of the present invention are shown. The same is true for the receiving apparatus 63, a block diagram of which is shown in FIG. 18. FIG. 18 only shows elements and functionalities necessary for the understanding of the present invention. Additional elements will be necessary for an actual operation of the receiving apparatus 63. It has to be further understood that the elements and functionalities of the transmitting apparatus 54 as well as the receiving apparatus 63 can be implemented in any kind of device, apparatus, system and so forth adapted to perform the functionalities described and claimed by the present invention.

The present invention is further directed to a frame structure (and a correspondingly adapted transmitting and receiving apparatus and method as described above), which, as an alternative to the above described embodiments, does have a number (two or more) data patterns in which at least one data pattern has a length which is different from the length of the other data pattern(s). This structure of data patterns with a variable length can be combined either with a sequence of training patterns with identical lengths and contents as described above, or with a sequence of training patterns in which at least one training pattern has a length and/or a content different from the other training patterns, i.e. a variable training pattern length. In both cases, the receiving apparatus 63 will need some information about the varying data pattern length, which could be transmitted by means of a separate signalling data channel or by means of signalling data comprised in signalling data patterns comprised in the frame structure as described above. In the later case, it might be a possible implementation if the first training pattern and the first signalling pattern in each frame always have the same length so that the receiving apparatus can always obtain the information about the varying data patterns by receiving the first training patterns and signalling patterns in every or the necessary frames. Of course, other implementations might be possible. Otherwise, the rest of the above description in relation to the training patterns, the data patterns and the signalling patterns as well as the possible implementations in the transmitting apparatus 54 and the receiving apparatus 63 is still applicable.

1. Executive Summary

The following description is a suggestion for an advantageous implementation of the present invention in a future cable based digital video broadcast system, such as (but not limited to) DVB-C2. The recent development of second generation physical layer standards for satellite (DVB-S2) and terrestrial (DVB-T2) transmission has brought a need for cable operators to deliver an improved and competitive technical performance and flexibility for digital broadcast and interactive services than can be achieved using the current first generation DVB-C standard.

The objective of this suggestion is to provide a complete system solution to the current and anticipated future requirements of cable networks, but could be applied to terrestrial networks as well.

This suggestion enables a significant improvement in throughput and system flexibility through a number of new and improved features:

Flexible and extremely efficient OFDM modulation scheme:
  Using not only the existing 8 MHz frequency raster but also larger bandwidths with specified multiples of 8 MHz allows an extremely spectrally efficient transmission system to be realized.
  Reception based on frequency slices to allow for cost-effective receiver implementation and increased system flexibility
  Notching of OFDM subcarriers to support efficient protection of (security related) terrestrial services (Accumulated radiation of cable networks disturb terrestrial services)
High order modulation of OFDM subcarriers provides a significant increase in throughput over current DVB-C systems
  Up to 69.8 Mbit/s using 1024QAM subcarrier modulation (in 8 MHz reception bandwidth)
  Up to 83.7 Mbit/s using 4096QAM subcarrier modulation (in 8 MHz reception bandwidth)
LDPC codec re-used from DVB-S2 and DVB-T2 with code rates optimized for a cable system provides greater than 3 dB gain over the current coding and facilitating compatibility with second generation DVB systems
Support for transcoding of satellite and terrestrial services to cable systems
Support for several input stream formats (single and/or multiple Transport Streams (TS) and Generic Stream Encapsulation (GSE))

Optimisation of throughput where return channels are available

Low system latency to support interactive services

Adaptation of OFDM subcarriers to optimise the throughput depending on the location and frequency slice specific SNR conditions.

This suggestion is a complete system proposal and addresses all aspects of the requirements. A detailed comparison to the C2 related requirements is given together with the description of technology in paragraph 5.

The following abbreviations are used:
ACM Adaptive Coding and Modulation
AWGN Additive White Gaussian Noise
BCH Bose-Chaudhuri-Hocquenghem multiple error correction binary block code
CAZAC Constant Amplitude Zero Autocorrelation Waveform
CCM Constant Coding and Modulation
CRC Cyclic Redundancy Check
FEC Forward Error Correction
GI Guard Interval
GS Generic Stream
GSE Generic Stream Encapsulation
GSM Global System for Mobile Communication
LDPC Low Density Parity Check code
OFDM Orthogonal Frequency Division Multiplex
PAPR Peak to Average Power Reduction
PSI/SI Program Specific Information/Service Information
QAM Quadrature Amplitude Modulation
QoS Quality of Service
RF Radio Frequency
SMATV Satellite Master Antenna Television
SNR Signal to Noise Ratio
TS Transport Stream
VCM Variable Coding and Modulation
VoD Video on Demand It has to be understood that all functionalities and requirements described below can be implemented in the respectively suited means and elements of the transmitting apparatus 54 shown in and described in relation to FIG. 17 and/or the receiving apparatus 63 shown in and described in relation to FIG. 18. Further, it is to be understood that the below detailed description of an advantageous implementation is not intended to restrict the scope of the present invention as defined in the claims.

2. System overview 2.1. Flexible n4k System

The proposed system includes a high level of flexibility regarding the mapping of the different input formats (single/multiple TS and GSE) onto the OFDM subcarriers.

The basic concept is to bundle and multiplex as many input streams as possible onto a related number of OFDM subcarriers that overall do not exceed the maximum tuner bandwidth on receiver side (e.g. 8 MHz, including the related guard bands). This is defined as a frequency data slice.

A subchannel denotes one 8 MHz bandwidth block of the existing cable channel raster. The current DVB-C bandwidth (i.e. 8 MHz) can be used as a single channel. However in order to increase the spectrum efficiency further n 8 MHz wide OFDM subchannels can be combined or "bundled" together to create a larger channel. Several frequency data slices may be combined within a channel. There is no fixed frequency bandwidth assignment for frequency slices, they are not necessarily aligned to the 8 MHz subchannels.

Spectral efficiency is increased since the guard bands of the OFDM spectrum areused only once at each side of the overall channel bandwidth. The spectral shaping of the guard band does not change with different channel bandwidths. FIG. 19 illustrates different channel bandwidth examples with the related guard bands.

It is obvious that the higher the overall channel bandwidth the lower the spectral overhead of the guard bands. The upper limit of the overall channel bandwidth depends on the available technology (D/A converter) at the headend side. Table 22 illustrates the overhead percentage for different OFDM spectrum bandwidths if the same guard band shaping is applied:

TABLE 2

Guard band overhead for different OFDM spectrum bandwidths

| OFDM Channel Bandwidth | Guard Band Overhead |
|---|---|
| 8 MHz | 5.1% |
| 16 MHz | 2.5% |
| 24 MHz | 1.7% |
| 32 MHz | 1.2% |
| ... | ... |

The frequency data slice bandwidth is not related to any fixed frequency raster and can be adjusted in a straight-forward way according to the bandwidth demands of the input streams. The only requirement is that the number of allocated subcarriers does not exceed the tuner bandwidth on receiver side. Statistical multiplexing is applied over the data slice and benefits from bandwidths that are as large as possible.

The overall channel bandwidth should be a multiple n of the subchannel raster (8 MHz). This allows for simple network planning as well as sufficiently high tuning step sizes in the receiver tuner.

The OFDM modulation is derived from the 4k operation mode used in DVB-H/T2, being extended to a multiple of the subchannel raster. The system is therefore called n4k system (n indicating the number of bundled 4k modulation blocks)

2.2. Partial OFDM Reception

To allow a cost efficient receiver implementation, an OFDM reception based on frequency slices is proposed.

Segmented OFDM reception with fixed segment sizes has already been currently successfully deployed in ISDB-T. In these systems reception of individual segments or combined segments is possible. The main application in ISDB-T is to provide mobile reception as well as fixed terrestrial reception within one RF channel.

The proposed C2 system contains an arbitrary adjustable assignment of subcarrier blocks, as shown in FIG. 20. The proposed C2 headend is able to calculate for each superframe the input stream specific distribution and frequency slice assembly of all OFDM subcarriers. Ideally each input stream or each group of input streams is mapped on the related subgroup of OFDM subcarriers. The number of allocated subcarriers can be derived directly from the input data rate. This includes the combined overhead of mode adaptation, stream adaptation and FEC encoding and the gain due to the QAM modulation.

The partitioning of the overall OFDM channel into the different frequency slices (also called frequency patterns or segments) is defined by the L1 signalling (section 3.7.2). The receiver tunes to the frequency that contains the wanted frequency data slice. The partial OFDM demodulation is applied to the selected 8 MHz receive spectrum.

Note: The width of the frequency data slice might be smaller than the receiver reception bandwidth. In this case the receiver selects after the OFDM demodulation only the information of the relevant subcarriers and forwards them to the following decoding sections.

2.3. C2 System Overview

The following FIG. 21 illustrates the top layer block diagram of the proposed C2 system:

In a first step in the proposed transmission system, the different input streams (single or multiple TS or GS) are merged and packetized to baseband packets similar to DVB-S2. This kind of mode adaptation allows stream specific (i.e. TS or GS) adjustment of the desired robustness level. It is possible to feed a single TS or GS onto a rather small number of OFDM subcarriers. However, in order to increase the diversity of the subchannel (i.e. by applying the frequency interleaver over a larger number of subcarriers) it is advantageous to bundle as many input streams as possible to approach the maximum possible bandwidth (i.e. tuner bandwidth on receiver side).

The next stage is the stream adaptation stage which performs padding (if needed) and applies baseband scrambling before the FEC encoding is applied.

The FEC encoding stage comprises a BCH encoder, a LDPC encoder as well as a bit interleaver unit, similar to those used in DVB-T2. The normal output block size of the LDPC encoder is 64800 bits. However, in order to support low latency (e.g. as required by e.g. interactive services), shorter LDPC block sizes are also supported (i.e. 16200 bit as known from DVB-T2).

In order to remove error floors for high QAM constellations (1024-QAM and above), an adjusted BCH with t-error correction of 12 bits is used.

Next the LDPC encoded FEC frames enter the BICM (Bit Interleaved Coded Modulation) stage. Here the output of the LDPC encoder is bit interleaved as in DVB-T2, with concatenation of parity interleaving followed by column twist interleaving and a demultiplexer. Bit interleaver extensions for the new, higher QAM constellations are included in this document.

Afterwards the QAM encoder maps incoming bits into complex QAM symbols. QAM mapping is based on Gray coding, and an extension of the T2 mapping for 1024-QAM and 4096-QAM is proposed.

To provide flexible settings to cope with different requirements and environments, the modulation and FEC parameters can be modified. The proposed system provides two different operation modes:

For broadcast streams, the settings of modulation and coding for each data slice (i.e. the related number of OFDM subcarriers) are adjusted solely on transmitter side. The settings are chosen to guarantee the desired Quality of Service level within the whole network. Modulation and coding for each data slice can be changed from superframe to superframe. Each subcarrier within a data slice (also called data pattern or segment) has the same modulation and coding.

If the cable network provides a return channel, the receiver can inform the transmitter about its SNR condition in order to optimize the chosen modulation and coding. This is especially of importance for optimizing the throughput for point to point interactive services (IP based, e.g. DOCSIS Internet traffic or Video on Demand VoD). Smaller multicast connections could also benefit from the SNR information if the transmitter selects modulation and coding according to the receiver with the overall worst SNR on the related data slice.

The next stage is a time interleaver which can reduce the impact of impulsive noise and other noise bursts. The time interleaver is aligned to the overall frame length and can be switched off for time critical services, such as interactive services requiring low latency.

Frequency interleaving is used to average the SNR ripple over the frequency slice width. Although the basic architecture is based on the frequency interleaver from DVB-T and DVB-T2, the width of the frequency interleaver is variable and is matched to the number of subcarriers that are allocated by the specific data slice. The frequency interleaver specific memory mapping and demapping on the transmitter as well as on the receiver side can easily be done during operation.

The output signal of each symbol interleaver is then mapped onto one data slice (also called data pattern):

The OFDM symbol builder combines all different incoming streams by mapping all of them on to the related necessary number of subcarriers, including the insertion of the appropriate pilot pattern.

The overall number of subcarriers for one OFDM symbol increases with an increasing number of bundled 8 MHz channels (n4k system). The alignment of these data slices does not have any segmentation restrictions, as shown in FIG. 22. The only requirement is that the width of one data slice (i.e. the number of allocated subcarriers) must not exceed the receiver bandwidth (i.e. 8 MHz respectively the pass band bandwidth of the receiver frontend).

The proposed frequency slicing provides a very efficient mapping of the accumulation of the bandwidth demand of all different input streams onto an overall large bandwidth without any significant stuffing overhead.

Afterwards a guard interval is pre-pended to each OFDM symbol. This document proposes three different guard interval lengths to provide the possibility to optimize the guard interval to the network specific environment (i.e. maximum echo length).

In the final framing section, each 320 data OFDM symbols are separated by a preamble, consisting of a training sequence phase (allowing all important synchronization as well as initial channel estimation functions) and two 16.QAM modulated L1 signalling symbols (containing all important physical layer information for the upcoming frame).

2.4. DVB-S/DVB-S2 Service Transcoding

For transcoding satellite streams into C2 cable networks the block diagram in FIG. 23 is usually valid: TS level is used as interface between satellite decoding and C2 specific encoding. The TS based output streams of the DVB-S system are therefore encoded according to the upper signal chain.

In order to perform correct adaptation of all PSI/SI information entries within all transport streams, an additional PSI/SI reprocessing block is included at the beginning of the proposed C2 encoding.

Note: The same TS based processing might be applicable for transcoding DVB-T or DVB-T2 transport streams into the cable network.

For SMATV headends that transcode DVB-S2 services into smaller cable networks, PSI/SI processing might not applied (similar to DVB-C SMATV systems). In this case it is not needed to reverse all encoding steps to insert the signals into the cable network. Moreover, the DVB-S2 signals are decoded only until baseband packet levels. These baseband packets are then inserted directly into the proposed C2 system. FIG. 24 shows the related block diagram.

3. System Description
3.1. Mode Adaptation

Mode adaptation is reused as much as possible from DVB-S2. The system works with Transport Stream Input or Generic Stream Input (DVB GSE protocol to adapt an IP stream into a generic stream). Both formats support single and multiple input stream modes, as shown in FIG. 25.

This kind of mode adaptation allows stream specific (i.e. TS or GS) adjustment of the desired robustness level. The higher the SNR, the higher the 'ModCod' mode is used (i.e. combination of modulation scheme and selected FEC mode).

In a cable channel the level of SNR ripple is limited compared to terrestrial systems. Therefore the emphasis in this proposal is on simplicity and reduction of the signalling overhead.

Similar to DVB-S2 various stream configurations are supported to provide the required system flexibility:
- Single transport stream input (CCM): All services of the input stream are protected with the same FEC level by the system. VCM is not directly available at single transport stream level.
- Multiple transport stream input (CCM and VCM):
  - Each transport stream can be protected separately with a single FEC level
  - Protection may be differentiated in different transport streams (VCM).

3.2. FEC Encoding
3.2.1. BCH

BCH encoding is performed according to DBV-S2. Use of 12-error correction BCH is proposed for all coderates in order to avoid a high error floor which is seen for the higher order modulations (1024QAM, 4096QAM) proposed for DVB-C2.

TABLE 3 coding parameters (for normal FECFRAME $n_{ldpc}$ = 64 800)

| LDPC Code | BCH Uncoded Block $K_{bch}$ | BCH coded block $N_{bch}$ LDPC Uncoded Block $k_{ldpc}$ | BCH t-error correction | $N_{bch} - K_{bch}$ |
|---|---|---|---|---|
| 2/3 | 43 008 | 43 200 | 12 | 192 |
| 3/4 | 48 408 | 48 600 | 12 | 192 |
| 4/5 | 51 648 | 51 840 | 12 | 192 |
| 5/6 | 53 808 | 54 000 | 12 | 192 |
| 8/9 | 57 408 | 57 600 | 12 | 192 |
| 9/10 | 58 128 | 58 320 | 12 | 192 |

TABLE 4 coding parameters (for short FECFRAME $n_{ldpc}$ = 16 200)

| LDPC Code identifier | BCH Uncoded Block $K_{bch}$ | BCH coded block $N_{bch}$ LDPC Uncoded Block $k_{ldpc}$ | BCH t-error correction | $N_{bch} - K_{bch}$ |
|---|---|---|---|---|
| 2/3 | 10 632 | 10 800 | 12 | 168 |
| 3/4 | 11 712 | 11 880 | 12 | 168 |
| 4/5 | 12 432 | 12 600 | 12 | 168 |
| 5/6 | 13 152 | 13 320 | 12 | 168 |
| 8/9 | 14 232 | 14 400 | 12 | 168 |

3.2.2. LDPC

LDPC encoding is performed according to DVB-S2. The blocksize of the LDPC codec is $N_{ldpc}$=16200 or 64800.

3.2.3. Interleaver
3.2.3.1. Bit Interleaver

A bit interleaver shall be employed to optimize assignments between LDPC code bits and Gray mapped QAM symbol bits. As in DVB-T2 it shall consist of a block interleaver and a de-multiplexer.

In the block interleaver part, as shown in FIG. 26, the output of the LDPC encoder shall be parity interleaved first and then be stored into memory of $N_c$ columns and $N_r$ rows. The data are written column by column with column twisting offset $t_c$ and are read row by row.

The output $N_c$-tuple $\{b_{0,r}, b_{1,r}, b_{2,r}, \ldots, b_{N_c-1,r}\}$ with respect to the r-th row is permuted into $\{y_{0,r}, Y_{1,r}, y_{2,r}, \ldots, y_{N_c-1,r}\}$ in de-multiplexer part, where each m bits belong to a $2^m$-QAM symbol.

In addition to DVB-T2 constellations, 1024QAM and 4096QAM are proposed for broadcasting services. The necessary parameters are shown in Table 5, 6 and 7.

TABLE 5

Bit Interleaver structure (1024 QAM, 4096 QAM)

| | Rows $N_r$ | | Columns |
|---|---|---|---|
| Modulation | $N_{ldpc}$ = 64 800 | $N_{ldpc}$ = 16 200 | $N_c$ |
| 1024QAM | 6480 | 1620 | 10 |
| 4096QAM | 5400 | 1350 | 12 |

TABLE 6

Column twisting parameter $t_c$ (1024QAM, 4096QAM)

| | Columns | | Twisting parameter $t_c$ | | | | | | | | | | | |
|---|---|---|---|---|---|---|---|---|---|---|---|---|---|---|
| Modulation | Nc | $N_{ldpc}$ | Col. 0 | 1 | 2 | 3 | 4 | 5 | 6 | 7 | 8 | 9 | 10 | 11 |
| 1024QAM | 10 | 64800 | 0 | 3 | 6 | 8 | 11 | 13 | 15 | 17 | 18 | 20 | — | — |
| | | 16200 | 0 | 1 | 2 | 2 | 3 | 3 | 4 | 4 | 5 | 7 | | |
| 4096QAM | 12 | 64800 | 0 | 0 | 2 | 2 | 3 | 4 | 4 | 5 | 5 | 7 | 8 | 9 |
| | | 16200 | 0 | 0 | 0 | 2 | 2 | 2 | 3 | 3 | 3 | 6 | 7 | 7 |

TABLE 7

Parameters for de-multiplexing of bits to cells for rate 2/3, 8/9, and 9/10

| Modulation format | 1024-QAM | | | | | | | | | | |
|---|---|---|---|---|---|---|---|---|---|---|---|
| Input bit-number, i for $b_{i,r}$ | 0 | 1 | 2 | 3 | 4 | 5 | 6 | 7 | 8 | 9 | |
| Output bit-number, j for $y_{j,r}$ | 8 | 0 | 1 | 2 | 3 | 4 | 6 | 5 | 9 | 7 | |
| Modulation format | 4096-QAM | | | | | | | | | | |
| Input bit-number, i for $b_{i,r}$ | 0 | 1 | 2 | 3 | 4 | 5 | 6 | 7 | 8 | 9 | 10 | 11 |
| Output bit-number, j for $y_{j,r}$ | 10 | 0 | 1 | 2 | 3 | 4 | 5 | 6 | 8 | 7 | 11 | 9 |

TABLE 8

Parameters for de-multiplexing of bits to cells for rate 3/4, 4/5, and 5/6

| Modulation format | 1024-QAM | | | | | | | | | | |
|---|---|---|---|---|---|---|---|---|---|---|---|
| Input bit-number, i for $b_{i,r}$ | 0 | 1 | 2 | 3 | 4 | 5 | 6 | 7 | 8 | 9 | |
| Output bit-number, j for $y_{j,r}$ | 6 | 4 | 8 | 5 | 0 | 2 | 1 | 3 | 9 | 7 | |
| Modulation format | 4096-QAM | | | | | | | | | | |
| Input bit-number, i for $b_{i,r}$ | 0 | 1 | 2 | 3 | 4 | 5 | 6 | 7 | 8 | 9 | 10 | 11 |
| Output bit-number, j for $y_{j,r}$ | 8 | 0 | 6 | 1 | 4 | 5 | 2 | 3 | 7 | 10 | 11 | 9 |

3.2.3.2. Time Interleaver

To mitigate the influence from impulsive or burst noise, a time interleaver is proposed for broadcast services. The interleaving length of the time interleaver is kept short in comparison to DVB-T2.

FIG. 27 shows the time interleaver operation. The time interleaver takes the output from the QAM encoder and writes the data into columns. The outputs are passed to the frequency interleaver by reading out the interleaver cells in rows.

- The number of rows R is a fixed value of 40. This value assumes a 2.5% erasure rate, i.e. approximately one in every 40 symbols is lost due to interference.
- The time interleaver length is aligned to the frame length (section 7.5) for simplicity.
- The number of columns $N_L$ in the time interleaver matches the number of subcarriers in the required service.
- The usage of time interleaving for each block of the segmented OFDM system is signalled in the L1 packets.
- Transmitter memory requirement: 4096*12*40=1966080=1.97 Mbit A typical interferer can be considered to be the 577 μs burst received from a GSM mobile phone. This duration corresponds to approximately one n4k symbol period. Depending on the severity of the erasure a 9/10 code rate or more robust code rate may be used for the LDPC encoder.

Time interleaving shall be optional for interactive services (using adaptive OFDM):
- Services with high QoS and low latency requirements (e.g. VoD) should use time interleaving
- Services requiring low latency (e.g. gaming, TCP/IP based) should not use time interleaving.

3.2.3.3. Frequency Interleaver

In general the frequency interleaver shall be used similar to DVB-T2. Since variable frequency slices are permitted for OFDM reception the interleaver size must be calculated dynamically by the transmitter as well as the receiver (i.e. the interleaver size varies depending on the number of subcarriers allocated).

The purpose of the frequency interleaver, operating on the data cells of one OFDM symbol, is to map the data cells onto the $N_{data}$ available data carriers in each symbol. The frequency interleaver shall process the data cells $X_{m,l}=(x_{m,l,0}, x_{m,l,1}, \ldots, x_{m,l,N_{data}-1})$ of the OFDM symbol l of C2-frame m.

A parameter $M_{max}$ is then defined according to Table 8.

TABLE 8

Value of $M_{max}$ for the frequency interleaver

| FFT Size | $M_{max}$ |
|---|---|
| 4K | 4 096 |

The interleaved vector $A_{m,l}=(a_{m,l,0}, a_{m,l,1}, a_{m,l,2} \ldots a_{m,l,N_{data}-1})$ is defined by:

$a_{m,l,H(q)}=x_{m,l,q}$ for even symbols of the frame (l mod 2=0) for q=0, ..., $N_{data}$-1

$a_{m,l,q}=x_{m,l,H(q)}$ for odd symbols of the frame (l mod 2=1) for q=0, ..., $N_{data}$-1

H(q) is a permutation function based on sequences $R'_i$ defined by the following.

An ($N_r$-1) bit binary word $R'_i$ is defined, with $N_r=\log_2 M_{max}$, where $R'_i$ takes the following values:

i=0,1: $R'_i[N_r-2, N_r-3, \ldots, 1, 0]=0, 0, \ldots, 0, 0$
i=2: $R'_i[N_r-2, N_r-3, \ldots, 1, 0]=0, 0, \ldots, 0, 1$
2<i<$M_{max}$: {$R'_i[N_r-3, N_r-4, \ldots, 1, 0]=R'_{i-1}[N_r-2, N_r-3, \ldots, 2, 1]$};
in the 4k mode: $R'_i[10]=R'_{i-1}[0] \oplus R'_{i-1}[2]$ A vector $R_i$ is derived from the vector $R'_i$ by the bit permutations given in Table 9.

TABLE 9

| Bit permutations | | | | | | | | | | | |
|---|---|---|---|---|---|---|---|---|---|---|---|
| $R'_i$ bit positions | 10 | 9 | 8 | 7 | 6 | 5 | 4 | 3 | 2 | 1 | 0 |
| $R_i$ bit positions (H) | 7 | 10 | 5 | 8 | 1 | 2 | 4 | 9 | 0 | 3 | 6 |

The permutation function H(q) is defined by the following algorithm:

```
q = 0;
for (i = 0; i < M_max; i = i + 1)
    {H(q) = (i mod 2) · 2^(N_r-1) + Σ_{j=0}^{N_r-2} R_i(j) · 2^j;;
    if (H(q)<N_data) q = q+1; }
```

A schematic block diagram of the algorithm used to generate the permutation function is represented in FIG. 28.

The output of the frequency interleaver is the interleaved vector of data cells $A_{m,l}=(a_{m,l,0}, a_{m,l,1}, a_{m,l,2}, \ldots a_{m,l,N_{data}-1})$ for symbol l of frame m.

$N_{data}$ is signalled in L1 symbols.

3.3. QAM Subcarrier Modulation

The modulation of the OFDM subcarriers shall be regular Quadrature Amplitude Modulation (QAM): The use of the following constellations is proposed, based on the definitions of DVB-T2.

16-QAM
64-QAM
256-QAM

In order to increase the throughput rates of the proposed C2 system, the following higher constellations are proposed for broadcasting services 1024-QAM (using Gray mapping)
4096-QAM (using Gray mapping)

In addition, even higher QAM constellations may be applicable for interactive services that can exploit the advantages of ACM (adaptive coding and modulation), i.e. transmitter and receiver exchange OFDM tonemaps that signal the chosen QAM constellation for each data slice. SNR-dependant adjustment of the chosen constellation and coding is possible.

3.4. OFDM Parameters

This chapter proposes the OFDM structure to use for each transmission mode. The transmitted signal is organized in frames as described in section 3.5. Each frame has duration of $T_F$, and consists of $L_F$ OFDM symbols. Each symbol is constituted by a set of K carriers transmitted with a duration $T_S$. It is composed of two parts: a useful part with duration $T_U$ and a guard interval with duration $\Delta$. The guard interval consists of a cyclic continuation of the useful part, $T_U$, and is inserted before it.

The symbols in an OFDM frame are numbered from 1 to $L_F$. All symbols contain data and/or reference information.

Since the OFDM signal comprises many separately-modulated carriers, each symbol can in turn be considered to be divided into cells, each corresponding to the modulation carried on one carrier during one symbol.

The OFDM symbols contain pilots that can be used for frame synchronization, frequency synchronization, time synchronization, channel estimation, and can also be used to track the phase noise.

The carriers are indexed by $k \in [K_{min}; K_{max}]$ and determined by $K_{min}$ and $K_{max}$. The spacing between adjacent carriers is $1/T_U$ while the spacing between carriers $K_{min}$ and $K_{max}$ are determined by $(K-1)/T_U$.

The OFDM parameters are summarised in Table 10. The values for the various time-related parameters are given in multiples of the elementary period T and in microseconds.

A n4k mode of operation is proposed as a good trade-off between symbol length, phase noise sensitivity as well as spectrum side lobe steepness. This is based on the DVB-H/T2 4k mode, within an 8 MHz channel. The system bandwidth can be extended to n multiples of 8 MHz.

The following table illustrates the settings for several channel bandwidths where n varies from 1 to 4.

With the added advantage of channel bundling, the proposed OFDM values are very similar to the main parameters of the DVB-H/T2 4k mode, including carrier spacing as well as the symbol duration.

Note:

Other channel bandwidths can be obtained by adjusting the elementary period T. For example, a 6 MHz channel bandwidth can be derived from an 8 MHz channel by changing the elementary period from 7/64 μs to 7/48 μs.

3.5. Framing

The framing structure is shown in FIG. 29, which is similar as to the above described FIG. 16. The super frame is divided into C2 frames which are further divided into OFDM symbols. A C2 frame always starts with one preamble symbol then two layer 1 signalling symbols and finally $L_F$-3 data symbols.

Except from the preamble symbol which has duration Tu (no guard interval) the duration of each symbol in the frame has the same period $T_s$. The symbol period $T_s$ consists of the sum of guard interval duration $T_{GI}$ and the useful symbol duration $T_u$.

The number of data symbols is fixed at 8*Time Interleaver (sec. 3.2.3.2) symbol length=8*40=320 symbols. A C2 frame has a total of $L_F$=323 symbols consisting of 320 data symbols, one preamble symbol (without guard interval) and two L1 signalling symbols. The overhead for signalling is therefore 3/323 (approx. 0.9%) for the preamble and L1 signalling symbols.

The proposed C2 frame period is: $T_F=T_u+322*(T_{GI}+T_u)$

TABLE 11

Frame periods of the 4nk system for different guard interval lengths

| Guard Interval Length | Frame Period |
|---|---|
| 1/64 | 147.0 msec |
| 1/128 | 145.8 msec |
| 1/256 | 145.3 msec |

The period of a C2 super frame is in the range of: $1*T_F <= T_{SF} <= (2^{16}-1)*T_F$ L1 signalling data can be changed only at super frame boundaries. For broadcast-only services the super frame period can be set to its maximum value of $(2^{16}1)*T_F$, which is approximately 2 hours 37 minutes, as L1 signalling param-

TABLE 10

4nk OFDM modulation for different channel bandwidths

| | 8 MHz channel bandwidth | 16 MHz channel bandwidth | 24 MHz channel bandwidth | 32 MHz channel bandwidth | ... |
|---|---|---|---|---|---|
| Elementary Period T | 7/64 μs | 7/128 μs | 7/192 μs | 7/256 μs | |
| Carrier spacing (kHz) | 2.232 | 2.232 | 2.232 | 2.232 | 2.232 |
| Duration Tu | 4096T (448 μs) | 8192T (448 μs) | 12288T (448 μs) | 16384T (448 μs) | |
| Number of active carriers | 3409 | 6993 | 10577 | 14161 | ... |
| Guard interval lengths | 1/256 (1.75 usec) 1/128 (3.5 usec) 1/64 (7 usec) | 1/256 (1.75 usec) 1/128 (3.5 usec) 1/64 (7 usec) | 1/256 (1.75 usec) 1/128 (3.5 usec) 1/64 (7 usec) | 1/256 (1.75 usec) 1/128 (3.5 usec) 1/64 (7 usec) | 1/256 (1.75 usec) 1/128 (3.5 usec) 1/64 (7 usec) | eters are not envisaged to change frequently. For either interactive-only or mixed broadcast/interactive services then the super frame length can be shortened as required. The super frame period is provided as an L1 signalling parameter.

Zapping time without knowledge of the frequency data slice location is expected to require up to two complete C2 frame periods (288 ms) depending on the relative timing of the start of the channel change to the start of a C2 frame.

3.6. Pilot Carriers in Data Symbols

The scattered pilot density is derived from
 The maximum delay length of the multipath channel to determine the repetition rate in frequency direction
 The maximum Doppler frequency of the cable channel to determine the repetition rate in time direction
Since the cable channel is considered to be quasi-static in the time direction, the repetition rate can be kept low.

In order to optimize the pilot pattern overhead, the scattered pilot pattern density is dependent on the guard interval size.

The following pilot patterns are proposed

TABLE 12

Scattered pilot patterns for the proposed C2 system

| OFDM mode | Guard Interval Length | Separation of pilot bearing carriers (x) | Number of symbols forming one scattered pilot sequence (y) |
|---|---|---|---|
| n4k | 1/64 | 4 | 12 |
| n4k | 1/128 | 4 | 24 |
| n4k | 1/256 | 4 | 48 |

Table 12 shows the shift in frequency of the pilot position after one symbol is four carriers. The repetition rate in the frequency direction is x.y (e.g. 48 carrier distance for GI=1/64).

FIG. 30 illustrates the pilot pattern (black dots) for a guard interval length of 1/64.

The first as well as the last carrier of each OFDM symbol will always contain pilot carriers.

According to the Nyquist criterion standalone frequency interpolation is possible for each OFDM symbol itself. However, improving the channel estimation quality by applying additional time interpolation is possible.

Since time interpolation is not in general needed, continual pilots (CPs) are also not required. To calculate common phase error (CPE) it is sufficient to only consider the frequency interpolated channel estimation.

3.7. Preamble

A preamble defines the start of a new C2 frame. The preamble must allow the following functionalities:
 Frame and initial OFDM symbol synchronization
 Initial offset correction (frequency and sampling rate offsets)
 Initial channel estimation
 Information about the basic physical layer parameter for the next frame:
  Guard Interval
  OFDM subcarrier allocation
   Basic structure of different subcarrier segments
    Start/stop carrier, block width, . . .
    Segment specific subcarrier modulation scheme
    Segment specific subcarrier FEC settings
  Frequency notch indication The preamble is divided into a training sequence phase and a L1 signalling phase. The training phase consists of 8 shortened training symbols; the overall length is one OFDM symbol (4096 samples). The succeeding two OFDM symbols contain the L1 signalling (including the related Guard Interval).

FIG. 31 illustrates the basic structure of one C2 frame (in the time domain) and FIG. 32, which is similar to the above explained FIG. 13 shows the basic structure of one C2 frame in the frequency domain.

The proposed preamble provides all typical important functionalities independent from the tuning position.
 Time/frame synchronization
 Coarse/fine frequency offset estimation
 Initial channel estimation
 L1 signalling The ability to perform all preamble functionalities independent from the tuning position allows the usage of an arbitrary data slicing in the frequency domain. In particular the width (bandwidth) of the data slices does not have to be aligned to any fixed segment size. The functionality of the different blocks is described below:

3.7.1. Shortened Training Symbols

The bandwidth of the preamble sequence is limited to the reception bandwidth of the segmented receiver (i.e. 8 MHz). The overall channel bandwidth of the transmission signal is equal to a multiple of this receiver bandwidth (i.e. tuner bandwidth). The density of the pilot carriers in the training symbols is adjusted to fulfil at least the Nyquist criterion. For the n4k mode the following preamble is proposed:
 8 shortened training symbols (spacing of pilot carriers=8)
 Repetition rate of the shortened training symbol: 512 samples Each training sequence subblock is equal to the initial receiver bandwidth and contains a repetition of a basic pseudo noise sequence with optimized correlation properties, which allows several advantages:
 If the receiver tuner selects a window that matches to one of the equidistant segments of the broader transmit channel bandwidth, the training sequence is deployed fully and in an optimized way.
 If the tuner selects an arbitrary tuning frequency within the transmit channel bandwidth, the optimized correlation property still holds due to the cyclic behaviour of the autocorrelation sequences: At the receiver the retrieved preamble sequence will correspond to a circularly shifted version of the original one in the frequency domain. Therefore the basic autocorrelation property still applies as long as the pilot density condition is still fulfilled. Thus the pseudo noise behaviour, the low PAPR property and the optimum autocorrelation characteristics hold for any tuning position. Furthermore, coarse frequency offset calculation (typically done in the frequency domain) is still possible.

FIG. 33, which is similar to the above explained FIG. 6 shows the proposed repetition of the basic pseudo noise sequence.

As mentioned before, a repetition of 8 training sequences is proposed as a reasonable trade-off between correlation complexity and synchronization reliability. The pn-sequence has good overall autocorrelation (i.e. good correlation peak properties) as well as appropriate sliding correlation properties (i.e. delivering a correlation plateau, for example CAZAC sequences as used in WLAN preambles). Furthermore, synchronization reliability is increased further by inverting the last of the eight training sequences.

The training sequence in its alignment to the 8 MHz raster does not allocate the complete bandwidth: Within each repetition, a number of carriers are omitted to meet spectrum characteristics and to allow for proper frequency offset compensation. For example, in order to allow a capture range of 250 kHz, the same bandwidth remains unused at both sides of the training sequence spectrum.

3.7.2. L1 Signalling

L1 signalling provides information on all relevant physical layer specific parameters.

As illustrated in FIG. 34, L1 signalling follows the training sequence phase in each frame. The duration of the L1 signalling is two OFDM symbols. The bandwidth of the L1 signal is 4 MHz, each two L1 blocks (also called signalling patterns) are aligned to the initial 8 MHz raster.

The frequency behaviour of the L1 signalling has to reflect typical filter characteristics of a receiver as well as the overall spectrum mask:

In order to allow proper L1 decoding on each arbitrary tuning position, the L1 block does not use all subcarriers in its 4 MHz block. Additionally the guard band characteristics from the overall channel bandwidth are reused. In any n4k mode, 343 subcarriers on each border are not used for data transmission (guard band). The same number of unused carriers is used for the L1 signal, therefore the available number of carriers per L1 block is:

3584/2−2*343=1106 carriers

FIG. 34, which is similar to FIG. 15 explained above, illustrates the carrier allocation of the L1 symbols (signalling patterns):

The following structure of the L1 signalling (signalling patterns) is proposed:

TABLE 13

L1 signalling structure Table 13 indicates that up to 32 different frequency slices in one n4k channel are supported.
Calculating the resulting maximum number of L1 signalling bits results in an overall number that fits into two consecutive (in time direction) QAM modulated L1 symbols with 4 MHz bandwidth, including the overhead of an appropriate FEC scheme.

| | | |
|---|---|---|
| n of n4k | | 4 bits |
| Current n of n4k | | 4 bits |
| Guard Interval length | | 2 bits |
| Superframe length | | 16 bits |
| Frame number | | 16 bits |
| Number of data slices | | 5 bits |
| Loop over data slices | | |
| { | | |
| | n - Segment number | 4 bits |
| | Start carrier number | 12 bits |
| | Data slice width (number of carriers) | 12 bits |
| | Data slice QAM modulation | 3 bits |
| | LDPC blocksize | 1 bit |
| | LDPC coderate | 3 bits |
| | Time interleaver enable | 1 bit |
| | Number of notches | 2 bits |
| | Loop over notches { | |
| | Start carrier number | 12 bit |
| | Notch width (number of carriers) | 12 bit |
| | } End notch loop | |
| | PSI/SI reprocessing | 1 bit |
| } End data slice loop | | |
| Reserved | | 1 bit |
| CRC_32 MIP | | 32 bits |

Parameter Description:

| | |
|---|---|
| n of n4k | Defines the overall channel bandwidth of the proposed 4nk system as a multiple of 8 MHz<br>0000 reserved<br>0001 8 MHz (n = 1)<br>0010 16 MHz (n = 2)<br>0011 24 MHz (n = 3)<br>0100 32 MHz (n = 4)<br>... |
| Current n of n4k | Indicates the location of the decoded L1 signalling block within the complete n4k channel<br>0000 reserved<br>0001 0 . . . 8 MHz (n = 1)<br>0010 8 . . . 16 MHz (n = 2)<br>0011 16 . . . 24 MHz (n = 3)<br>0100 24 . . . 32 MHz (n = 4) |
| Guard Interval length | Defines the length of the guard interval for all data symbols as well as for the L1 symbol<br>00 GI = 1/64<br>01 GI = 1/128<br>10 GI = 1/256<br>11 reserved |
| Superframe length | This parameter describes the number of frames that build one superframe |
| Frame number | Allows a frame counting within one superframe. At the beginning of each superframe this counter is reset. |
| Nr. of data slices | Defines the number of frequency slices in the overall channel bandwidth |
| n-Segment number | This parameter signals the location of the first subcarrier of the data slice (i.e. which 8 MHz segment) |
| Start carrier number | Defines the first carrier of the data slice. Numbering is relative to the frame of the related 8 MHz segment |
| Data slice width | Defines the number of allocated subcarriers for the data slice |
| Data slice QAM modulation | This parameter indicates the QAM modulation for the data segment:<br>000 16-QAM<br>001 64-QAM<br>010 256-QAM<br>011 1024-QAM<br>100 4096-QAM<br>101 16384-QAM<br>110 65536-QAM<br>111 reserved |
| LDPC blocksize | Defining the LDPC blocksize:<br>0 16k blocksize<br>1 64k blocksize |
| LDPC coderate | Defining the chosen LDPC code rate for the data slice:<br>000 2/3<br>001 3/4<br>010 4/5<br>011 5/6<br>100 8/9<br>101 9/10<br>110-111 reserved |
| Time interleaver enable | Signals the usage of the time interleaver for this data slice |
| Number of notches | Defining the presence or number of notches in this data slice<br>00 no notch in this data slice<br>01 1 notch in this data segment<br>10 2 notches in this data segment<br>11 3 notches in this data segment |
| Notch start carrier number | Defines the first carrier of the data slice. Numbering is relative to the frame of the related 8 MHz segment |
| Notch width | Defines the number of allocated subcarriers for the notch |
| PSI/SI reprocessing | Signals whether PSI/SI reprocessing is performed in the headend<br>0 PSI/SI processing disabled<br>1 PSI/SI processing enabled |
| CRC_32 MIP | 32 bit CRC coding for the L1 signalling block |

3.7.3. Start-Up Procedure

This short chapter is intended to illustrate the preamble handling on the receiver side.

Initially the receiver tuner, e.g. the receiving tuner of the receiving apparatus 63 shown in and explained in relation to FIG. 18, tunes to an arbitrary frequency band which is either aligned or not aligned to the 8 MHz raster in cable networks. In this position, the tuning window covers a complete preamble sequence and two complete L1 signalling blocks. Therefore the receiver is able to synchronize, to perform an initial channel estimation and to extract L1 signalling. From the L1 signalling, e.g. the current n of n4k information, the receiver has knowledge of the location of the received and decoded signalling pattern(s) in relation to the present frame and can then tune to the frequency of the wanted data slice (the data slice is typically not aligned to the 8 MHz raster) and is able to receive and decode all wanted data slices in all succeeding frames of this superframe in this tuning position.

3.8. Data Slicing

As explained in the previous chapters, the preamble is designed in a way that allows all important frame related functionalities (i.e. receiver synchronization, channel estimation and L1 decoding) in any tuning position.

Therefore the data slices, i.e. the data patterns as explained in relation to FIG. 10, need not follow any fixed segment allocation. An appropriate number of OFDM subcarriers can be allocated. The only condition regarding the width of one data slice is that it does not exceed the receiving bandwidth (i.e. 8 MHz minus 2*guard band (e.g. 7.6. MHz)).

Each data slice has a constant number of data bits (i.e. data carriers) per frequency slice per super frame. This number of data bits per data slice may change from superframe to superframe.

FIG. 35 illustrates the building of the overall OFDM signal as the combination of several OFDM subblocks (data slices). Each signal encoding chain is mapped onto the matching number of subcarriers.

The smaller the bandwidth of the data segment the lower the interleaving gain from the frequency interleaver. Bundling of several streams with the same QoS requirements in the mode adaptation is one method to deploy frequency diversity in the best possible way.

3.9. Notching

Terrestrial services and the DVB cable system often share the same frequency range. Interferences between both services reduce the SNR of the affected service. Radiation from cable networks disturbs the operation of the terrestrial services. Similarly, the transmission quality of cable services suffers from the ingress of terrestrial services by causing additional noise on the cable medium. An example is shown in FIG. 36. Notching of OFDM carriers is used to protect the different communication systems from each other: The OFDM carriers allocated to the same frequency range(s) are omitted from the data communication.

An example of the system described above on terrestrial side is flight security services and many more.

In order to maximize the throughput the notch width should be as narrow as possible, that is only those OFDM subcarriers that directly overlap with those terrestrial services should be omitted (c.f. FIG. 36).

The location of the notches is part of the L1 signalling: For example, the first notched carrier and the notch width are part of the L1 signalling.

3.10. OFDM Adaptivity for Interactive Services

If the cable network is return channel capable, the proposed C2 system shall be usable as downstream medium for interactive data services, as shown in FIG. 37. Similar to the existing DVB-C system the C2 system shall be able to integrate the DOCSIS downstream data traffic. The upstream channel is provided in a DOCSIS compliant way and is out of the scope of this document Examples of these kinds of interactive services are all DOCSIS based data communication, including all IP based services or Video on Demand (VoD).

In this scenario the proposed system is able to deploy the advantages of adaptive OFDM (ACM—adaptive coding and modulation): For interactive point to point communication services the modem and the transmitter can exchange their SNR conditions in their assigned frequency slice in order to optimize their data throughput. This technique provides a precise protection of the data slice as well as dynamic link adaptation to propagation conditions by targeting each individual terminal (C2 modem/receiver).

In FIG. 38 an example cable network with the C2 headend and a number of connected C2 receivers/modems is depicted. Depending on channel influences like attenuation or multipath ripple the available SNR in each location changes. For example, the C2 modem/receiver 1 is quite close to the headend and therefore any attenuation in the downlink spectrum is low. The modem will inform the headend about its good channel conditions, the headend selects an appropriate combination of modulation and coding with a very high throughput rate. In contrast, the distance between the C2 headend and the C2 modem/receiver 2 is assumed to be very long, resulting in a higher attenuation in the receive spectrum. The available SNR range is therefore significantly lower, the C2 modem/receiver 2 informs the C2 headend to use a more robust combination of modulation and coding.

Theoretically it would be possible to signal the SNR condition of each individual OFDM subcarrier back to the C2 headend. Another alternative that is widely used in other communication systems like PLC (Powerline Communication System) is to send one SNR value per coherence bandwidth slot.

However, this document proposes to use just one overall combination of modulation and coding for each data slice that is used for interactive services. The main reasons are:

L1 signalling/OFDM tonemap complexity: If each subcarrier or coherence bandwidth slot would be treated separately, the overall amount of L1 signalling data as well as the OFDM tonemap data (i.e. feedback data containing information containing the carrier specific SNR conditions) would increase significantly.

Limited SNR ripple: Due to the rather low amplitude levels of the echo signals the resulting SNR variation in the related frequency slice of the receive spectrum is not too big (e.g. overall frequency slot ripple below 3 dB). Carrier specific SNR treatment is typically targeted by using different modulation schemes for different OFDM subcarriers while the complete data slice is encoded with same FEC settings (i.e. LDPC coding). The overall small level of amplitude ripple can't be covered in an efficient way by the rather high SNR steps between the different constellations (e.g. roughly 6 dB between neighbored square constellations).

If interactive service data slices select just one overall modulation and coding setting, they fit very well to the overall proposed C2 architecture in which each different broadcast stream is allowed to use a specific 'modcod' setting, too. Despite the additional exchange of SNR conditions between transmitter and receiver the system uses exactly the same data slicing and L1 signalling mechanisms.

Note: The message formats of exchanging SNR conditions or signalling appropriate combinations of modulation and coding is the subject of higher layers and is out of scope of this proposal.

3.11. Spectrum Shaping

In order to minimize the influence of adjacent channel interference, the DVB-C2 transmit spectrum must fulfil an appropriate spectrum mask criteria. Since the proposed C2 system uses a n4k OFDM modulation with very high subcarrier QAM constellations, the sidelobe level at the channel border must be below the required SNR valued for the physical layer mode that demands the highest SNR value for QEF (quasi error free) reception in an AWGN environment.

FIG. 39 shows the relation.

To improve the out of band OFDM spectrum characteristics and to achieve the required isolation between channels at the border frequency between two channels, filtering is required. Basically two methods are applicable.

Windowing: Makes the amplitude go smoothly to zero at the symbol boundaries (time domain). The windowing in the time domain means the resulting spectrum is a convolution of the spectrum of the windowing function with a set of impulses at the subcarrier frequencies.

Conventional filtering techniques (digital and/or analogue)

Windowing and filtering are dual techniques to reduce out of band spectrum. The cut off behaviour of conventional filtering has a potential impact on the performance of high subcarrier modulation modes. In contrast, windowing in the time domain causes no system degradation. The drawback of windowing is a partial overlap between consecutive symbols and the related degradation of the usable guard interval fraction. FIG. 40 shows the basic principle of windowing.

The overlap between consecutive OFDM symbols has the duration $T_{TR}$. The higher the $T_{TR}$ value, the more the level of the out of band spectrum is reduced.

The final channel isolation as well as the related side lobe attenuation has to be investigated in adjacent channel system simulations.

3.12. PAPR

Low complexity solutions for PAPR reduction on the transmitter side should be investigated. Larger overall FFT sizes by channel bundling are expected to increase the probabilistic crest factor of the OFDM system slightly. For example, the usage of a 32K IFFT on transmitter side is expected to increase the probabilistic crest factor of the OFDM system by less then 0.5 dB as compared to an 8K FFT based transmitter.

Additionally it is known that an increase of the order of the QAM modulation has no negative effect for the probabilistic crest factor for OFDM systems with 1K or higher FFT sizes. Therefore the optimization problem for crest factor reduction for the proposed OFDM system is similar to the one for DVB-T2.

It should be noted that the method of active constellation extension will be less efficient than in DVB-T2 due to the very high order QAM constellations typically used for cable transmissions.

4. System Performance/Throughput 4.1. Throughput Rates

The following tables list different throughput rates of the proposed n4k C2 system for 8 MHz and 32 MHz channel bandwidths. In addition a comparison to the current maximum DVB-C throughput is given (DVB-C 256-QAM).

The calculation considers the following system overhead:
Guard interval (1/64, 128, 1/256)
LDPC codec
BCH codec
Pilot pattern overhead
Framing overhead (3 preamble/signalling symbols out of 323 symbols)

Note: Potential windowing overhead to increase the OFDM spectrum shaping is not (yet) considered.

4.1.1. 8 MHz Channel (n=1)

4.1.1.1. Guard Interval Length=1/64

TABLE 14

Throughput rates for n = 1 (8 MHz), GI = 1/64

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/64 | 19.37 | 2.42 | −62.2 |
|  | 3/4 | 1/64 | 21.78 | 2.72 | −57.5 |
|  | 4/5 | 1/64 | 23.24 | 2.91 | −54.7 |
|  | 5/6 | 1/64 | 24.23 | 3.03 | −52.8 |
|  | 8/9 | 1/64 | 25.83 | 3.23 | −49.6 |
|  | 9/10 | 1/64 | 26.16 | 3.27 | −49.0 |
| 64-QAM | 2/3 | 1/64 | 29.05 | 3.63 | −43.4 |
|  | 3/4 | 1/64 | 32.68 | 4.08 | −36.3 |
|  | 4/5 | 1/64 | 34.86 | 4.36 | −32.0 |
|  | 5/6 | 1/64 | 36.34 | 4.54 | −29.1 |
|  | 8/9 | 1/64 | 38.75 | 4.84 | −24.4 |
|  | 9/10 | 1/64 | 39.24 | 4.90 | −23.5 |
| 256-QAM | 2/3 | 1/64 | 38.74 | 4.84 | −24.5 |
|  | 3/4 | 1/64 | 43.57 | 5.45 | −15.0 |
|  | 4/5 | 1/64 | 46.49 | 5.81 | −9.4 |
|  | 5/6 | 1/64 | 48.46 | 6.06 | −5.5 |
|  | 8/9 | 1/64 | 51.67 | 6.46 | 0.7 |
|  | 9/10 | 1/64 | 52.32 | 6.54 | 2.0 |
| 1024-QAM | 2/3 | 1/64 | 48.42 | 6.05 | −5.6 |
|  | 3/4 | 1/64 | 54.46 | 6.81 | 6.2 |
|  | 4/5 | 1/64 | 58.11 | 7.26 | 13.3 |
|  | 5/6 | 1/64 | 60.57 | 7.57 | 18.1 |
|  | 8/9 | 1/64 | 64.59 | 8.07 | 25.9 |
|  | 9/10 | 1/64 | 65.40 | 8.17 | 27.5 |
| 4096-QAM | 2/3 | 1/64 | 58.11 | 7.26 | 13.3 |
|  | 3/4 | 1/64 | 65.35 | 8.17 | 27.4 |
|  | 4/5 | 1/64 | 69.73 | 8.72 | 36.0 |
|  | 5/6 | 1/64 | 72.69 | 9.09 | 41.7 |
|  | 8/9 | 1/64 | 77.50 | 9.69 | 51.1 |
|  | 9/10 | 1/64 | 78.48 | 9.81 | 53.0 |

FIG. 41 shows the throughput gain of n=1 (8 MHz), GI=1/64 (% comparison to DVB-C 256 QAM).

4.1.1.2. Guard Interval Length=1/128

TABLE 15

Throughput rates for n = 1 (8 MHz), GI = 1/128

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/128 | 19.73 | 2.47 | −61.5 |
|  | 3/4 | 1/128 | 22.19 | 2.77 | −56.7 |
|  | 4/5 | 1/128 | 23.67 | 2.96 | −53.8 |
|  | 5/6 | 1/128 | 24.68 | 3.08 | −51.9 |
|  | 8/9 | 1/128 | 26.31 | 3.29 | −48.7 |
|  | 9/10 | 1/128 | 26.64 | 3.33 | −48.1 |
| 64-QAM | 2/3 | 1/128 | 29.59 | 3.70 | −42.3 |
|  | 3/4 | 1/128 | 33.28 | 4.16 | −35.1 |
|  | 4/5 | 1/128 | 35.51 | 4.44 | −30.8 |
|  | 5/6 | 1/128 | 37.02 | 4.63 | −27.8 |
|  | 8/9 | 1/128 | 39.47 | 4.93 | −23.0 |
|  | 9/10 | 1/128 | 39.96 | 5.00 | −22.1 |

TABLE 15-continued

Throughput rates for n = 1 (8 MHz), GI = 1/128

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 256-QAM | 2/3 | 1/128 | 39.45 | 4.93 | −23.1 |
|  | 3/4 | 1/128 | 44.37 | 5.55 | −13.5 |
|  | 4/5 | 1/128 | 47.34 | 5.92 | −7.7 |
|  | 5/6 | 1/128 | 49.35 | 6.17 | −3.8 |
|  | 8/9 | 1/128 | 52.62 | 6.58 | 2.6 |
|  | 9/10 | 1/128 | 53.28 | 6.66 | 3.9 |
| 1024-QAM | 2/3 | 1/128 | 49.32 | 6.16 | −3.8 |
|  | 3/4 | 1/128 | 55.47 | 6.93 | 8.1 |
|  | 4/5 | 1/128 | 59.18 | 7.40 | 15.4 |
|  | 5/6 | 1/128 | 61.69 | 7.71 | 20.3 |
|  | 8/9 | 1/128 | 65.78 | 8.22 | 28.3 |
|  | 9/10 | 1/128 | 66.61 | 8.33 | 29.9 |
| 4096-QAM | 2/3 | 1/128 | 59.18 | 7.40 | 15.4 |
|  | 3/4 | 1/128 | 66.56 | 8.32 | 29.8 |
|  | 4/5 | 1/128 | 71.02 | 8.88 | 38.5 |
|  | 5/6 | 1/128 | 74.03 | 9.25 | 44.3 |
|  | 8/9 | 1/128 | 78.94 | 9.87 | 53.9 |
|  | 9/10 | 1/128 | 79.93 | 9.99 | 55.8 |

FIG. 42 shows the throughput gain of n=1 (8 MHz), GI=1/128 (% comparison to DVB-C 256 QAM).

4.1.1.3. Guard Interval Length=1/256

TABLE 16

Throughput rates for n = 1 (8 MHz), GI = 1/256

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/256 | 19.91 | 2.49 | −61.2 |
|  | 3/4 | 1/256 | 22.39 | 2.80 | −56.3 |
|  | 4/5 | 1/256 | 23.89 | 2.99 | −53.4 |
|  | 5/6 | 1/256 | 24.90 | 3.11 | −51.4 |
|  | 8/9 | 1/256 | 26.55 | 3.32 | −48.2 |
|  | 9/10 | 1/256 | 26.89 | 3.36 | −47.6 |
| 64-QAM | 2/3 | 1/256 | 29.86 | 3.73 | −41.8 |
|  | 3/4 | 1/256 | 33.59 | 4.20 | −34.5 |
|  | 4/5 | 1/256 | 35.83 | 4.48 | −30.1 |
|  | 5/6 | 1/256 | 37.35 | 4.67 | −27.2 |
|  | 8/9 | 1/256 | 39.83 | 4.98 | −22.3 |
|  | 9/10 | 1/256 | 40.33 | 5.04 | −21.4 |
| 256-QAM | 2/3 | 1/256 | 39.82 | 4.98 | −22.4 |
|  | 3/4 | 1/256 | 44.78 | 5.60 | −12.7 |
|  | 4/5 | 1/256 | 47.78 | 5.97 | −6.8 |
|  | 5/6 | 1/256 | 49.81 | 6.23 | −2.9 |
|  | 8/9 | 1/256 | 53.11 | 6.64 | 3.5 |
|  | 9/10 | 1/256 | 53.77 | 6.72 | 4.8 |
| 1024-QAM | 2/3 | 1/256 | 49.77 | 6.22 | −3.0 |
|  | 3/4 | 1/256 | 55.98 | 7.00 | 9.1 |
|  | 4/5 | 1/256 | 59.72 | 7.47 | 16.4 |
|  | 5/6 | 1/256 | 62.26 | 7.78 | 21.4 |
|  | 8/9 | 1/256 | 66.38 | 8.30 | 29.4 |
|  | 9/10 | 1/256 | 67.22 | 8.40 | 31.1 |
| 4096-QAM | 2/3 | 1/256 | 59.72 | 7.47 | 16.4 |
|  | 3/4 | 1/256 | 67.17 | 8.40 | 31.0 |
|  | 4/5 | 1/256 | 71.67 | 8.96 | 39.7 |
|  | 5/6 | 1/256 | 74.71 | 9.34 | 45.7 |
|  | 8/9 | 1/256 | 79.66 | 9.96 | 55.3 |
|  | 9/10 | 1/256 | 80.66 | 10.08 | 57.3 |

4.1.2. 32 MHz Channel (n=4)

4.1.2.1. Guard Interval Length=1/64

TABLE 17

Throughput rates for n = 4 (32 MHz), GI = 1/64

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/64 | 20.11 | 2.51 | −60.8 |
|  | 3/4 | 1/64 | 22.62 | 2.83 | −55.9 |
|  | 4/5 | 1/64 | 24.14 | 3.02 | −52.9 |
|  | 5/6 | 1/64 | 25.16 | 3.15 | −50.9 |
|  | 8/9 | 1/64 | 26.83 | 3.35 | −47.7 |
|  | 9/10 | 1/64 | 27.17 | 3.40 | −47.0 |
| 64-QAM | 2/3 | 1/64 | 30.17 | 3.77 | −41.2 |
|  | 3/4 | 1/64 | 33.94 | 4.24 | −33.8 |
|  | 4/5 | 1/64 | 36.21 | 4.53 | −29.4 |
|  | 5/6 | 1/64 | 37.74 | 4.72 | −26.4 |
|  | 8/9 | 1/64 | 40.24 | 5.03 | −21.5 |
|  | 9/10 | 1/64 | 40.75 | 5.09 | −20.5 |
| 256-QAM | 2/3 | 1/64 | 40.23 | 5.03 | −21.6 |
|  | 3/4 | 1/64 | 45.25 | 5.66 | −11.8 |
|  | 4/5 | 1/64 | 48.28 | 6.03 | −5.9 |
|  | 5/6 | 1/64 | 50.32 | 6.29 | −1.9 |
|  | 8/9 | 1/64 | 53.66 | 6.71 | 4.6 |
|  | 9/10 | 1/64 | 54.33 | 6.79 | 5.9 |
| 1024-QAM | 2/3 | 1/64 | 50.29 | 6.29 | −2.0 |
|  | 3/4 | 1/64 | 56.56 | 7.07 | 10.3 |
|  | 4/5 | 1/64 | 60.34 | 7.54 | 17.7 |
|  | 5/6 | 1/64 | 62.91 | 7.86 | 22.7 |
|  | 8/9 | 1/64 | 67.07 | 8.38 | 30.8 |
|  | 9/10 | 1/64 | 67.92 | 8.49 | 32.4 |
| 4096-QAM | 2/3 | 1/64 | 60.34 | 7.54 | 17.7 |
|  | 3/4 | 1/64 | 67.87 | 8.48 | 32.3 |
|  | 4/5 | 1/64 | 72.41 | 9.05 | 41.2 |
|  | 5/6 | 1/64 | 75.49 | 9.44 | 47.2 |
|  | 8/9 | 1/64 | 80.49 | 10.06 | 56.9 |
|  | 9/10 | 1/64 | 81.50 | 10.19 | 58.9 |

FIG. 43 shows the throughput gain of n=4 (32 MHz), GI=1/64 (comparison to DVB-C 256 QAM).

4.1.2.2. Guard Interval Length=1/128

TABLE 18

Throughput rates for n = 4 (32 MHz), GI = 1/128

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/128 | 20.49 | 2.56 | −60.1 |
|  | 3/4 | 1/128 | 23.04 | 2.88 | −55.1 |
|  | 4/5 | 1/128 | 24.58 | 3.07 | −52.1 |
|  | 5/6 | 1/128 | 25.63 | 3.20 | −50.0 |
|  | 8/9 | 1/128 | 27.33 | 3.42 | −46.7 |
|  | 9/10 | 1/128 | 27.67 | 3.46 | −46.1 |
| 64-QAM | 2/3 | 1/128 | 30.73 | 3.84 | −40.1 |
|  | 3/4 | 1/128 | 34.56 | 4.32 | −32.6 |
|  | 4/5 | 1/128 | 36.88 | 4.61 | −28.1 |
|  | 5/6 | 1/128 | 38.44 | 4.81 | −25.1 |
|  | 8/9 | 1/128 | 40.99 | 5.12 | −20.1 |
|  | 9/10 | 1/128 | 41.50 | 5.19 | −19.1 |
| 256-QAM | 2/3 | 1/128 | 40.97 | 5.12 | −20.1 |
|  | 3/4 | 1/128 | 46.08 | 5.76 | −10.1 |
|  | 4/5 | 1/128 | 49.17 | 6.15 | −4.1 |
|  | 5/6 | 1/128 | 51.25 | 6.41 | −0.1 |
|  | 8/9 | 1/128 | 54.65 | 6.83 | 6.6 |
|  | 9/10 | 1/128 | 55.34 | 6.92 | 7.9 |

TABLE 18-continued

Throughput rates for n = 4 (32 MHz), GI = 1/128

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 1024-QAM | 2/3 | 1/128 | 51.22 | 6.40 | −0.1 |
|  | 3/4 | 1/128 | 57.60 | 7.20 | 12.3 |
|  | 4/5 | 1/128 | 61.46 | 7.68 | 19.8 |
|  | 5/6 | 1/128 | 64.07 | 8.01 | 24.9 |
|  | 8/9 | 1/128 | 68.31 | 8.54 | 33.2 |
|  | 9/10 | 1/128 | 69.17 | 8.65 | 34.9 |
| 4096-QAM | 2/3 | 1/128 | 61.46 | 7.68 | 19.8 |
|  | 3/4 | 1/128 | 69.12 | 8.64 | 34.8 |
|  | 4/5 | 1/128 | 73.75 | 9.22 | 43.8 |
|  | 5/6 | 1/128 | 76.88 | 9.61 | 49.9 |
|  | 8/9 | 1/128 | 81.98 | 10.25 | 59.8 |
|  | 9/10 | 1/128 | 83.00 | 10.38 | 61.8 |

FIG. 44 shows the throughput gain of n=4 (32 MHz), GI=1/128 (% comparison to DVB-C 256 QAM).

4.1.2.3. Guard Interval Length=1/256

TABLE 19

Throughput rates for n = 4 (32 MHz), GI = 1/256

| QAM | LDPC | GI length | Throughput (MBit/s) (related to 8 MHz bandwidth) | Spectral efficiency (Bit/Hz) | Throughput gain compared to DVB-C 256-QAM (in %) |
|---|---|---|---|---|---|
| 16-QAM | 2/3 | 1/256 | 20.67 | 2.58 | −59.7 |
|  | 3/4 | 1/256 | 23.25 | 2.91 | −54.7 |
|  | 4/5 | 1/256 | 24.81 | 3.10 | −51.6 |
|  | 5/6 | 1/256 | 25.86 | 3.23 | −49.6 |
|  | 8/9 | 1/256 | 27.58 | 3.45 | −46.2 |
|  | 9/10 | 1/256 | 27.92 | 3.49 | −45.6 |
| 64-QAM | 2/3 | 1/256 | 31.01 | 3.88 | −39.5 |
|  | 3/4 | 1/256 | 34.88 | 4.36 | −32.0 |
|  | 4/5 | 1/256 | 37.21 | 4.65 | −27.4 |
|  | 5/6 | 1/256 | 38.79 | 4.85 | −24.4 |
|  | 8/9 | 1/256 | 41.36 | 5.17 | −19.3 |
|  | 9/10 | 1/256 | 41.88 | 5.24 | −18.3 |
| 256-QAM | 2/3 | 1/256 | 41.35 | 5.17 | −19.4 |
|  | 3/4 | 1/256 | 46.51 | 5.81 | −9.3 |
|  | 4/5 | 1/256 | 49.62 | 6.20 | −3.3 |
|  | 5/6 | 1/256 | 51.72 | 6.47 | 0.9 |
|  | 8/9 | 1/256 | 55.15 | 6.89 | 7.5 |
|  | 9/10 | 1/256 | 55.84 | 6.98 | 8.9 |
| 1024-QAM | 2/3 | 1/256 | 51.69 | 6.46 | 0.8 |
|  | 3/4 | 1/256 | 58.13 | 7.27 | 13.3 |
|  | 4/5 | 1/256 | 62.02 | 7.75 | 20.9 |
|  | 5/6 | 1/256 | 64.65 | 8.08 | 26.1 |
|  | 8/9 | 1/256 | 68.94 | 8.62 | 34.4 |
|  | 9/10 | 1/256 | 69.80 | 8.73 | 36.1 |
| 4096-QAM | 2/3 | 1/256 | 62.02 | 7.75 | 20.9 |
|  | 3/4 | 1/256 | 69.76 | 8.72 | 36.0 |
|  | 4/5 | 1/256 | 74.43 | 9.30 | 45.1 |
|  | 5/6 | 1/256 | 77.59 | 9.70 | 51.3 |
|  | 8/9 | 1/256 | 82.73 | 10.34 | 61.3 |
|  | 9/10 | 1/256 | 83.77 | 10.47 | 63.3 |

4.2. System Performance in an AWGN Channel

FIG. 45 shows the basic performance of different modulation and coding settings in the AWGN channel (target BER=1E-6).

Currently the OFDM specific overhead (GI, pilots, guard bands, framing) is not included, overall it is expected to be below 5.5% for the longest guard interval length of 1/64 and an overall channel bandwidth of 32 MHz (3.7% for GI=1/128).

Theoretically, DVB-C 256 QAM requires 29.5 dB SNR for QEF operation. According to Error! Reference source not found, 1024-QAM with code rate 9/10 requires roughly the same signal to noise ratio.

The spectral efficiency for this mode is 9 bit/Hz. If we compare this to the spectra efficiency of DVB-C 256-QAM (6.875*188/204=6.34 bit/Hz), the overall throughput gain of the proposed system is in the range of 42% (respectively 34.1%, if the worst case 32 MHz OFDM specific overhead is included).

5. Comparison of the Proposal with the Requirements (from CM-903)

| N° | General Requirements | Suggested System |
|---|---|---|
| 1 | The technologies shall aim to optimize the use of cable channels in state of the art cable networks. This includes enhanced flexibility and robustness, as well as maximum payload data capacity. | OFDM modulation up to 4K QAM on sub-carriers, 32 MHz channel, LDPC codec & many other features |
| 2 | DVB-C2 should not primarily aim to match DVB-S2 and/or DVB-T2, but fully exploit its differentiating features to compete in the market of content delivery. Therefore downstream transmission technologies that maximally benefit from the availability of the return channel should be evaluated. However the specification of DCB-C2 shall not depend on the availability of a return channel. | Adaptive modulation for interactive services |
| 3 | A toolkit of system parameters shall be available to address applications across consumer to business applications, taking into account different performance level of the CATV network. | A variety of system parameters are provided for network performance optimisation |
| 4 | The specification shall allow service providers on cable networks to have individual quality of service targets, even for services within the same multiplex. | Partially met - Service specific protection within one Multiplex is not supported in order to limit signalling complexity |

-continued

| N° | | Suggested System |
|---|---|---|
| 5 | Suitable techniques already in existence shall be adopted wherever possible. | Many functional blocks are reused from DVB-S2 and DVB-T2 |
| 6 | Due account shall be taken of anticipated cable network characteristics (e.g. with fiber to the curb, building and home, as far as applicable). | Use of 4k QAM modulation for higher data rates in higher quality HFC networks |
| 7 | New technical specifications shall address transmit-end functions only, but shall take account of cost implications for different devices, such as receivers or headend equipment. | Design complexity, memory requirements, etc. are considered in the proposal. |
| 8 | The DVB-C standard shall not be modified, nor shall require changes to other specifications (e.g. SI) or cause any existing feature to become invalid. | No modifications to existing standards/specifications are required |
| 9 | The specifications shall be transmission frequency neutral within typical cable frequency bands. | No constraints. |
| 10 | DVB family approach: DVB-C2 should reuse existing solutions for interfacing, coding and modulation wherever appropriate. Performance and efficiency requirements | DVB-T2/S2 solutions are reused where possible |
| 11 | DVB-C2 should be able to efficiently support the migration from a mixed analog/digital to full digital network and be able to offer max performance/throughput in both networks. | Peak to average power reduction is employed to minimize interference on other channels |
| 12 | DVB-C2 should give at least 30% more throughput in existing cable plants & in-house networks compared to 256-QAM (DVB-C). | Use of 1024QAM and higher modulation schemes |
| 13 | DVB-C2 shall allow achieving the maximum benefit from statistical multiplex method. E.g. the current fixed channel raster could be deregulated. | Channel bandwidth flexible in multiples of 8 MHz from 8-32 MHz |
| 14 | Cable networks should be characterized and modeled on a global (e.g. US, Asia and Europe) level (including in-house network) and the best modulation/FEC schemes should be selected taking into account a realistic cable channel model including: Deployment of analog PAL/SECAM/NTSC TV channels. Deployment of different digital signals (such as DVB, DOCSIS, Davic) and the associated signal backoff ratios to analogue signals Different noise (white, burst, impulse), non-linearities and other interferences present in current and future networks | System architecture provides measures to overcome cable specific impairments. Worldwide frequencies of both 8 MHz and 6 MHz can be supported. Appropriate modulation and coding rates can be chosen based on differing channel requirements |
| 15 | The error performance of the system must be suitable for all types of services that may be carried. | Different protection levels on TS or GS level |
| 16 | The DVB-C2 transmission system should be able to support low power modes to maximally reduce power consumption in receivers according to the EU Code of Conduct on Energy Consumption. | Segmented reception reduces complexity |
| 17 | Seamless retransmission (e.g. from DVB-S2 to DVB-C2, or DVB-T2 to DVB-C2) should be fully supported. | Transcoding from DVB-S2/T2 to C2 is supported |
| 18 | The DVB-C2 standard shall provide a fully transparent link for Transport Stream, IP-packets and other relevant protocols between the input of the modulator and the output of the demodulator. | Flexible mapping of different input formats is supported |
| 19 | The Zapping time (time to tune a receiver from one service to another) shall not be significantly increased due to the introduction of DVB-C2 (in relation to the today user experience of digital TV services with DVB-C). For any change in RF channel, the DVB-C2 front-end shall deliver a quasi error free signal within 300 ms. Backward compatibility requirements | Met through optimisation of C2 OFDM frame length |
| 20 | DVB-C2 shall not be backwards-compatible with DVB-C (in a sense that a DVB-C receiver is able to process a DVB-C2 signal). The capability for a DVB-C2 receiver to include DVB-C functionalities should be addressed as an optional requirement in the technical specification, so that If this is a requirement from the industry players to include DVB-C functionality into DVB-C2 equipment, chipset manufacturers can provide compliant solutions. | Tuner bandwidth in receiver remains at 8 MHz as used in current DVB-C systems. This enables co-existence of DVB-C and DVB-C2 demodulators in the same receiver. |

| N° | Suggested System |
|---|---|
| | if in the long term networks will have migrated completely to DVB-C2, these chipsets may be produced as well. |
| 21 For DVB-C2 transmissions, there shall be no requirement for any change to existing DVB-C receivers. This assumes continued use of the same cable network architecture and the same cable channel characteristics. | Requirement met |
| 22 In order to allow for self install, the DVB-C2 standard should be as insensitive as possible to typical characteristics of in-house networks using coaxial cable systems. | This proposal supports various coding and interleaving options to mitigate the non-idealities in in-house cable systems |
| Interactive systems requirements | |
| 22 The specification shall be available for consideration as an alternative downstream coding and modulation scheme for the DOCSIS systems currently using DVB-C for the European technology option of the DOCSIS System (EuroDOCSIS). | Requirement met |
| 23 DVB-C2 shall include techniques for improving the efficiency of carriage of IP data. | Requirement met. |
| 24 DVB-C2 shall allow cost effective integration of DVB-C2 into Edge QAM solutions for modulation equipment. | Requirement met. |
| 25 The specification shall provide a low latency mode meeting the requirements of those interactive services that require such a mode. | Time interleaver can be switched off for services requiring low latency |

The invention claimed is:

1. A transmitting apparatus for transmitting signals in a multi carrier system on the basis of a frame structure, said transmitting apparatus comprising:
frame former circuitry configured to form frames of said frame structure, each frame including at least two signaling patterns in a frequency direction and one or more data patterns following the at least two signaling patterns in a time direction, wherein:
each of the one or more data patterns is followed by further data patterns in the time direction,
all data patterns following each other in the time direction have a same frequency direction structure, and
each of the at least two signaling patterns and the one or more and further data patterns include a plurality of frequency carriers;
signaling mapper circuitry configured to map signaling data on the frequency carriers of each of said at least two signaling patterns in a frame of said frames, each signaling pattern comprising location information indicating the location of the one or more and further data patterns;
data mapper circuitry configured to map data on the frequency carriers of said one or more and further data patterns in a frame of said frames;
transformer circuitry configured to transform said at least two signaling patterns and said one or more and further data patterns from the frequency domain into the time domain in order to generate a time domain transmission signal; and
a transmitter configured to transmit said time domain transmission signal.

2. The transmitting apparatus according to claim 1, wherein each frame comprises at least two additional signaling patterns succeeding said at least two signaling patterns in the time dimension, each of said at least two additional signaling patterns having the respective same length as the corresponding one of said at least two preceding signaling patterns.

3. The transmitting apparatus according to claim 1, wherein each frame comprises at least two training patterns, said transmitting apparatus comprising pilot mapper circuitry configured to map the pilot signals on frequency carriers of each training pattern in a frame of said frames, and
wherein the at least two signaling patterns are aligned to the training patterns in the frequency direction.

4. The transmitting apparatus according to claim 3, wherein every training pattern has a same length.

5. The transmitting apparatus according to claim 1, wherein each signaling pattern of each frame comprises the location of the respective signaling pattern in the frame.

6. The transmitting apparatus according to claim 1, wherein the at least two signaling patterns of each frame comprise signaling data indicating the number of data patterns comprised in the frame.

7. The transmitting apparatus according to claim 1, wherein the structure of the signaling data in the at least two signaling patterns supports a limited maximum number of data patterns in the frequency direction of each frame.

8. The transmitting apparatus according to claim 1, wherein the at least two signaling patterns of each frame comprise individual signaling data for each data pattern comprised in the frame.

9. A transmitting method for transmitting signals in a multi carrier system on the basis of a frame structure, the method comprising:
forming frames of said frame structure, each frame including at least two signaling patterns in a frequency direction and one or more data patterns following the at least two signaling patterns in a time direction, wherein:
each of the one or more data patterns is followed by further data patterns in the time direction,
all data patterns following each other in the time direction have a same frequency direction structure, and
each of the at least two signaling patterns and the one or more and further data patterns include a plurality of frequency carriers;

mapping signaling data on frequency carriers of each of said at least two signaling patterns in a frame, each signaling pattern comprising location information indicating the location of the one or more and further data patterns;

mapping data on frequency carriers of said one or more and further data patterns in a frame;

transforming said at least two signaling patterns and said one or more and further data patterns from the frequency domain into the time domain in order to generate a time domain transmission signal; and transmitting said time domain transmission signal.

10. A multi carrier system configured to utilize a frame pattern, the frame pattern comprising at least two signaling patterns in a frequency direction and one or more data patterns following the at least two signaling patterns in a time direction, wherein:

each of the one or more data patterns is followed by further data patterns in the time direction, all data patterns following each other in the time direction have a same frequency direction structure, each of the at least two signaling patterns and the one or more and further data patterns include a plurality of frequency carriers, signaling data are mapped on frequency carriers of each of said at least two signaling patterns in a frame, each signaling pattern comprising location information indicating the location of the one or more and further data patterns, and data are mapped on frequency carriers of said one or more and further data patterns in the frame.

11. A receiving apparatus for receiving signals in a multi carrier system on the basis of a frame structure in a transmission bandwidth, each frame comprising at least two signaling patterns in a frequency direction each with signaling data mapped on frequency carriers and one or more data patterns with data mapped on frequency carriers, each of said at least two signaling patterns comprising location information indicating the location of the one or more data patterns, said one or more data patterns following the at least two signaling patterns in a time direction, wherein:

each of the one or more data patterns is followed by further data patterns in the time direction, all data patterns following each other in the time direction have a same frequency direction structure, and each of the at least two signaling patterns and the one or more and further data patterns include a plurality of frequency carriers, said receiving apparatus comprising:

a receiver configured to be tuned to and to receive a selected part of said transmission bandwidth based on said location information, said selected part of said transmission bandwidth having at least the length of one of said at least two signaling patterns and covering at least one data pattern to be received, and evaluator circuitry configured to evaluate the signaling data comprised in a received signaling pattern in order to enable the receipt of said one or more and further data patterns.

12. The receiving apparatus according to claim 11, further comprising:

reconstructor circuitry configured to reconstruct an original signaling pattern from said received selected part of said transmission bandwidth.

13. The receiving apparatus according to claim 12, wherein said reconstructor circuitry is configured to rearrange received signaling signals into the original signaling pattern in case that the selected part of said transmission bandwidth to which the receiver is tuned does not match with a structure of the signaling pattern.

14. The receiving apparatus according to claim 12, wherein each frame comprises at least two additional signaling patterns succeeding said at least two signaling patterns in the time dimension, each of said at least two additional signaling patterns having the respective same length as the corresponding one of said at least two preceding signaling patterns, wherein said reconstructor circuitry rearranges received two or more signaling patterns succeeding each other in the time dimension into the original signaling pattern.

15. The receiving apparatus according to claim 12, wherein:

the signaling data of the at least two signaling patterns comprise an error correction coding, and said reconstructor circuitry is configured to perform an error correction decoding on said received signaling pattern in order to reconstruct the original signaling pattern.

16. The receiving apparatus according to claim 11, wherein:

the at least two signaling patterns of each frame comprise signaling data with the location of each signaling pattern in the frame, and said evaluator circuitry is configured to extract said location information.

17. The receiving apparatus according to claim 11, wherein:

the at least two signaling patterns of each frame comprise signaling data with the number of data patterns comprised in the frame, and said evaluator circuitry is configured to extract said signaling data with a number of data patterns from a received signaling pattern.

18. The receiving apparatus according to claim 11, wherein:

the at least two signaling patterns of each frame comprise individual signaling data for each data pattern comprised in the frame, and said evaluator circuitry is configured to extract said individual signaling data for each data pattern from a received signaling pattern.

19. The receiving apparatus according to claim 11, wherein said receiver is configured to be tuned to and to receive a selected part of said transmission bandwidth so that an optimized receipt of a signaling pattern in the selected part of said transmission bandwidth to be received is enabled.

20. The receiving apparatus according to claim 11, wherein said receiver is configured to be tuned to and to receive a selected part of said transmission bandwidth so that one or more and further data patterns to be received is centered in relation to the selected part of said transmission bandwidth to be received.

21. The receiving apparatus according to claim 11, wherein said receiver is configured to be tuned to and to receive a selected part of said transmission bandwidth on the basis of signaling data received in a signaling pattern of a previous frame.

22. A receiving method for receiving signals transmitted in a multi carrier system on the basis of a frame structure in a transmission bandwidth, each frame comprising at least two signaling patterns in a frequency direction each with signaling data mapped on frequency carriers and one or more data patterns with data mapped on frequency carriers, each of said at least two signaling patterns comprising location information indicating the location of the one or more data patterns, said one or more data patterns following the at least two signaling patterns in a time direction, wherein:
- each of the one or more data patterns is followed by further data patterns in the time direction,
- all data patterns following each other in the time direction have a same frequency direction structure, and
- each of the at least two signaling patterns and the one or more and further data patterns include a plurality of frequency carriers, said method comprising:
receiving a selected part of said transmission bandwidth based on said location information, said selected part of said transmission bandwidth having at least the length of one of said at least two signaling patterns and covering at least one data pattern to be received, and
evaluating the signaling data comprised in a received signaling pattern in order to enable the receipt of said one or more and further data patterns.

23. A system for transmitting and receiving signals, comprising:
a transmitting apparatus for transmitting signals in a multi carrier system on the basis of a frame structure, said transmitting apparatus including:
frame former circuitry configured to form frames of said frame structure, each frame including at least two signaling patterns in a frequency direction and one or more data patterns following the at least two signaling patterns in a time direction, wherein:
- each of the one or more data patterns is followed by further data patterns in the time direction,
- all data patterns following each other in the time direction have a same frequency direction structure, and
- each of the at least two signaling patterns and the one or more and further data patterns include a plurality of frequency carriers;

signaling mapper circuitry configured to map signaling data on the frequency carriers of each of said at least two signaling patterns in a frame of said frames, each signaling pattern comprising location information indicating the location of the one or more and further data patterns;
data mapper circuitry configured to map data on the frequency carriers of said one or more and further data patterns in a frame of said frames;
transformer circuitry configured to transform said at least two signaling patterns and said one or more and further data patterns from the frequency domain into the time domain in order to generate a time domain transmission signal; and a transmitter configured to transmit said time domain transmission signal, and
a receiving apparatus configured to receive signals in a multi carrier system on the basis of a frame structure in a transmission bandwidth and configured to receive said time domain transmission signal from said transmitting apparatus, said receiving apparatus including:
a receiver configured to be tuned to and to receive a selected part of said transmission bandwidth based on said location information, said selected part of said transmission bandwidth having at least the length of one of said at least two signaling patterns and covering at least one data pattern to be received, and
evaluator circuitry configured to evaluate the signaling data comprised in a received signaling pattern in order to enable the receipt of said one or more and further data patterns.

24. A method for transmitting and receiving signals, comprising:
a transmitting method for transmitting signals in a multi carrier system on the basis of a frame structure, said transmitting method comprising:
forming frames of said frame structure, each frame including at least two signaling patterns in a frequency direction and one or more data patterns following the at least two signaling patterns in a time direction, wherein:
- each of the one or more data patterns is followed by further data patterns in the time direction,
- all data patterns following each other in the time direction have a same frequency direction structure, and
- each of the at least two signaling patterns and the one or more and further data patterns include a plurality of frequency carriers;

mapping signaling data on frequency carriers of each of said at least two signaling patterns in a frame, each signaling pattern comprising location information indicating the location of the one or more and further data patterns;
mapping data on frequency carriers of said one or more and further data patterns in a frame;
transforming said at least two signaling patterns and said one or more and further data patterns from the frequency domain into the time domain in order to generate a time domain transmission signal;
transmitting said time domain transmission signal; and
a receiving method according to claim 22 to receive said time domain transmission signal.

* * * * *